US007277711B2

(12) United States Patent  (10) Patent No.: US 7,277,711 B2
Nyu  (45) Date of Patent: Oct. 2, 2007

(54) LOCATION SYSTEM AND METHOD FOR CLIENT TERMINALS WHICH PROVIDE LOCATION-BASED SERVICE TO MOBILE TERMINALS

(75) Inventor: Takayuki Nyu, Tokyo (JP)

(73) Assignee: NEC Corporation, Tokyo (JP)

( * ) Notice: Subject to any disclaimer, the term of this patent is extended or adjusted under 35 U.S.C. 154(b) by 487 days.

(21) Appl. No.: 10/745,632

(22) Filed: Dec. 29, 2003

(65) Prior Publication Data

US 2004/0157620 A1  Aug. 12, 2004

(30) Foreign Application Priority Data

Dec. 27, 2002  (JP)  ............................. 2002-379866

(51) Int. Cl.
*H04Q 7/20*  (2006.01)
(52) U.S. Cl. ............................. 455/456.1; 455/456.2; 455/456.3; 455/456.4; 455/456.5; 455/456.6; 455/414.1; 455/404.2
(58) Field of Classification Search ............ 455/404.1, 455/404.2, 421, 422.1, 432.1, 432.2, 433, 455/456.1, 456.2, 456.3, 456.4, 456.5, 456.6, 455/457, 432.3, 414.1; 701/213, 214, 215
See application file for complete search history.

(56) References Cited

U.S. PATENT DOCUMENTS

| | | | |
|---|---|---|---|
| 5,950,137 A | | 9/1999 | Kim |
| 6,198,933 B1 * | | 3/2001 | Lundin ..................... 455/456.4 |
| 7,116,990 B2 * | | 10/2006 | Maanoja ................... 455/456.2 |
| 7,171,216 B1 * | | 1/2007 | Choksi ..................... 455/456.1 |

| | | | |
|---|---|---|---|
| 2005/0070296 A1 * | | 3/2005 | Maanoja ................... 455/456.1 |
| 2005/0272429 A1 * | | 12/2005 | Walsh et al. ................. 455/443 |

(Continued)

FOREIGN PATENT DOCUMENTS

EP  1 337 123  8/2003

(Continued)

OTHER PUBLICATIONS

Digital cellular telecommunications system (Phase 2+); Universal Mobile Telecommunications System (UMTS); Functional stage 2 description of location services (3GPP TS 23.271 version 5.3.0 Release 5), ETSI TS 123 271 V5.3.0, Jun. 2002, XP002227478, pp. 1-75.

*Primary Examiner*—Joseph Feild
*Assistant Examiner*—Olumide Ajibade-Akonai
(74) *Attorney, Agent, or Firm*—Young & Thompson

(57) ABSTRACT

In one of multiple mobile communication networks, a serving node responsible for locating mobile terminals is responsive to a registration request from a mobile terminal for storing the serving node identity in a home location database to which the mobile terminal is subscribed. In response to a location request message from a client terminal requesting the location of a target mobile terminal, a serving node identity is retrieved from the home location database of the target mobile terminal. The serving node identity represents the current location of the target mobile terminal. If the current location area is within the coverage area of location-based service provided by the client terminal, the location request message is forwarded to a serving node identified by the retrieved serving node identity. Otherwise, an error message is transmitted to the client terminal to indicate that the target mobile terminal is roaming outside of the coverage area.

61 Claims, 39 Drawing Sheets

U.S. PATENT DOCUMENTS

2006/0099958 A1* 5/2006 Gustafsson et al. ...... 455/456.1

FOREIGN PATENT DOCUMENTS

| | | |
|---|---|---|
| JP | 2002-112346 | 4/2002 |
| KR | 2001-105651 | 11/2001 |
| WO | WO 01/39528 | 5/2001 |
| WO | WO 01/41468 | 6/2001 |

* cited by examiner

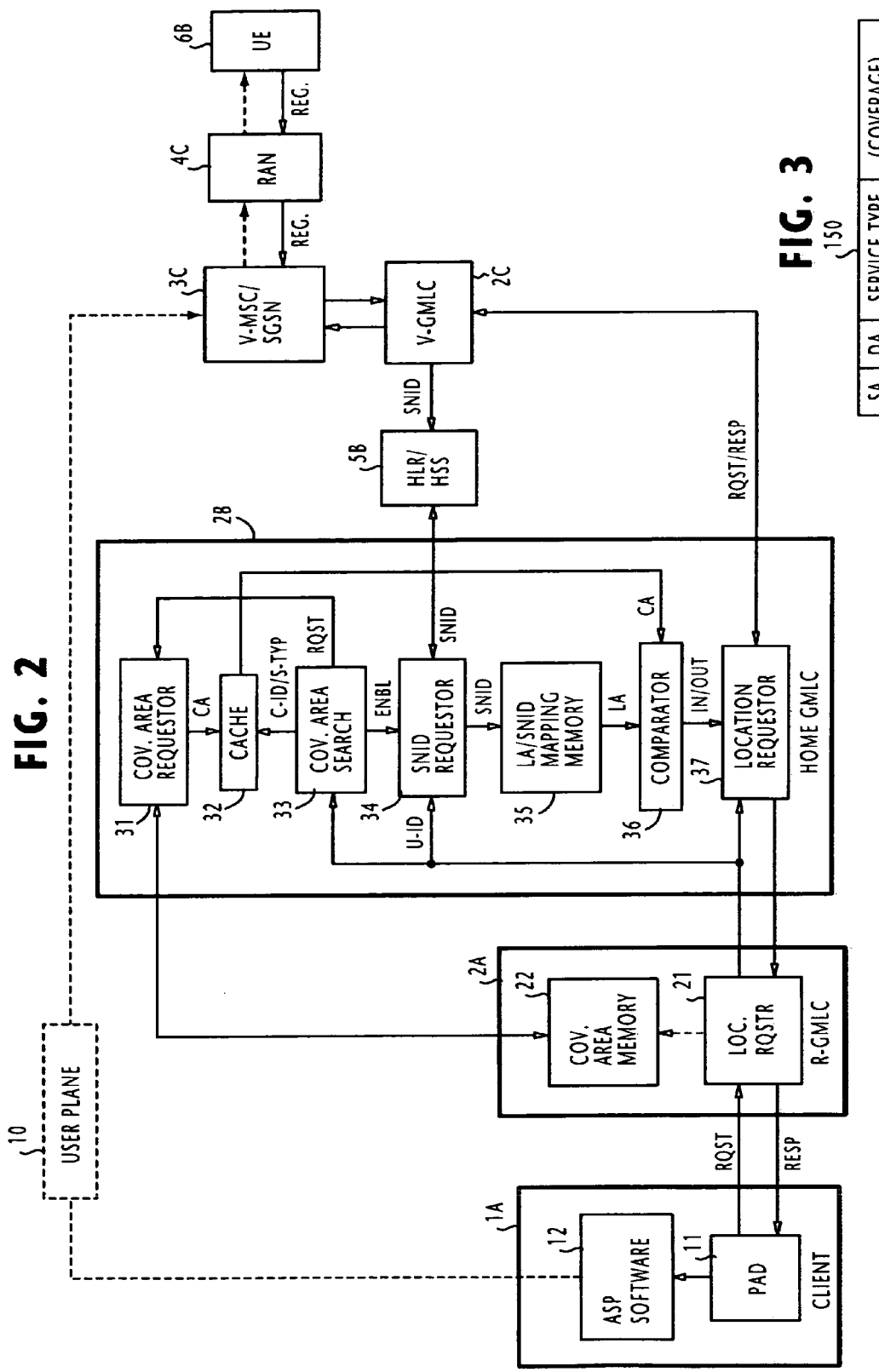
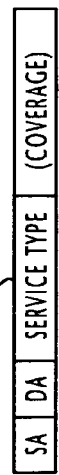

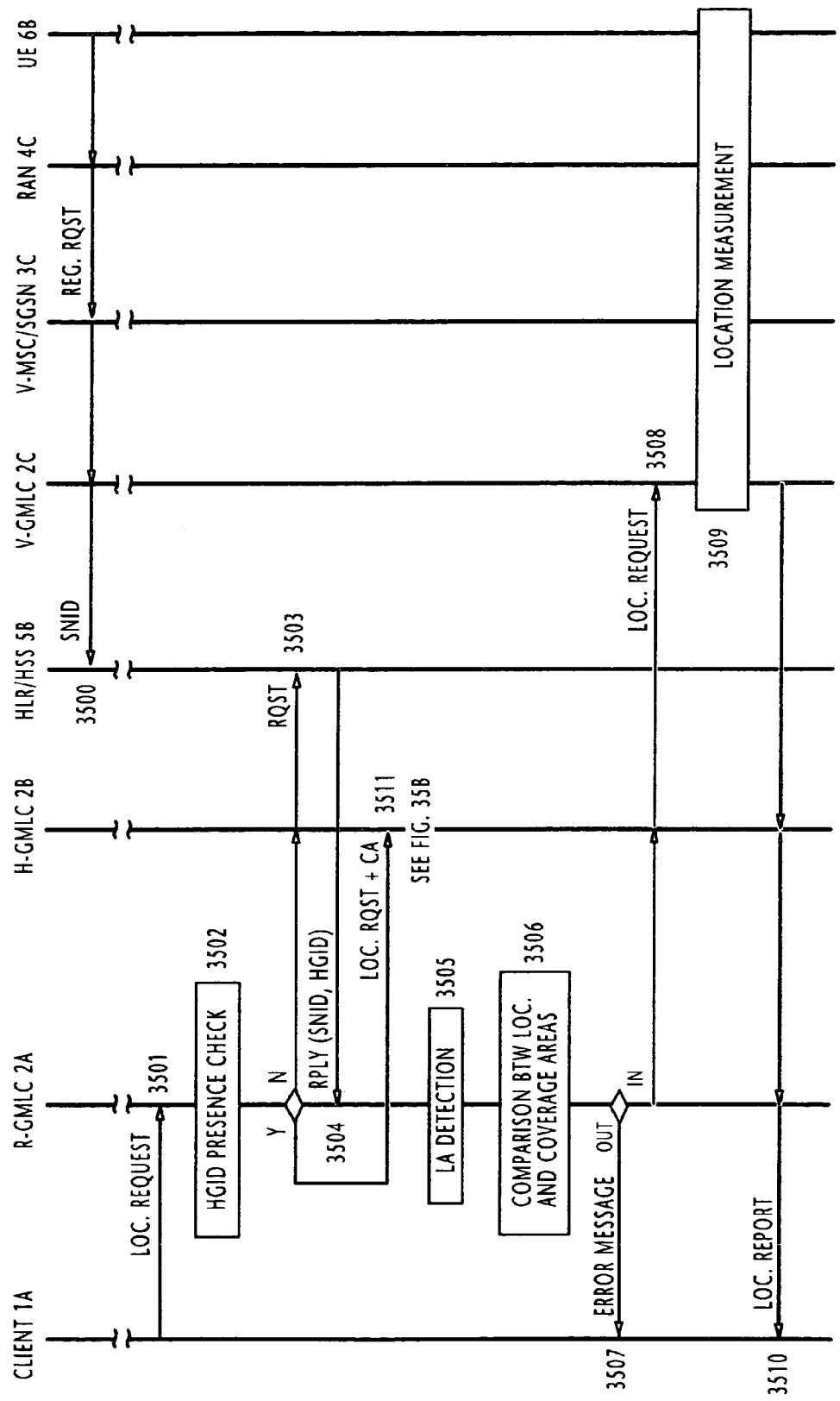

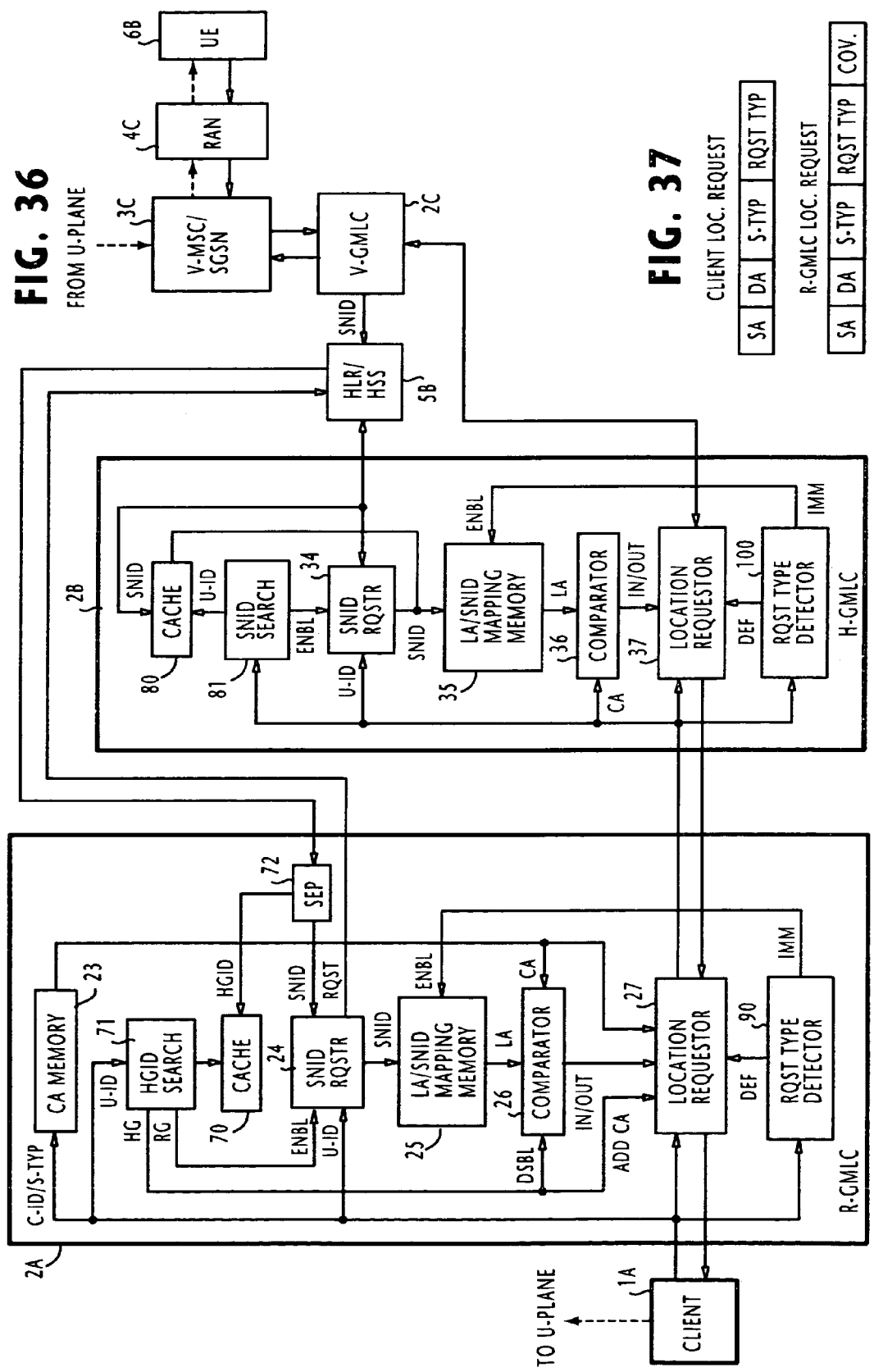

LOCATION SYSTEM AND METHOD FOR CLIENT TERMINALS WHICH PROVIDE LOCATION-BASED SERVICE TO MOBILE TERMINALS

RELATED APPLICATION

The present application is related to co-pending U.S. patent application Ser. No. 10/623,545, K. Ishii, titled "Location System", filed Jul. 22, 2003, and assigned to the same assignee as the present application.

BACKGROUND OF THE INVENTION

1. Field of the Invention

The present invention relates generally to location systems, and more specifically to a location system for a LCS (LoCation Service) client terminal which provides location-based service to a target mobile terminal when the client terminal knows the location of the mobile terminal.

2. Description of the Related Art

In the location system standardized by 3GPP (3rd Generation Partnership Project) TS (Technical Specification Group Services and System Aspects) 23.271 V5.3.0 and 25.305 V5.4.0, LCS clients provide a location-based service to a mobile terminal by using ASP (application service provider) software, only if the mobile terminal is located within the coverage area of the service. Examples of such location-based service are described in 3GPP TS 22.071 V5.1.1 (2002-3). If the location of the mobile terminal is outside of the service coverage area, the LCS client terminal is not required to provide its service to that mobile terminal. However, the client terminal has no way of knowing the location of the mobile terminal, it transmits a location request message to the location system to determine if the mobile terminal is located within the coverage area of its service before initiating a location-based service to the target mobile terminal. In the location system, the location request message from the client terminal is received and processed through a gateway, or GMLC (Gateway Mobile Location Center) and a serving node, or MSC/SGSN (Mobile Switching Center/Serving GPRS Support Node) collaborates with the associated wireless network to perform a location measurement on the target mobile terminal to produce a location estimate and returns a location report message. The location report message is transmitted back to the client terminal through the gateway. Therefore, if a target mobile terminal is roaming outside of the service coverage area of a client terminal, the client terminal decides that no location-based service is necessary on receiving a location report from the associated gateway. As a result, the mobile communication networks consume their resource for useless location request/report traffic when a target mobile terminal is roaming outside of the coverage of location-based service provided by a client terminal. In particular, when the target mobile terminal has moved from its subscribed home network to a foreign network operated by a different network operator, a substantial amount of resources is used in these networks for useless traffic.

It is known that when a client terminal specifies a QoS (quality-of-service) parameter, the associated gateway uses the specified parameter as a threshold for making a decision as to whether a location request message is to be forwarded to the serving node of a target mobile terminal. If the specified QoS parameter is satisfied, the gateway forwards the message to the serving node of the target mobile terminal. Otherwise, an error message is returned to the client terminal. However, the known location system returns no error message to the client terminal when the target mobile terminal is roaming outside of the coverage area of the location-based service provided by the client terminal.

SUMMARY OF THE INVENTION

It is therefore an object of the present invention to provide a location system and method whereby a mobile communication network is saved from consuming its resource for useless location request/report traffic when a target mobile terminal is roaming outside of the coverage of location-based service provided by a client terminal.

According to a first aspect of the present invention, there is provided a location system for a client terminal which provides a location-based service over a coverage area, comprising at least one mobile communication network for determining an area in which a mobile terminal is located in response to an area request message and determining location of the mobile terminal in response to a location request message, first means which is responsive to a location request message from the client terminal requesting location information of a target mobile terminal for transmitting the area request message to the network to determine the area in which the target mobile terminal is located, and second means for forwarding the location request message to the location network to determine the location of the target mobile terminal if the determined area is within the coverage area and transmitting an error message to the client terminal if the determined area is outside of the coverage area. When the client terminal receives the error message, it abandons its location-based service, recognizing that the target mobile terminal is roaming outside of the service coverage area. The network is thus saved from generating useless traffic when mobile terminals are roaming outside of the coverage area of clients' location-base services.

Specifically, the at least one mobile communication network comprises a home location database to which the target mobile terminal is subscribed, and a serving node which is responsive to a registration request message from the target mobile terminal for storing identity of the serving node in the home location database of the target mobile terminal. The serving node is responsible for producing location information of the target mobile terminal. The serving node identity represents the area in which the target mobile terminal is located. The first means retrieves a serving node identity from the home location database corresponding to the target mobile terminal in response to a location request message from the client terminal. The second means forwards the location request message to a serving node identified by the retrieved serving node identity if the area represented by the serving node identity is within the coverage area and transmits an error message to the client terminal if the area represented by the serving node identity is outside of the coverage area.

According to a second aspect of the present invention, there is provided a gateway for serving a client terminal which provides a location-based service to mobile terminals over a coverage area through at least one mobile communication network which determines an area in which a mobile terminal is located in response to an area request message and determines location of the mobile terminal in response to a location request message, comprising first means which is responsive to a location request message from the client terminal requesting location information of a target mobile terminal, for transmitting the area request message to the at least one network to determine the area in which the target mobile terminal is located, and second means for forwarding the location request message to the at least one network to determine the location of the target mobile terminal if the determined area of the target mobile terminal is within the coverage area and transmitting an error message to the client terminal if the determined area of the target mobile terminal is outside of the coverage area.

According to a third aspect, the present invention provides a method of locating a mobile terminal when a location request message is received from a client terminal which provides location-based service to the mobile terminal when the mobile terminal is located within the coverage area of the service. The locating method comprises the steps of (a) determining an area in which a target mobile terminal is located when a location request message is received from the client terminal, and (b) determining location of the target mobile terminal if the determined area of the mobile terminal is within the coverage area and transmitting an error message to the client terminal if the determined area of the target mobile terminal is outside of the coverage area.

More specifically, the mobile terminal is connected to one of a plurality of mobile communication networks. Each of the networks comprises a home location database to which the mobile terminal is subscribed and a serving node for serving the mobile terminal. The step (a) comprises retrieving a serving node identity from a home location database corresponding to the target mobile terminal, and step (b) comprises forwarding the location request message to a serving node identified by the retrieved serving node identity if an area represented by the serving node identity is within the coverage area, and transmitting the error message to the client terminal if the area is outside of the coverage area.

BRIEF DESCRIPTION OF THE DRAWINGS

The present invention will be described in detail further with reference to the following drawings, in which:

FIG. 2 is a block diagram of a location system according to a first embodiment of the present invention based on the network configuration of FIG. 1, in which the home GMLC is responsible for making an in/out area decision;

FIG. 3 shows the data structure of a location request message transmitted from the client terminal of FIG. 2;

FIGS. 35A and 35B are sequence diagrams for describing the operation of the location system of FIG. 34;

FIG. 36 is a block diagram of a location system according to a fifteenth embodiment of the present invention as a modification of the fourteenth embodiment (FIG. 34);

FIG. 37 shows the data structures of a location request message transmitted from the client terminal to the requesting gateway and a location request message forwarded from the requesting gateway to a home gateway;

DETAILED DESCRIPTION

Figure 1:
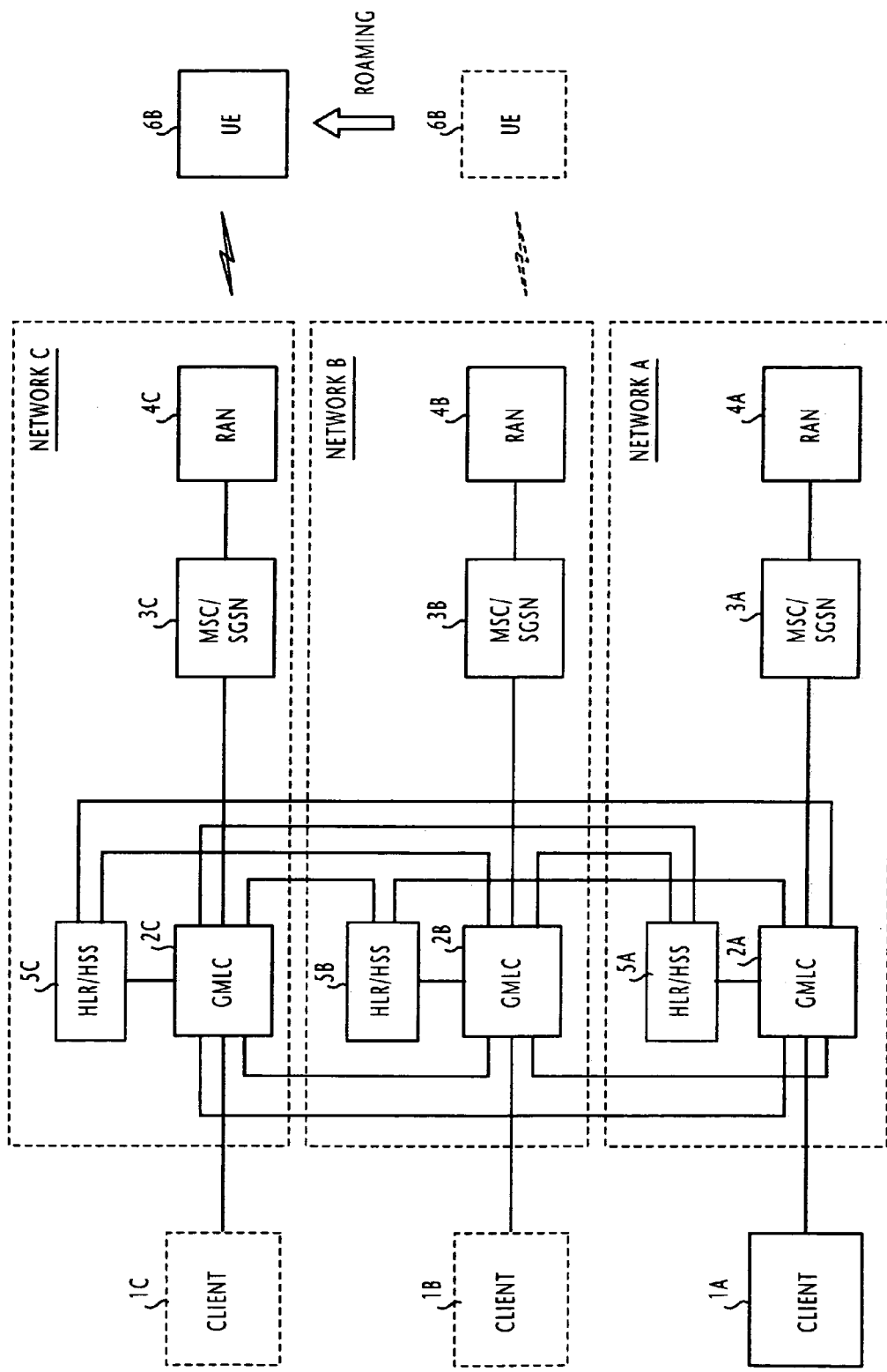
FIG. 1 is a block diagram of a location system according to one network configuration of the present invention in which mobile communication networks are owned and operated by respective network operators.

Referring now to FIG. 1, there is shown a location system of a mobile multi-network in which the present invention is incorporated. The location system is comprised of a plurality of mobile communication networks A, B and C operated by respective network operators. Each mobile communication network "i" (where i=A, B or C) comprises a GMLC (Gateway Mobile Location Centers) 2i to which an LCS (LoCation System) client terminal 1i is connected via a wireline switched communications network such as PSTN, not shown. GMLC 2i is connected to an associated MSC/SGSN (Mobile service Switching Center/Serving General packet radio service Support Node) 3i. Each GMLC, or gateway is further connected to the other GMLCs. MSC/SGSN i3 is connected to a RAN (Radio Access Network) 4i. A plurality of databases, or HLR/HSSs (Home Location Register/Home Subscriber Server) 5A, 5B and 5C are connected to the GMLCs 2A, 2B, 2C. Each of the HLR/HSSs is further connected to the other GMLCs.

Note that, upon receipt of a location request message, each gateway performs a privacy check to verify the authenticity of the message. If a message is verified by a gateway, the message is processed by the gateway or simply forwarded to the next gateway depending on the contents of the message. If a message is not verified, an error message is returned to the client terminal.

Each UE mobile terminal has its own subscribed home database in which the location of the mobile terminal is registered wherever the mobile terminal is located. When the mobile terminal is moves out its home network area and enters another network area, the serving node (MSC/SGSN) of the network registers its location and notifies the home database of the visiting mobile terminal of the identity of the serving node. Thus, the home location database of a subscribed mobile terminal can be identified by any serving node as well as by any gateway if the identity of the mobile terminal is known.

Although illustrated as comprising only one set of network nodes (GMLC, HLR/HSS, MSC/SGSN and RAN), each of the networks A, B and C may be comprised of a number of such sets of network nodes. Further, each GMLC may be associated with more than one MSC/SGSNs of the same network.

Mobile terminals, called UE (user equipment) terminals are wirelessly associated with the networks A, B and C. For simplicity, only one UE terminal B6 is illustrated as a subscriber of the network B. When UE terminal 6B is establishing a wireless link to its home RAN 4B, the MSC/SGSN 3B is the serving node of the UE terminal B6. GMLCs 2A, 2B, 2C operate in different modes. Each GMLC operates as a requesting GMLC (designated R-GMLC) when it receives a location request from a client terminal and returns a location report to the client terminal, and operates as a home GMLC (designated H-GMLC) when it receives a location request from a R-GMLC and returns a location report to the R-GMLC. Each GMLC further operates as a visited GMLC (designated V-GMLC) when it is visited by a UE terminal whose subscription is other than the mobile communication network of the GMLC.

Each MSC/SGSN is responsible for the management of mobile terminals which are currently establishing a wireless connection with the RAN of the same mobile communication network. Therefore, when the UE terminal B6 is roaming to the network C and establishing a wireless link with the RAN C4, as shown in FIG. 1, the MSC/SGSN 3C operates as a serving node as well as a V-MSC/SGSN and the GMLC 2C operates as a V-GMLC.

The client terminal provides a location-based service to subscribed UE terminals. Prior to the transmission of a location-based service signal to a UE terminal, the client terminal must determine the current location of the UE terminal by requesting it from the location system. In this process, one or more network elements of the location system are responsible for making a decision as to whether the location area of the UE terminal is within or out of the coverage area of the location-based service of the client terminal.

Since the identity of a UE terminal is mapped beforehand to the identity of its HLR/HSS in all gateways of the location system and the location of the UE terminal is always updated whenever it moves out of the serving area of its home network, the requesting gateway is aware of the identity of the HLR/HSS of a target UE terminal when it receives a location request message requesting the location of the UE terminal.

In the following description, various embodiments of the present invention are described in terms of the control plane of the respective location systems.

FIRST EMBODIMENT

In the first embodiment, the home GMLC 2B of the target UE terminal 6B is responsible for making a decision as to whether the location area of the target UE terminal is within or out of the coverage area of the client's service.

The location system of this embodiment is configured as shown in FIG. 2 by assuming that the UE terminal 6B is roaming from its home network B to the foreign network C and its current location is requested by the client terminal 1A of the network A to which the UE terminal 6B is not subscribed. When the roaming UE terminal 6B enters the serving area of the RAN 4C, the UE terminal 6B registers its current location in the visited MSC/SGSN 3C. When this registration is performed, the identity of the visited MSC/SGSN 3C is transmitted via the V-GMLC 2C to HLR/HSS 106/HSS 5B of the subscribed UE terminal 6B where the identity of the MSC/SGSN 3C is stored as a serving node ID of the roaming UE terminal 6B. In this way, the HLR/HSS 5B knows that the UE terminal 6B is currently visiting the mobile communication network C.

Client terminal 1A includes a packet assembler/disassembler 11 and a ASP (application service provider) software module 12. PAD 11, connected via a switched communications network, not shown, to its home GMLC 2A, formulates a location request message 150 as shown in FIG. 3 and transmits the message to the GMLC 2A. PAD 11 receives a location response message from the GMLC 2A and disassembles it to determine if the received message is an error message or location information of the target UE terminal. If the response is an error message, the client terminal 1A recognizes that the target UE terminal is roaming outside of the service coverage area and abandons its location-based service to that UE terminal. If the response message notifies the location information of the target UE, the client terminal 1A uses the received location information to establish a connection through a user plane 10 and the visited MSC/SGSN 3C to the target UE terminal and causes its ASP software module 12 and provides its location-based service to the UE terminal 6B.

As shown in FIG. 3, the location request message 150 has a number of fields containing a message type, a source address (client's identifier), a destination address (phone number of target mobile UE terminal), and a service type indicating the type of location-based service the client terminal provides. The location request may further includes a service coverage field indicating a service area to which the client terminal 1A provides its location-based service. Specifically, the coverage information may include a list of country codes assigned according to the international telephone numbering plan for ISDN networks, designating the countries or areas where the client terminal provides location-based service.

When the client terminal 1A requests the location of the UE terminal 6B from the location system, it transmits the location request message to its home network A. GMLC 2A, serving as a requesting node to receive this location request message, recognizes from its destination field that GMLC 2B is the home GMLC of the UE terminal 6B and forwards the location request message to H-GMLC 2B.

As will be described later, if UE's location area is within the client's service coverage area, the home GMLC 2B forwards the client's location request to the V-GMLC 2C, which forwards it to the V-MSC/SGSN 3C. In response, the V-MSC/SGSN 3C performs a location measurement process in collaboration with RAN 4C and returns a location report to the home GMLC 2B, which is forwarded through the requesting GMLC 2A to the client terminal 1A. If the location area of UE terminal 6B is out of the coverage area of the client' service, the V-MSC/SGSN 3C returns an error message to the H-GMLC 2B, which is forwarded through the R-GMLC 2A to the client terminal 1A.

The requesting GMLC 2A includes a location requestor 21 which receives a location request message from the PAD 11 and forwards it to the home GMLC 2B and a coverage area memory 22 for storing service coverage information which may be received well in advance of the location request or contained in the location request message. Location requestor 21 receives a location response message from the home GMLC 2A and forwards it to the PAD 11.

In the H-GMLC 2B, the location request from the R-GMLC 2A is supplied to a coverage area searcher 33, a serving node ID requester 34, and a location requestor 37. Coverage area searcher 33 responds to the received location request message by making a search through a cache memory 32 which stores a plurality of frequently accessed coverage information corresponding to a plurality of sets of clients' identities and service types. Therefore, the coverage area searcher 33 uses the client's ID and service type contained in the received location request as a search key for detecting a corresponding coverage area.

If the coverage area of the client's location-based service is detected in the cache memory 32, the detected coverage information is supplied from the cache memory 32 to a comparator 36. If no coverage area is detected, the coverage area searcher 33 requests a coverage area requestor 31 to retrieve the corresponding coverage information from the coverage area memory 22 of the R-GMLC 2A. The retrieved coverage area information is stored in the cache memory 32 and supplied from the cache memory 32 to the comparator 36.

With the coverage area information being supplied to the comparator 36, the coverage area searcher 33 enables the serving node ID requestor 34 to retrieve the serving node (i.e., V-MSC/SGSN 3C) ID of the target UE terminal 6B. From the UE's ID contained in the received location request message the serving node ID requestor 34 knows that the home location database of the target UE terminal 6B is the HLR/HSS 5B to retrieve the serving node ID. The retrieved serving node ID is supplied to an LA/SNID mapping memory 35 in which a plurality serving node ID's of V-MSC/SGSNs are mapped to a plurality of country codes that represent location areas covered by all MSC/SGSNs. Corresponding to the retrieved serving node ID, the location area of the target UE terminal 6B is detected in the mapping memory 35 and supplied to the comparator 36 where it is compared with the coverage area supplied from the cache memory 32. Comparator 36 determines if the location area of the target UE terminal 6B is within or out of the coverage area of the location-based service provided by client terminal 1A.

If the UE's location area is outside of the service coverage, the comparator 36 instructs the location requestor 37 to return an error message to the location requestor 21 of R-GMLC 2A, which forwards the error message to the client terminal 1A. If the location area is within the coverage area, the comparator 36 instructs the location requester 37 to forward the client's location request message from the H-GMLC 2B to V-GMLC 2C. In response, the V-GMLC 2C performs a location measurement in collaboration with the V-MSC/SGSN 3C and RAN 4C and returns a location response message (either error message or location information of the target UE terminal) to the location requestor 37 of the H-GMLC 2B. This location response message is forwarded through the location requestors 37 and 21 to the PAD 11.

If the response message from the R-GMLC 2A contains the location information of the target UE terminal 6B, the client terminal 1A establishes a connection to the target UE terminal 6B via the user-plane to the mobile switching center (i.e., V-MSC/SGSN 3C) and RAN 4C, and the PAD 11 activates the ASP software module 12 to perform location-based service to the UE terminal 6B.

Figure 4:
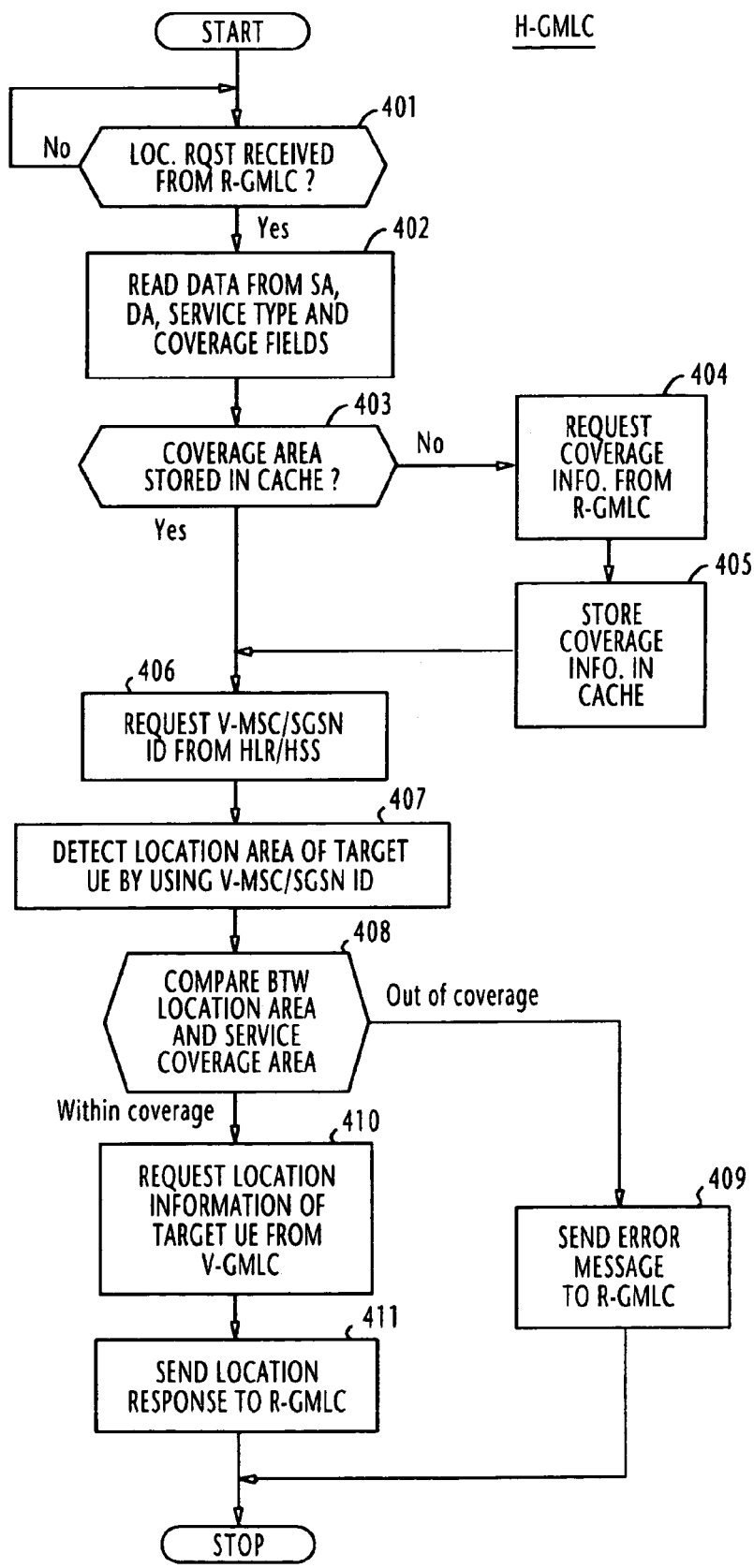
FIG. 4 is a flowchart of the operation of the home GMLC of FIG. 2.
Figure 5:
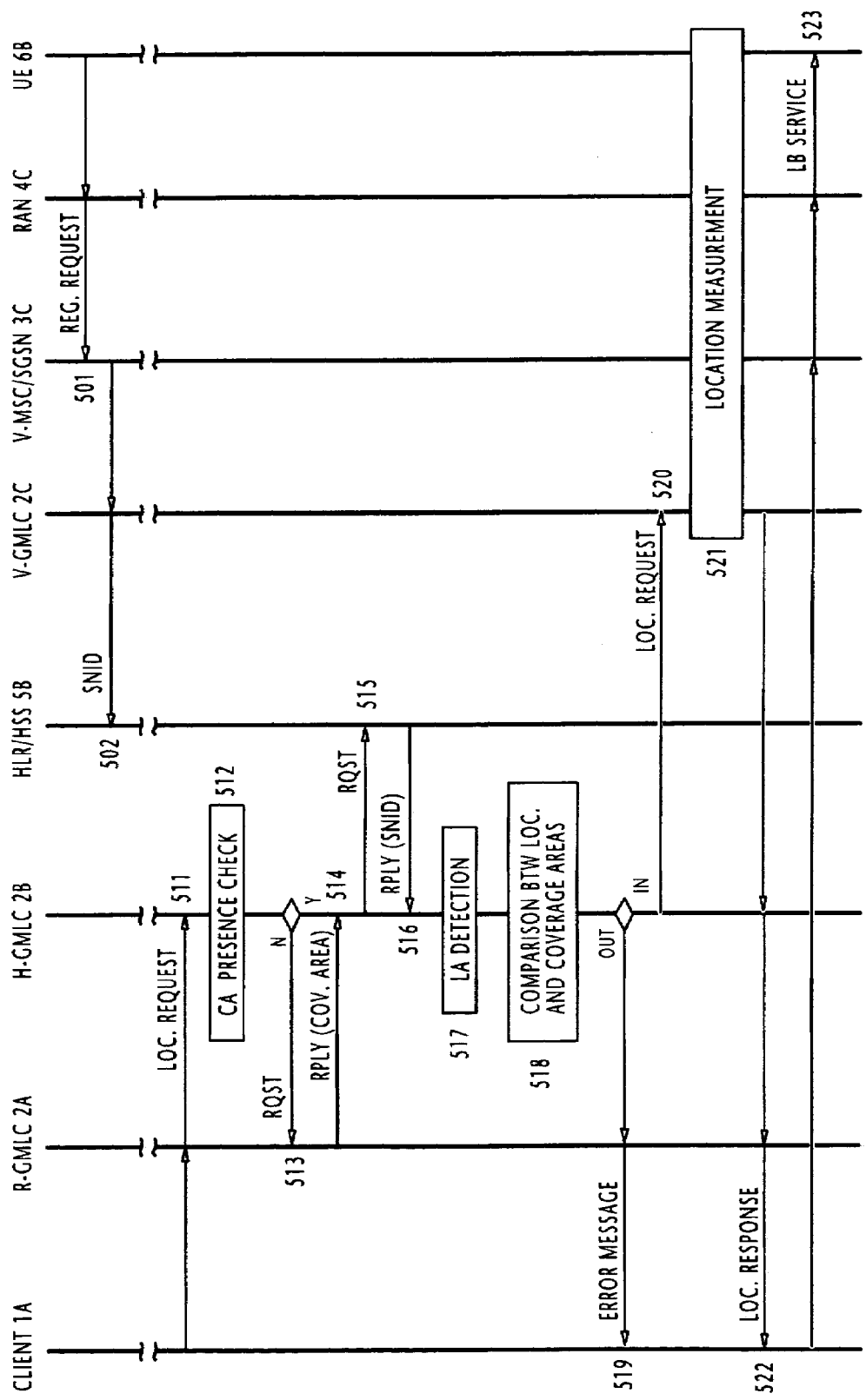
FIG. 5 is a sequence diagram for describing the operation of the location system of FIG. 2.

For a full understanding of the operation of the first embodiment of the present invention, reference is made to FIGS. 4 and 5 to describe the operation of the home GMLC 2B and a series of events that occurs in the associated nodes of the location system.

Referring first to FIG. 5, when the UE terminal 6B has moved into the serving area of MSC/SGSN 3C, it automatically sends a location registration request 501 to the RAN 4C which forwards the mese to the MSC/SGSN 3C. In response to this registration request message, the V-MSC/SGSN 3C transmits its serving node ID to the HLR/HSS 5B through the V-GMLC 2C (event 502).

When the client terminal 1A transmits a location request message 511 to the R-GMLC 2A, requesting the location of the target UE terminal 6B, the location request message is repeated to the H-GMLC 2B. In response to this message (step 401, FIG. 4), the home GMLC 2B reads data from the SA, DA and service type fields of the received location request message (step 402). Coverage area searcher 33 determines, at step 403, whether coverage area information of client's location-based service is stored in the cache memory 32 using the client's ID and service type received from the R-GMLC 2A, as indicated by event 512 in FIG. 5. If the decision at step 403 is negative, the coverage area searcher 33 instructs the coverage information requestor 31 to request the coverage area information from the R-GMLC 2A at step 404 and stores it in the cache memory 32 (events 513, 514).

If the corresponding coverage information is either detected in the cache memory 32 or retrieved from the R-GMLC 2A, the SN-ID requestor 34 is then enabled to request the serving node ID of the target UE terminal 6B from the HLR/HSS 5B (step 406, events 515, 516).

At step 407, corresponding to the serving node ID retrieved from the HLR/HSS 5B, the location area of the target UE terminal 6B is detected in the LA/SNID memory 35 (event 517). At step 408, the comparator 36 makes a comparison between the location area and the coverage area and determines if the location area is within or out of the coverage area of the client's service (event 518). If the location area is out of the coverage area, flow proceeds from step 408 to step 409 to send an error message from the location requestor 37 to the R-GMLC 2A, which is forwarded by R-GMLC 2A to the client terminal (event 519). If the location area is within the coverage area of the client's service, flow proceeds to step 410 to forward the client's location request to the V-GMLC 2C (event 520). V-GMLC 2C requests the location information of the UE terminal 6B from the V-MSC/SGSN 3C. In response, the V-MSC/SGSN 3C performs a location measurement procedure 521 in collaboration with the RAN 4C and determines the location of the target UE terminal 6B and returns a location response message 521 to the H-GMLC 2B. Home GMLC 2B forwards the location response message to the R-GMLC 2A (step 411, event 522). Client terminal 1A establishes a connection to the UE terminal 6B to perform a location-based service to the target UE terminal (event 523).

SECOND EMBODIMENT

Figure 6:
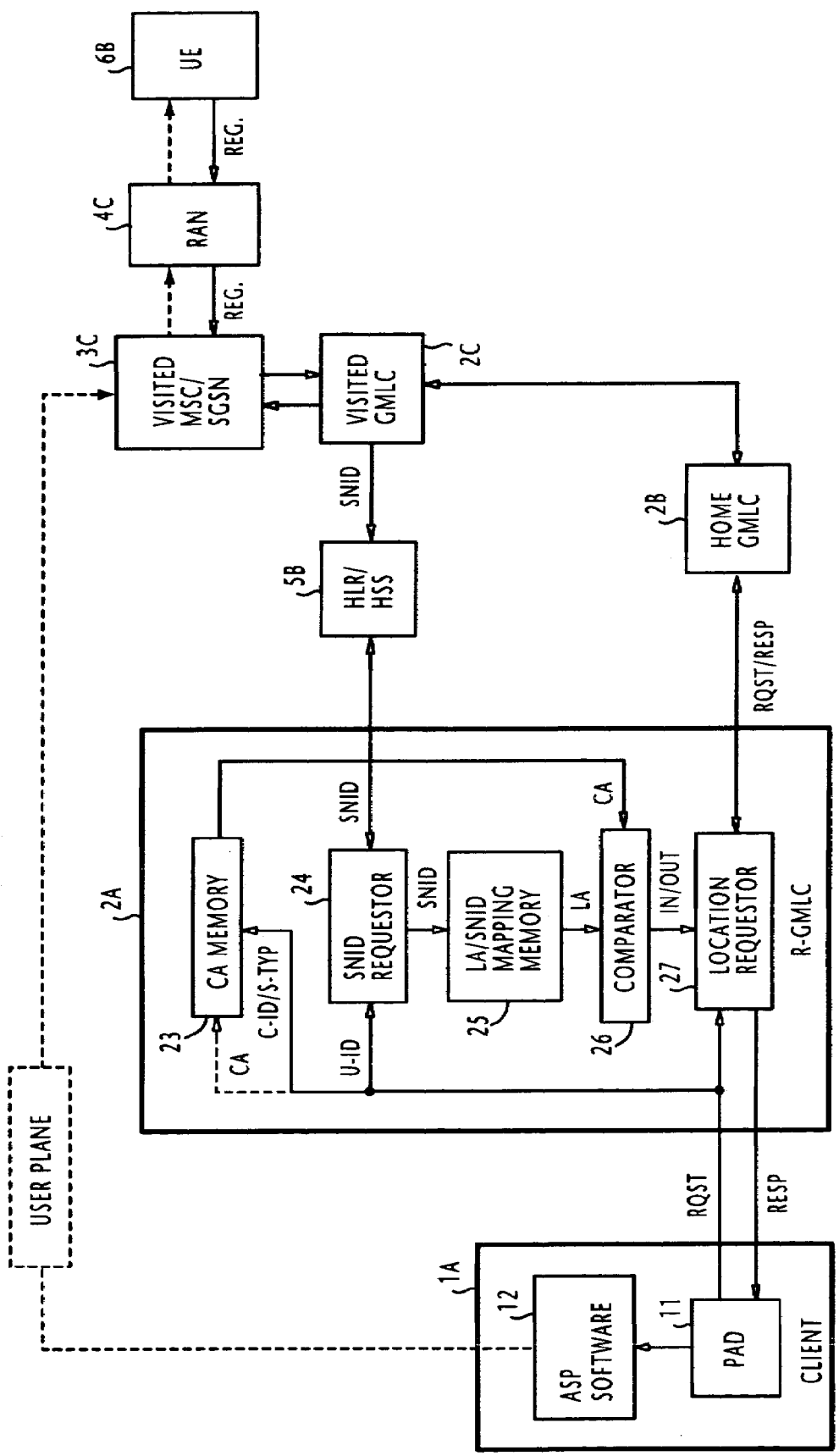
FIG. 6 is a block diagram of a location system according to a second embodiment of the present invention based on the network configuration of FIG. 1, in which the requesting GMLC is responsible for making an in/out area decision.

FIG. 6 is a block diagram of the location system configured according to a second embodiment of the present invention. In the second embodiment, the requesting GMLC 2A is responsible for making a decision as to whether the location area of the target UE terminal 6B roaming to the network C is within or outside of the client's service coverage area. If the location area is within the service coverage area, the requesting GMLC 2A forwards the location request message of the client terminal to the home GMLC 2B, where the message is checked for privacy. If the message is verified, the home gateway 2B forwards the message to the visited GMLC 2C, which in turn requests the location information of the target UE terminal from the serving node 3C. If the location area of UE terminal is out of the service coverage area, the requesting GMLC 2A formulates an error message and transmits it to the client terminal 1A.

More specifically, in the requesting GMLC 2A, the location request message from the client terminal 1A is supplied to a coverage area memory 23, a serving node ID requestor 24, and a location requestor 27. Coverage area memory 23 stores a plurality of service coverage information corresponding to a plurality of sets of clients' identities and service types in advance of the location request message. Corresponding to the client's ID and service type contained in the received location request, service coverage information is read out of the coverage area memory 23 and supplied to a comparator 26. At the same time, the serving node ID requestor 24 reads the UE's ID from the DA field of the received location request message and retrieves the serving node ID of the target UE terminal 6B from the HLR/HSS 5B. The retrieved serving node ID is supplied to an LA/SNID mapping memory 25 which provides mapping of a plurality of serving node IDs of V-MSC/SGSNs to a plurality of location area information representing location areas covered by these serving nodes. In other words, the serving node ID represents a geographical area covered by the serving node, and hence the location area of a UE terminal can be ascertained by a serving node identity. Thus, the location area of the target UE terminal 6B is detected in the mapping memory 25 corresponding to the retrieved serving node ID, and supplied to the comparator 26 where it is compared with the coverage area represented by service coverage information retrieved from the coverage area memory 23. Comparator 26 determines whether the location area of the target UE terminal 6B is within or out of the coverage area of the location-based service provided by the client terminal 1A.

If the UE's location area is out of the service coverage area, the comparator 26 instructs the location requestor 27 to formulate and transmit an error message to the client terminal 1A. If the location area is within the coverage area, the comparator 26 instructs the location requestor 27 to forward the client's location request message to the H-GMLC 2B. Since the home gateway 2B is operated by a network operator different from the operator of the requesting gateway 2A, the message is checked for privacy in the home gateway 2B. If the message is verified, the H-GMLC 2B repeats the message to the V-GMLC 2C, which in turn requests the V-MSC/SGSN 3C to perform a location measurement process in collaboration with the RAN 4C and return a location response (report) message (either error message or location information of the target UE terminal) to the location requestor 27. The location response message from the V-GMLC 2C is sent back through the gateways 2B and 2A to the client's PAD 11.

Similar to the first embodiment, if the location response message contains the location information of the target UE terminal 6B, the client terminal 1A establishes a connection through the user plane to the target UE terminal 6B via the V-MSC/SGSN 3C and RAN 4C and the PAD 11 activates the ASP software module 12 to perform location-based service to the UE terminal 6B.

Figure 7:
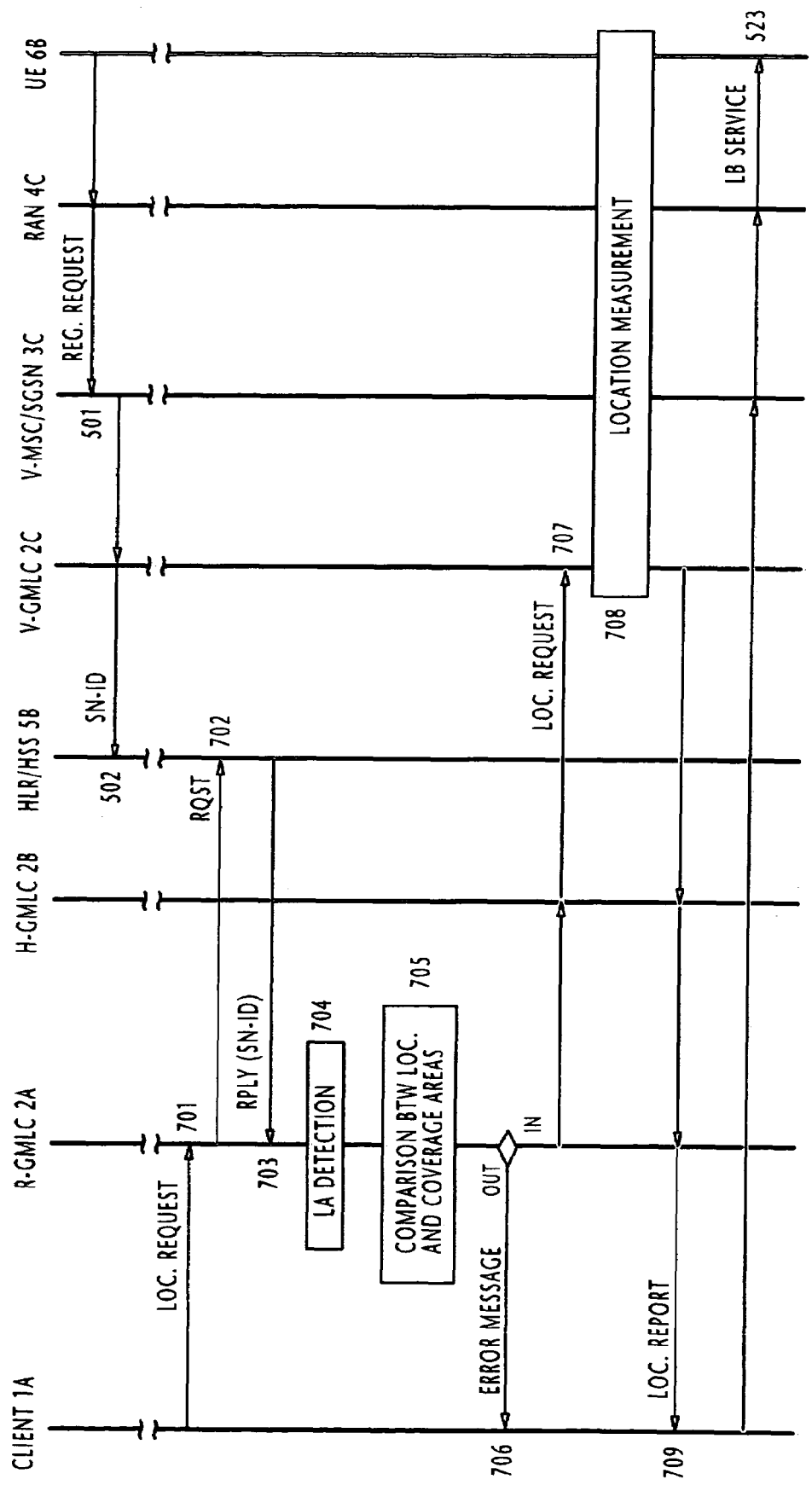
FIG. 7 is a sequence diagram for describing the operation of the location system of FIG. 6.

A sequence diagram for describing the operation of the second embodiment is shown in FIG. 7 in which events corresponding to those in FIG. 5 are marked by the same numerals as those in FIG. 5 and the description there of is omitted. When the client terminal 1A transmits a location request message 701 to the network, the R-GMLC 2A receives the message and reads data from the SA, DA and service type fields of the received location request message. The coverage area information of client's location-based service is read from the coverage area memory 23 and supplied to the comparator 26. Then, the serving node ID requestor 24 requests the serving node ID of the target UE terminal 6B from the HLR/HSS 5B (events 702, 703). The location area of the target UE terminal 6B is detected in the LA/SNID mapping memory 25 corresponding to the retrieved serving node ID (event 704). Comparator 26 determines if the location area is within or out of the coverage area of the client's service (event 705). If the location area is out of the coverage area, an error message is sent from the location requestor 27 to the client terminal (event 706). If the location area is within the coverage area of the client's service, the client's location request is sent from the location requestor 27 to V-GMLC 2C via H-GMLC 2B (event 707). V-GMLC 2C requests the location information of the UE terminal 6B from the V-MSC/SGSN 3C, which in turn performs a location measurement procedure 708 in collaboration with the RAN 4C and determines the location of the target UE terminal 6B and returns a location response message via H-GMLC 2B to R-GMLC 2A, which forwards the message to the client terminal 1A (event 709). Client terminal 1a establishes a connection through the user plane to the UE terminal 6B to perform a location-based service to the target UE terminal.

THIRD EMBODIMENT

In the previous embodiments, the relationships between location areas of UE terminals and serving node (MSC/SGSN) identities are mapped in the memory 35 of network B and the memory 25 of network A. However, there is a possibility that these mapping relationships can only be established in the network C. If the location of a UE terminal visiting the network C is requested by the client terminal 1A, the location response would result in the client terminal 1A receiving an error message. The third embodiment of the present invention is aimed at eliminating such fruitless location requests.

Figure 8:
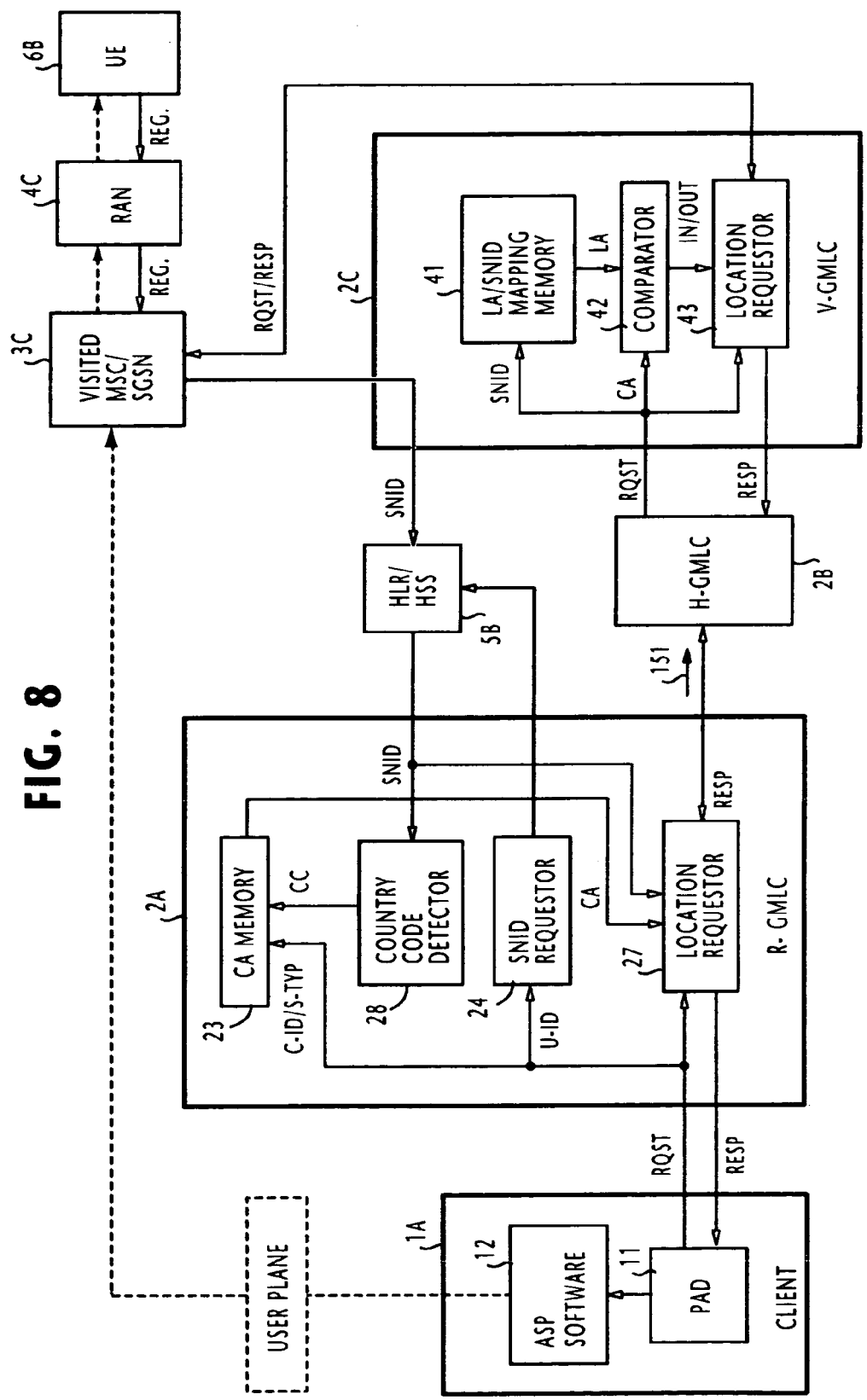
FIG. 8 is a block diagram of a location system according to a third embodiment of the present invention based on the network configuration of FIG. 1, in which the visited GMLC is responsible for making an in/out area decision.
Figure 9:
FIG. 9 shows the data structure of a location request message transmitted from the requesting GMLC of FIG. 8.

The location system of the third embodiment is configured as shown in FIG. 8. Similar to FIG. 6, the R-GMLC 2A includes coverage area memory 23 for storing a plurality of service coverage information corresponding to a plurality of sets of client IDs and service types which have been received from client terminals. A location request message from the client terminal 1A, which is received by the R-GMLC 2A, is supplied to the coverage area memory 23, serving node ID requestor 24 and location requestor 27. In response, the serving node ID requestor 24 retrieves the serving node ID from the HLR/HSS 5B of the target UE terminal 6B. The retrieved serving node ID is supplied to a country code detector 28 and the location requestor 27. Country code detector 28 extracts from the received serving node ID the country code of a geographical area to which the UE terminal 6B is visiting and feeds it to the coverage area memory 23. Using the detected country code as well as the client's ID and service type contained in the location request message, the service coverage information of the client's service is selected from the coverage area memory 23 and fed to the location requestor 27. As shown in FIG. 9, the location requestor 27 formulates a location request message 151 containing the supplied serving node ID and service coverage information and transmits the message via the H-GMLC 2B to the V-GMLC 2C.

V-GMLC 2C includes an LA/SNID mapping memory 41, a comparator 42 and a location requestor 43. LA/SNIC mapping memory 41 provides mapping of a plurality of serving node ID's of all V-MSC/SGSNs of the network C to a plurality of location area information representing geographical areas served by all V-MSC/SGSNs of network C. Corresponding to the serving node ID contained in the location request message 151, the location area of the target UE terminal 6B is retrieved from the mapping memory 41 and supplied to the comparator 42. Comparator 42 compares the service coverage information (CA) contained in the received message with the location area (LA) represented by the data retrieved from the mapping memory 41 and determines if the location area of the target UE terminal 6B is within or out of the service coverage area.

If the UE's location area is out of the service coverage area, the comparator 42 instructs the location requestor 43 to return an error message to the H-GMLC 2B, which is repeated through the location requestor 27 of R-GMLC 2A to the client terminal 1A. If the location area is within the coverage area, the comparator 42 instructs the location requester 43 to forward the client's location request message to the V-GMLC 2C. In response, the V-GMLC 2C performs a location measurement process in collaboration with the V-MSC/SGSN 3C and RAN 4C and returns a location response message (either error message or location information of the target UE terminal) from the location requestor 43 to the H-GMLC 2B, which is repeated through the R-GMLC 2A to the client terminal 1A.

Figure 10:
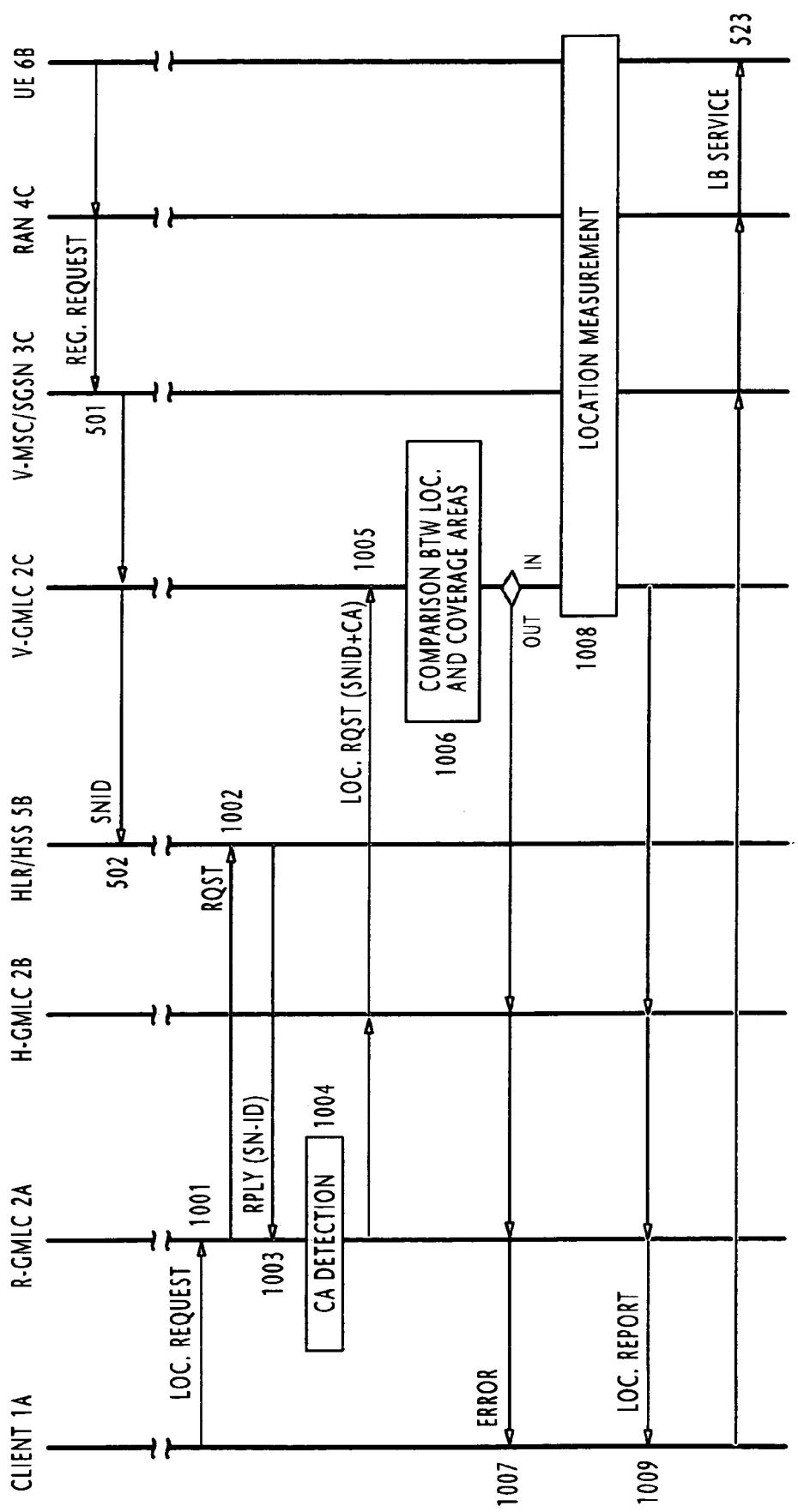
FIG. 10 is a sequence diagram for describing the operation of the location system of FIG. 8.

A sequence diagram of the operation of the third embodiment is shown in FIG. 10. UE terminal 6B is first registered in the V-MSC/SGSN 3C. In response to this registration, the node ID of the V-MSC/SGSN 3C is sent to the HLR/HSS 5B and stored as a serving node ID of the UE terminal 6B (event 1000, FIG. 10).

When the client terminal 1A transmits a location request message 1001 to the network, the R-GMLC 2A receives the message and reads data from its SA, DA and service type fields. Then, the serving node ID requestor 24 requests the serving node ID of the target UE terminal 6B from the HLR/HSS 5B (events 1002, 1003). From the retrieved serving node ID, the country code detector 28 extracts the country code of the country or geographical area where the target UE terminal is visiting. Corresponding to the extracted country code, service coverage information is retrieved from the coverage area memory 23 and supplied to the location requestor 27 (event 1004). A location request message containing the serving node ID and the coverage area information is transmitted from the location requestor 27 to the V-GMLC 2C via the H-GMLC 2B (event 1005).

In the V-GMLC 2C, the location area of the UE terminal 6B is detected from the mapping memory 41 using the serving node ID contained in the location request message and compared in the comparator 42 with the coverage area information contained in the same location request message. Comparator 42 determines if the location area is within or out of the coverage area of the client's service (event 1006). If the location area is out of the coverage area, an error message is sent from the location requestor 43 to the client terminal (event 1007). If the location area is within the coverage area of the client's service, the location request is forward from the location requestor 43 to the V-GMLC 2C. V-GMLC 2C requests the location information of the UE terminal 6B from the V-MSC/SGSN 3C, which in turn performs a location measurement procedure (event 1008) in collaboration with the RAN 4C and determines the location of the target UE terminal 6B and returns a location response message to the R-GMLC 2A, which forwards the message to the client terminal 1A (event 1009). Client terminal 1A establishes a connection to the UE terminal 6B to perform a location-based service to the target UE terminal.

FOURTH EMBODIMENT

It is desirable that the coverage area information maintained in the R-GMLC 2A and the LA/SNID mapping relationships maintained in the R-GMLC or H-GMLC be constantly updated to reflect most recent status.

Figure 11:
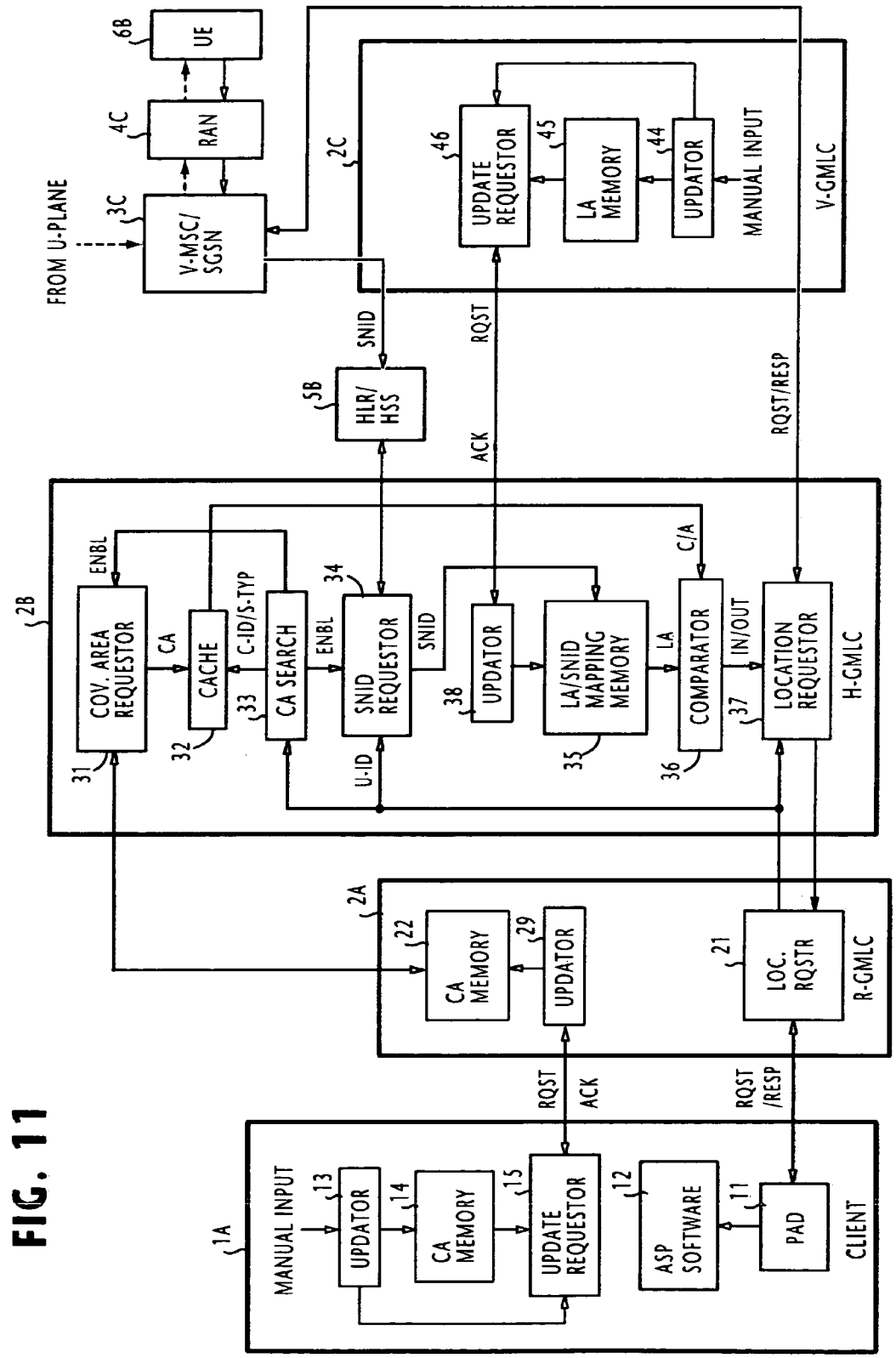
FIG. 11 is a block diagram of a location system according to a fourth embodiment of the present invention based on the network configuration of FIG. 1, in which the coverage area information and location area information of the decision-making home GMLC are constantly updated by data supplied from the client terminal and the visited GMLC.

The fourth embodiment of the present invention is shown in FIG. 11, in which parts corresponding to those in FIG. 2 are marked with the same numerals as used in FIG. 2 and the description thereof is omitted.

V-GMLC 2C includes an updator 44, a location area memory 45 and an update requestor 46. Location area memory 45 stores a plurality of areas served by the V-MSC/SGSN 3C. Updator 44 receives most recent data which may be manually entered by the operator of network C whenever a change occurs in the serving areas of the MSC/SGSN 3C due to an alternation or expansion of the network C. Update requestor 46 formulates an update request message from the area information of the memory 45 and the most recent data and transmits the update message to the H-GMLC 2B.

H-GMLC 2B is of the same configuration as that shown in FIG. 2 with the exception that an updator 38 is provided for receiving the update request message from the update requestor 46 of V-GMLC 2C and updating the LA/SNID mapping memory 35 to reflect the change made in the LA memory 45 of V-GMLC 2C. Updator 38 then returns an acknowledgment message to the update requestor 46.

Client terminal 1A includes an updator 13, a coverage area memory 14 and an update requestor 15. Coverage area memory 14 stores a plurality of coverage area information indicating a number of coverage areas of a particular service type if the client terminal provides only one location-based service or provides mapping of a plurality of coverage information to a number of service types if the client terminal provides more than one location-based services. Most recent data is manually input to the updator 13 whenever expansion or alternation is made in the service coverage area stored in the memory 14. Update requestor 15 formulates an update request message from the information stored in the memory 14 and the most recent data and transmits the update message to the R-GMLC 2A.

R-GMLC 2A includes an updator 29 which responds to the update request message from the client terminal 1A by updating the coverage area memory 22 and returns an acknowledgment message to the update requestor 15. R-GMLC 2A may additionally includes an update requester, not shown, for transmitting an update request message to the coverage area requestor 31 of H-GMLC 2B to update the cache memory 32 when the coverage memory 22 is updated.

In the H-GMLC 2B, the cache memory 32 is updated with the coverage information of the R-GMLC 2A when the coverage area searcher 33 determines that the coverage information of the requesting client terminal is not found in the cache memory 32 and enables the coverage area requestor 31 to request it from the coverage area memory 22.

Figure 12:
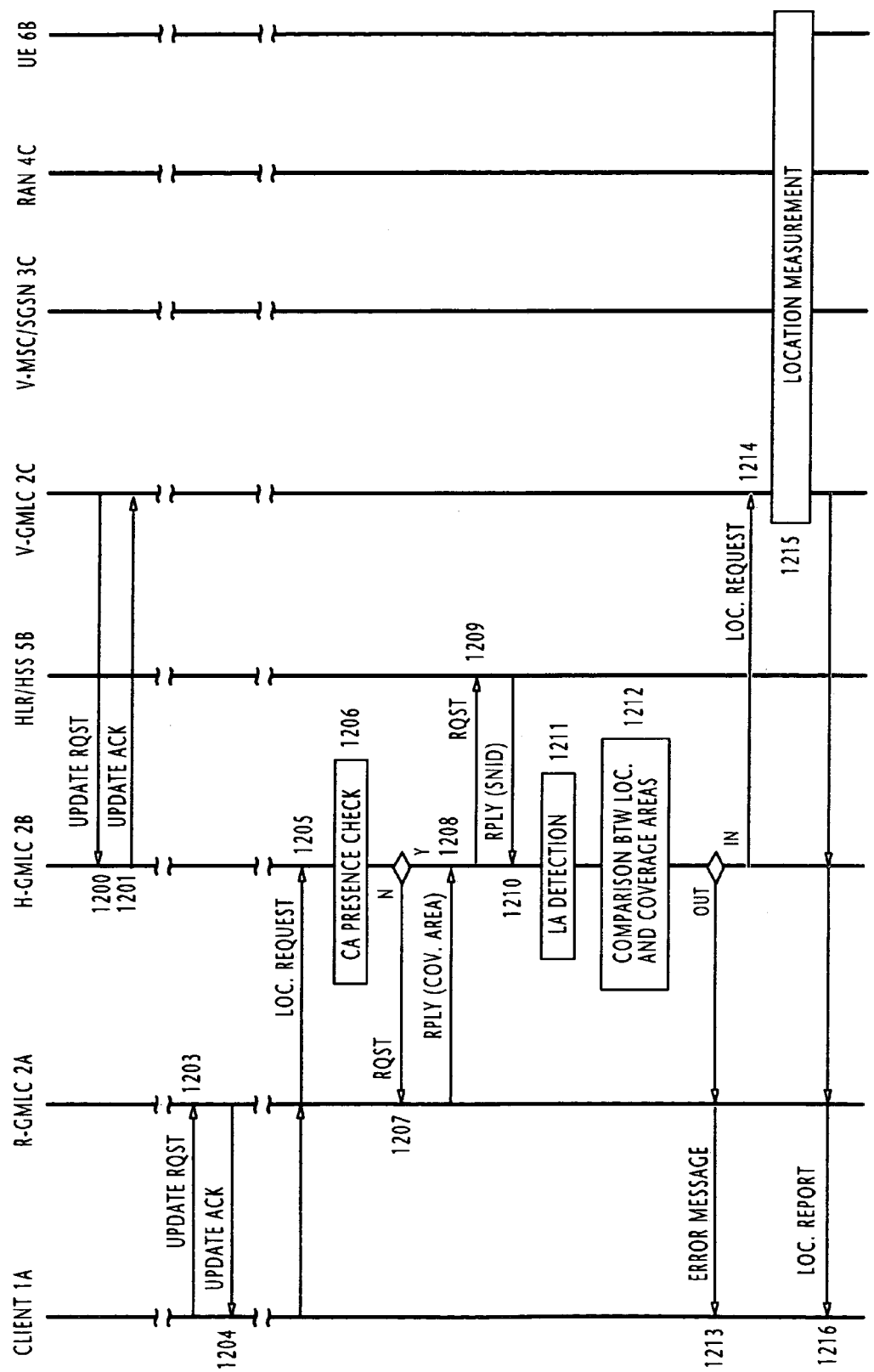
FIG. 12 is a sequence diagram for describing the operation of the location system of FIG. 11.

Following the location registration of the roaming UE terminal 6B to the V-MSC/SGSN 3C in the same manner as described in the previous embodiments, the operation of the location system of FIG. 11 proceeds as shown in FIG. 12.

When an update is made is the LA memory 45 of V-GMLC 2C, an update request message is sent to the H-GMLC 2B (event 1201) to update the LA/SNID mapping memory 35 and an update acknowledgment message is returned to the V-GMLC 2C (event 1202). If an update is made in the coverage area memory 14 of the client terminal 1A, an update request message is sent to the R-GMLC 2A (event 1203) to update the coverage area memory 22 and an update acknowledgment message is returned to the client terminal (event 1204).

When the client terminal 1A transmits a location request message 1205 via the R-GMLC 2A to the H-GMLC 2B, the latter determines if the coverage area information of the client's location-based service is stored in the cache memory 32 using the client's ID and service type (event 1206). If no corresponding coverage information is detected, the H-GMLC 2B requests the coverage area information from the R-GMLC 2A (event 1207) and stores it in the cache memory 32 (event 1208). If the corresponding coverage information is detected in the cache memory 32, the H-GMLC 2B requests the serving node ID of the target UE terminal 6B from the HLR/HSS 5B (events 1209, 1210). Corresponding to this serving node ID, the location area of the target UE terminal 6B is detected in the LA/SNID memory 35 (event 1211) and a comparison is made between the location and coverage areas (event 1212). If the location area is within or out of the coverage area of the client's service (event 1213). If the location area is out of the coverage area of the client's service, an error message is sent from H-GMLC 2B and forwarded through R-GMLC 2A to the client terminal (event 1213). If the location area is within the coverage area, the client's location request is forwarded to the V-GMLC 2C (event 1214). V-GMLC 2C requests the location information of the UE terminal 6B from the V-MSC/SGSN 3C. In response, the V-MSC/SGSN 3C performs a location measurement procedure 1215 in collaboration with the RAN 4C and determines the location of the target UE terminal 6B and returns a location response message 1216 through the H-GMLC 2B and R-GMLC 2A to the client terminal. Client terminal 1A establishes a connection to the UE terminal 6B to perform a location-based service to the target UE terminal.

FIFTH EMBODIMENT

Figure 13:
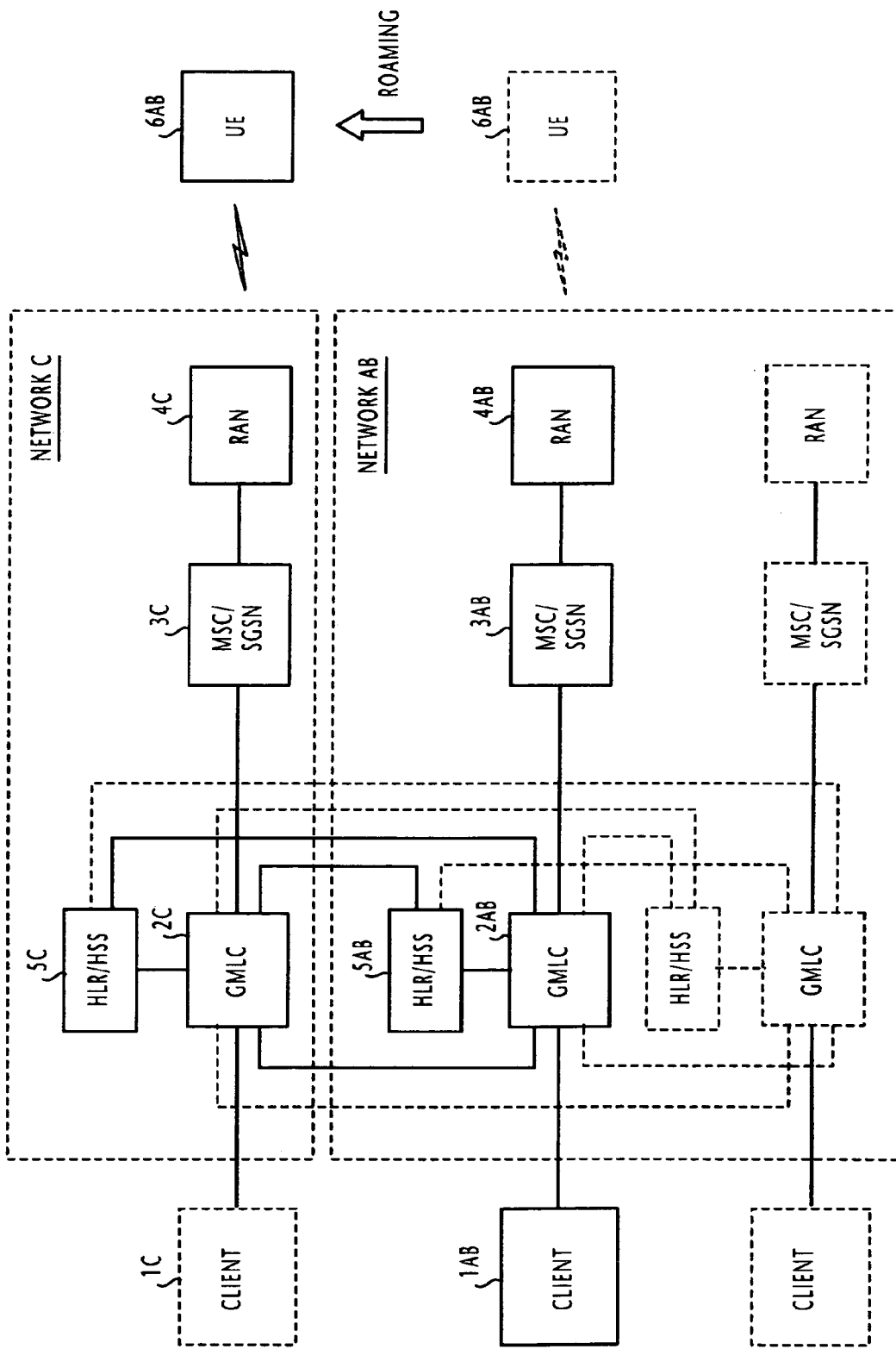
FIG. 13 is a block diagram of a location system according to another network configuration of the present invention in which two (requesting and home) mobile communication networks are owned and operated by a common network operator and a third (visited) mobile communication network is owned and operated by another network operator.
Figure 14:
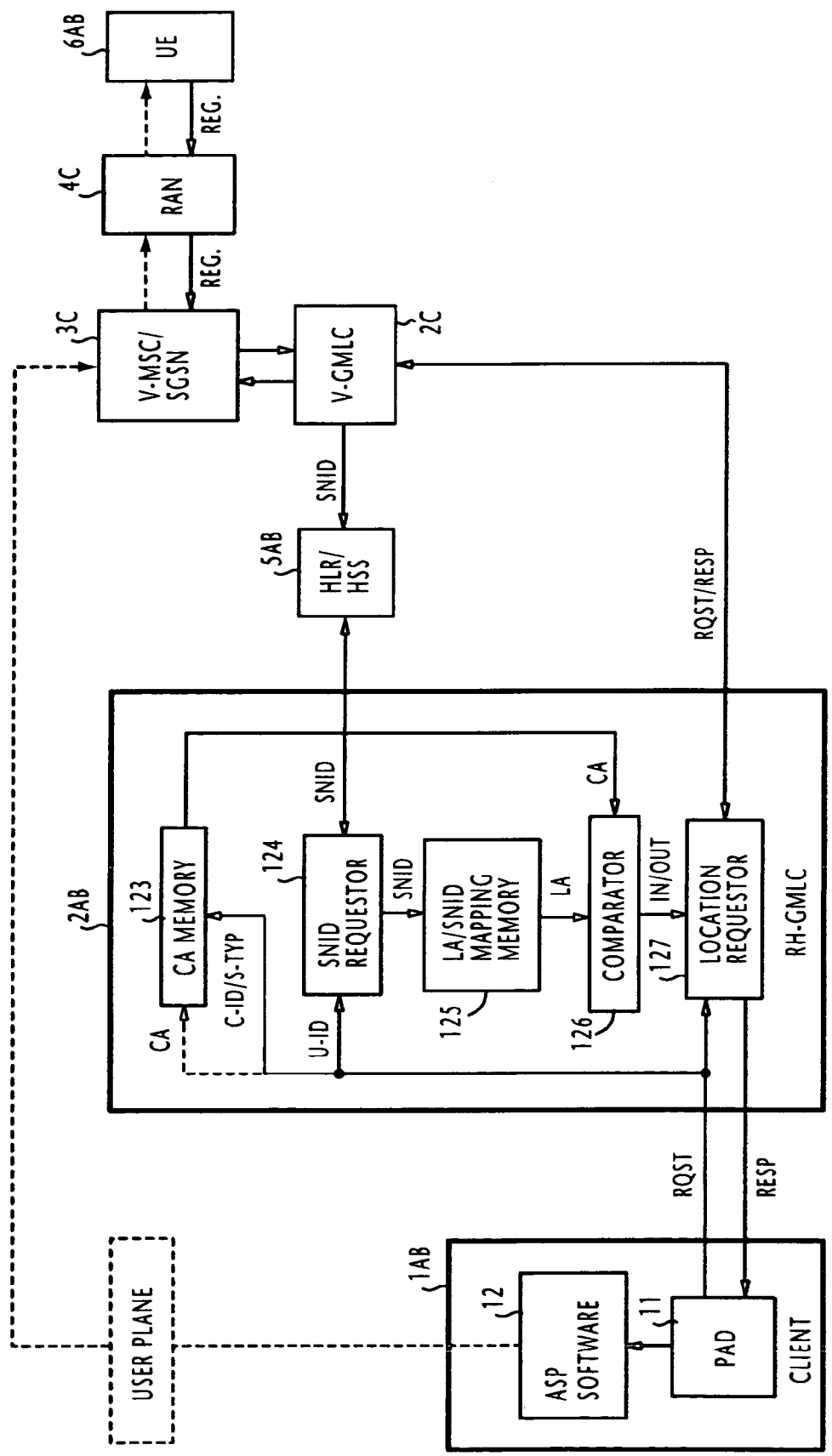
FIG. 14 is a block diagram of a location system according to a fifth embodiment of the present invention based on the network configuration of FIG. 13, in which a single GMLC operates as a requesting and home gateway as well as a decision-making gateway.

In the previous embodiments, the networks A, B and C owned and operated by network operators A, B and C, respectively. In the fifth embodiment, the networks A and B are operated by a common network operator AB as indicated by a representative network AB as shown in FIG. 13. In the following description, it is assumed that a client terminal 1AB of network AB is requesting the location of a UE terminal 6AB of the same network which is roaming to the network C. In this embodiment, the GMLC 2AB operates as a requesting GMLC as well as a home GMLC, or RH-GMLC, and the GMLC 2C as a visited GMLC, as shown in FIG. 14.

RH-GMLC 2AB is responsible for making a decision as to whether the coverage area of the client's service is within or out of the location area of the target UE terminal 6AB.

In the RH-GMLC 2AB, the location request from the client terminal 1AB is supplied to a coverage area memory 123, a serving node ID requestor 124, and a location requestor 127. Coverage area memory 123 stores a plurality of coverage information corresponding to a plurality of sets of client IDs and service types. In response to the location request, the coverage area information is read out of the coverage area memory 123 corresponding to the client's ID and service type contained in the received message and supplied to a comparator 126. Serving node ID requestor 124 reads the UE's ID from the received message and requests the serving node ID of the target UE terminal 6AB from the HLR/HSS 5AB. The serving node ID from the HLR/HSS 5AB is supplied to a LA/SNID mapping memory 125 which provides mapping of a plurality of serving node IDs of V-MSC/SGSNs and location areas to which roaming UE terminals are visiting. Corresponding to the retrieved serving node ID, the location area of the target UE terminal 6B is detected in the mapping memory 125 and supplied to the comparator 126 where it is compared with the coverage area data supplied from the coverage area memory 123. Comparator 126 determines whether the location area of the target UE terminal 6AB is within or out of the coverage area of the location-based service provided by the client terminal 1AB.

If the UE's location area is out of the service coverage area, the comparator 126 instructs the location requestor 127 to formulate and transmit an error message to the client terminal 1AB. If the location area is within the coverage area, the comparator 126 instructs the location requestor 127 to forward the client's location request message to the V-GMLC 2C. In response, the V-GMLC 2C requests the V-MSC/SGSN 3C to perform a location measurement process in collaboration with the RAN 4C and returns a location response message (either error message or location information of the target UE terminal) to the location requestor 127. The location response message from the V-GMLC 2C is forwarded to the PAD 11.

Figure 15:
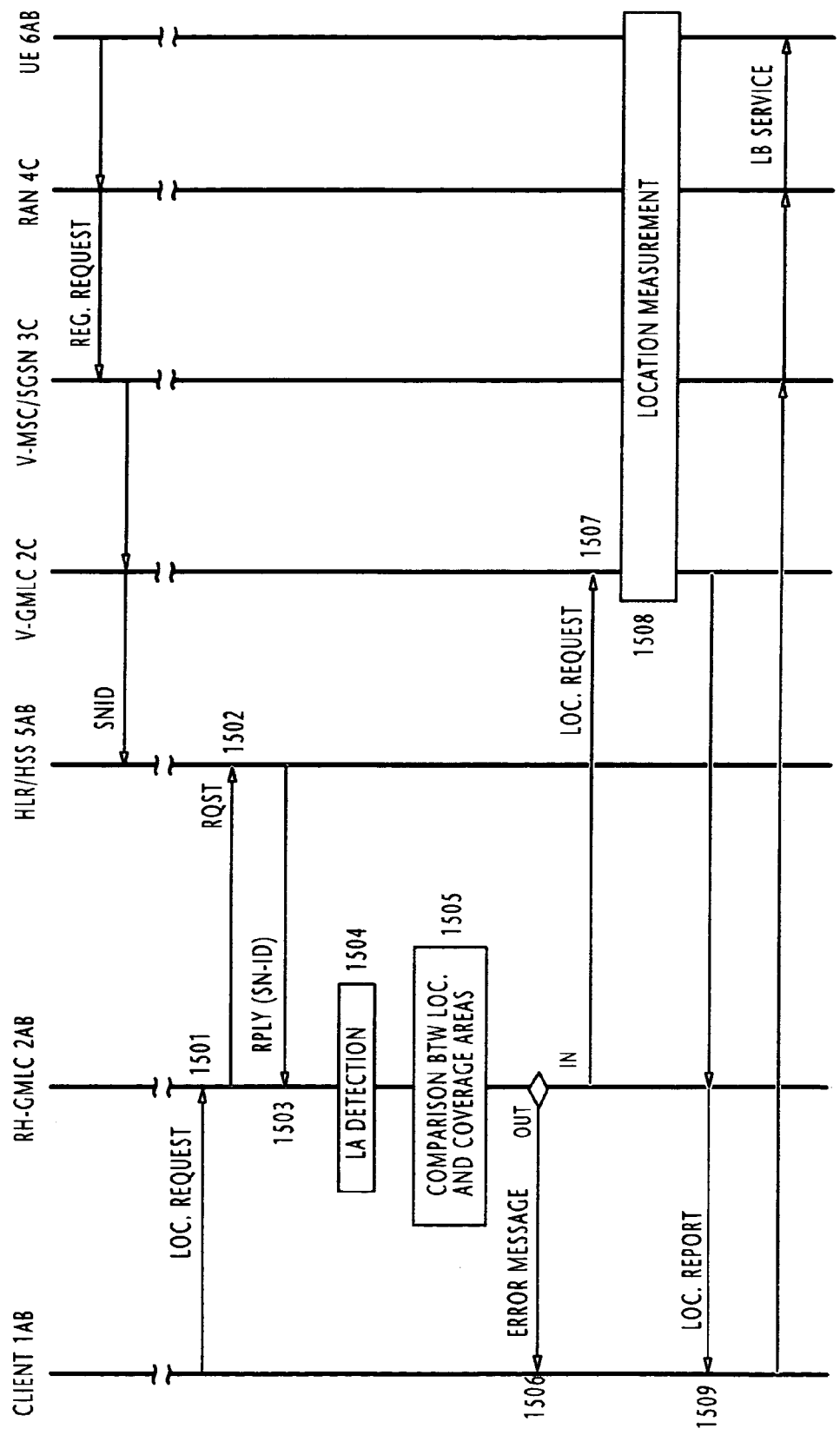
FIG. 15 is a sequence diagram for describing the operation of the location system of FIG. 14.

A sequence diagram for describing the operation of the second embodiment is shown in FIG. 15. UE terminal 6AB is first registered in the V-MSC/SGSN 3C. In response to this registration, the node ID of the V-MSC/SGSN 3C is sent to the HLR/HSS 5AB and stored as a serving node ID of the UE terminal 6AB (event 1500.

When the client terminal 1AB transmits a location request message 1501 to the network, the R-GMLC 2AB receives the message and reads data from the SA, DA and service type fields of the received location request message. The coverage area information of client's location-based service is read from the coverage area memory 123 and supplied to the comparator 126. Then, the serving node ID requestor 124 requests the serving node ID of the target UE terminal 6AB from the HLR/HSS 5AB (events 1502, 1503). The location area of the target UE terminal 6AB is detected in the LA/SNID mapping memory 125 corresponding to the retrieved serving node ID (event 1504). Comparator 126 determines if the location area is within or out of the coverage area of the client's service (event 1505). If the location area is out of the coverage area, an error message is sent from the location requestor 127 to the client terminal (event 1506). If the location area is within the coverage area of the client's service, the client's location request is sent from the location requestor 127 to the V-GMLC 2C (event 1507). V-GMLC 2C requests the location information of the UE terminal 6AB from the V-MSC/SGSN 3C, which in turn performs a location measurement procedure 1508 in collaboration with the RAN 4C and determines the location of the target UE terminal 6AB and returns a location response message to the RH-GMLC 2AB, which forwards the message to the client terminal 1AB (event 1509). Client terminal 1a establishes a connection to the UE terminal 6AB to perform a location-based service to the target UE terminal.

SIXTH EMBODIMENT

Figure 16:
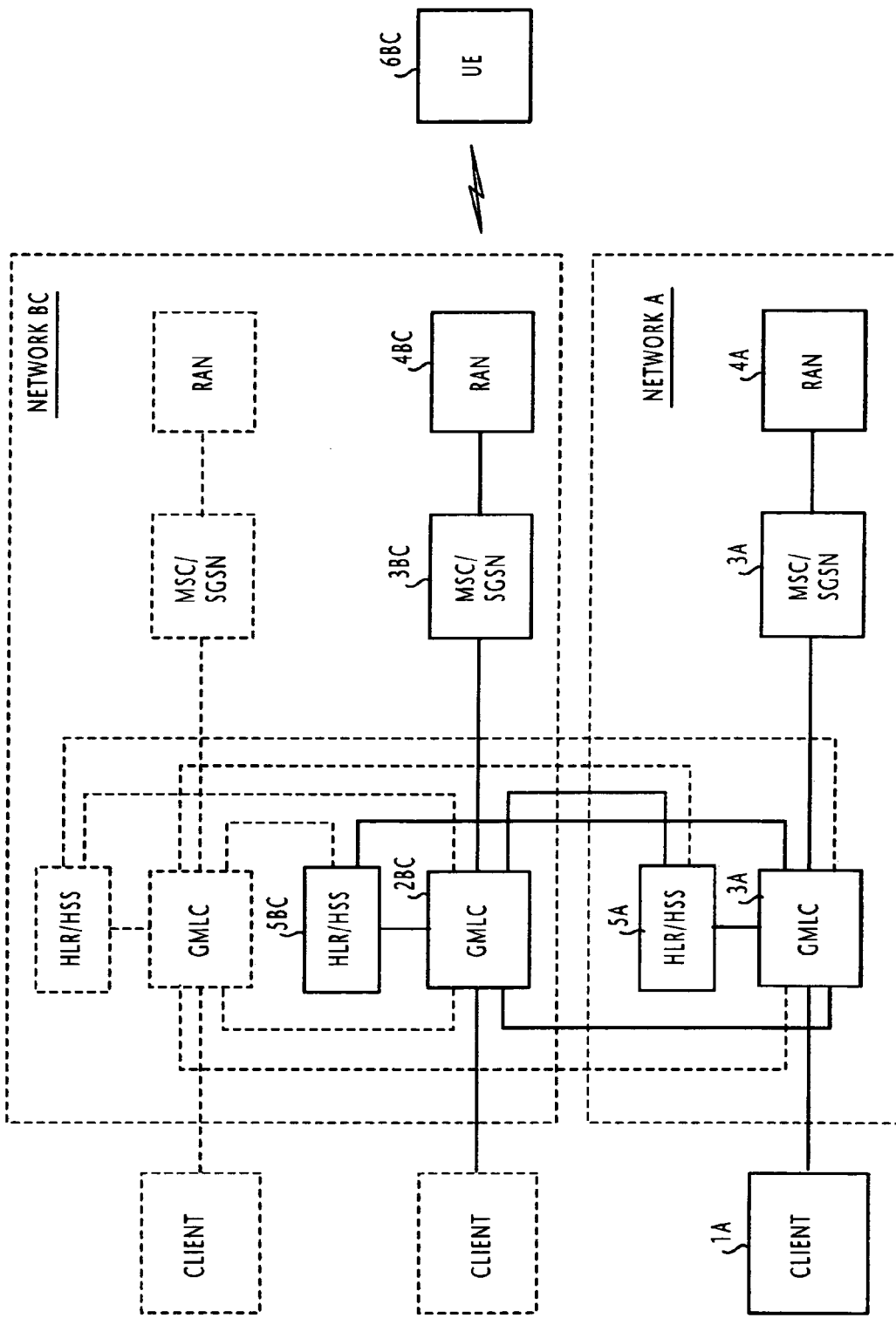
FIG. 16 is a block diagram of a location system according to a third network configuration of the present invention in which two (home and visited) mobile communication networks are owned and operated by a common network operator and a third (requesting) mobile communication network is owned and operated by another network operator.
Figure 17:
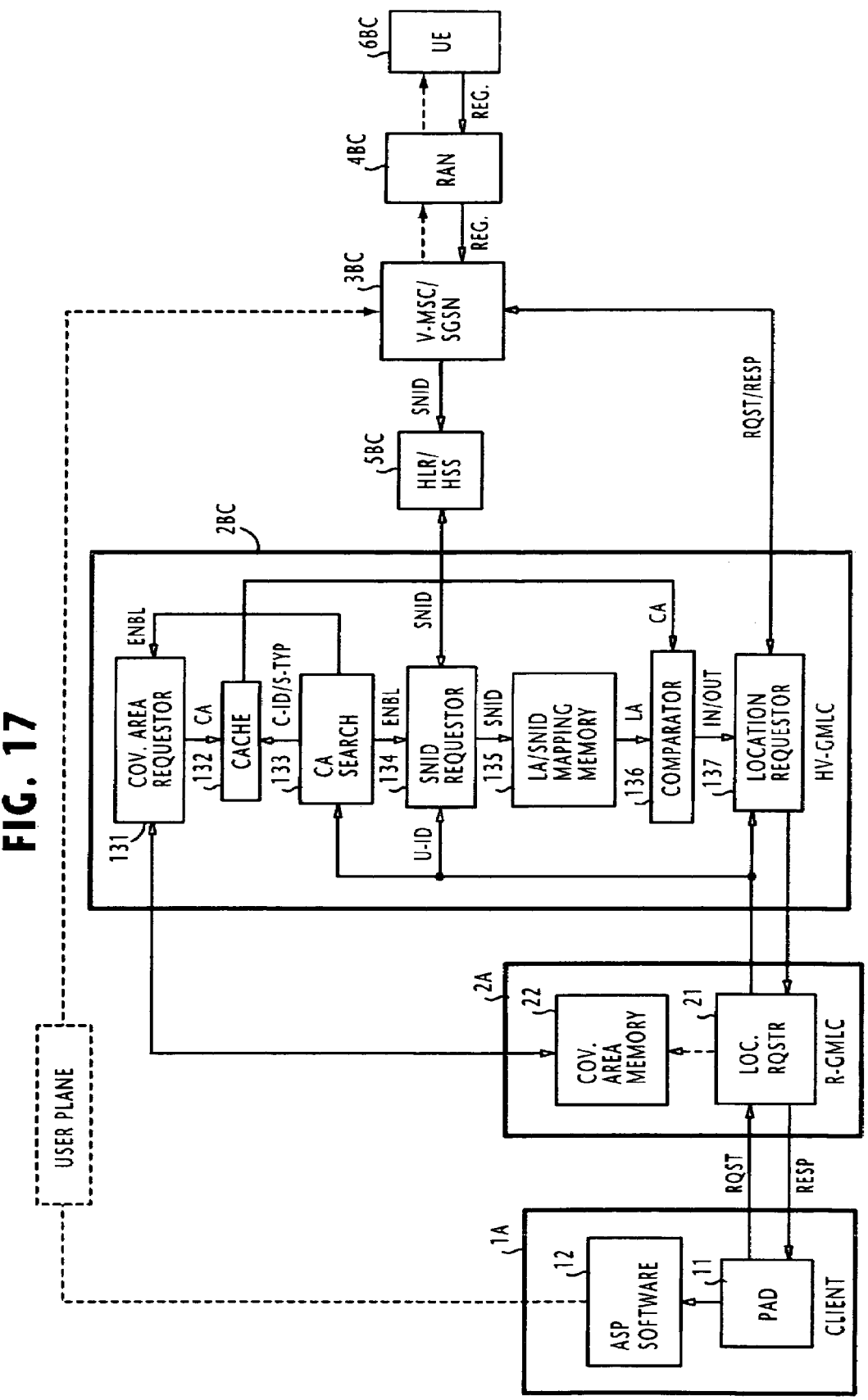
FIG. 17 is a block diagram of a location system according to a fifth embodiment of the present invention based on the network configuration of FIG. 16, in which a single GMLC operates as a home and visited gateway as well as a decision-making gateway.

In the sixth embodiment, the networks B and C are operated by a common network operator BC as represented by a network BC, as shown in FIG. 16. It is assumed that a client terminal 1A of network A is requesting the location of a UE terminal 6BC of network BC which is currently connected to the home network BC. In this embodiment, the GMLC 2A operates as a requesting GMLC, and GMLC 2BC operates as a home and a visited GMLC, or HV-GMLC which is responsible for making the in/out area decision, as shown in FIGS. 17 and 18.

UE terminal 6BC is first registered in the V-MSC/SGSN 3 BC. In response to this registration, the node ID of the V-MSC/SGSN 3BC is sent to the HLR/HSS 5BC and stored as a serving node ID of the UE terminal 6BC (event 1800, FIG. 18).

Figure 18:
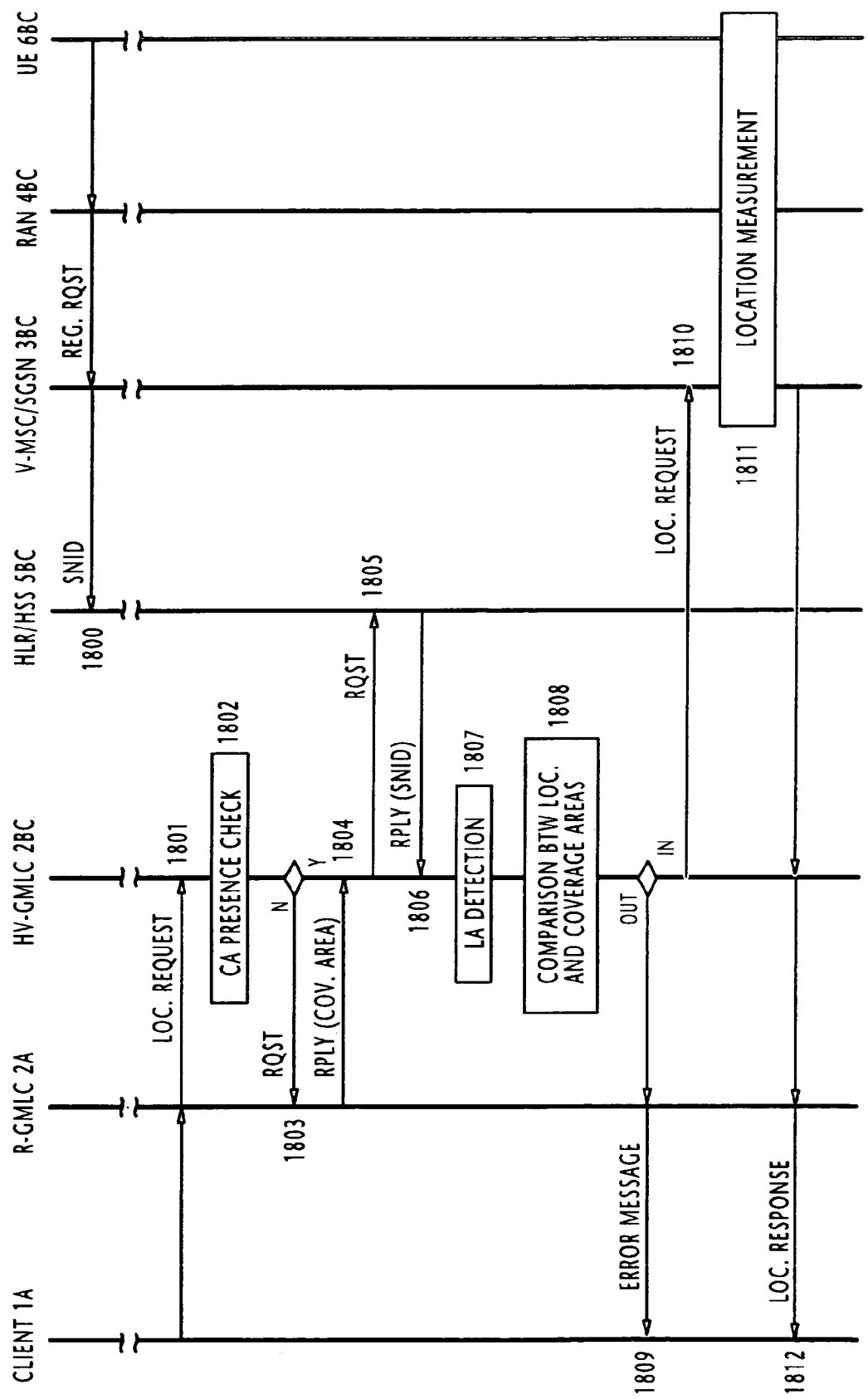
FIG. 18 is a sequence diagram for describing the operation of the location system of FIG. 17.

When the client terminal 1A transmits a location request message to the R-GMLC 2A, the latter recognizes from its destination field that HV-GMLC 2BC is the home gateway of the target UE terminal 6BC and forwards the location request message to HV-GMLC 2BC, as indicated by an event 1801 in the sequence diagram of FIG. 18.

In the HV-GMLC 2BC, the location request from the R-GMLC 2A is supplied to a coverage area searcher 133, a serving node ID requestor 134, and a location requestor 137. Coverage area searcher 133 responds to the received location request message by making a search through a cache memory 132 which stores a plurality of frequently accessed coverage information corresponding to a plurality of sets of clients' identities and service types (event 1802, FIG. 18). Coverage area searcher 133 uses the client's ID and service type contained in the received message for detecting a corresponding coverage area.

If the coverage area of the client's location-based service is detected in the cache memory 132, the detected coverage area information is supplied to a comparator 136. If no coverage area is detected, the coverage area searcher 133 requests a coverage area requestor 131 to retrieve the corresponding coverage information from the coverage area memory 22 of the R-GMLC 2A (events 1803, 1804, FIG. 18). The retrieved coverage area information is stored in the cache memory 132 and supplied from the cache memory 132 to the comparator 136. Coverage area searcher 133 enables the serving node ID requestor 134 to retrieve the serving node (i.e., V-MSC/SGSN 3BC) ID of the target UE terminal 6BC from the HLR/HSS 5BC using the UE's ID contained in the received location request message (events 1805, 1806). The retrieved serving node ID is supplied to a LA/SNID mapping memory 135 in which a plurality serving node ID's of V-MSC/SGSNs are mapped to a plurality of location areas served by MSC/SGSNs to which the UE terminals of network BC are currently connected. Corresponding to the retrieved serving node ID, the location area of the target UE terminal 6BC is detected in the mapping memory 135 and supplied to the comparator 136 where it is compared with the coverage area data supplied from the cache memory 132 (events 1807, 1808, FIG. 18). Comparator 136 determines if the location area of the target UE terminal 6BC is within or out of the coverage area of the location-based service provided by client terminal 1A.

If the UE's location area is out of the coverage area of the client's service, the comparator 136 instructs the location requestor 137 to return an error message to the location requestor 21 of R-GMLC 2A, which is forwarded to the client terminal 1A (event 1809). If the location area is within the coverage area, the comparator 136 instructs the location requester 137 to forward the client's location request to the V-MSC/SGSN 3BC (event 1810). In collaboration with the RAN 4C, the V-MSC/SGSN 3BC performs a location measurement (event 1811) and returns a location response message 1812 to the location requestor 137 of the HV-GMLC 2BC. This location response message is forwarded through the R-GMLC 2A to the client terminal 1A.

SEVENTH EMBODIMENT

Figure 19:
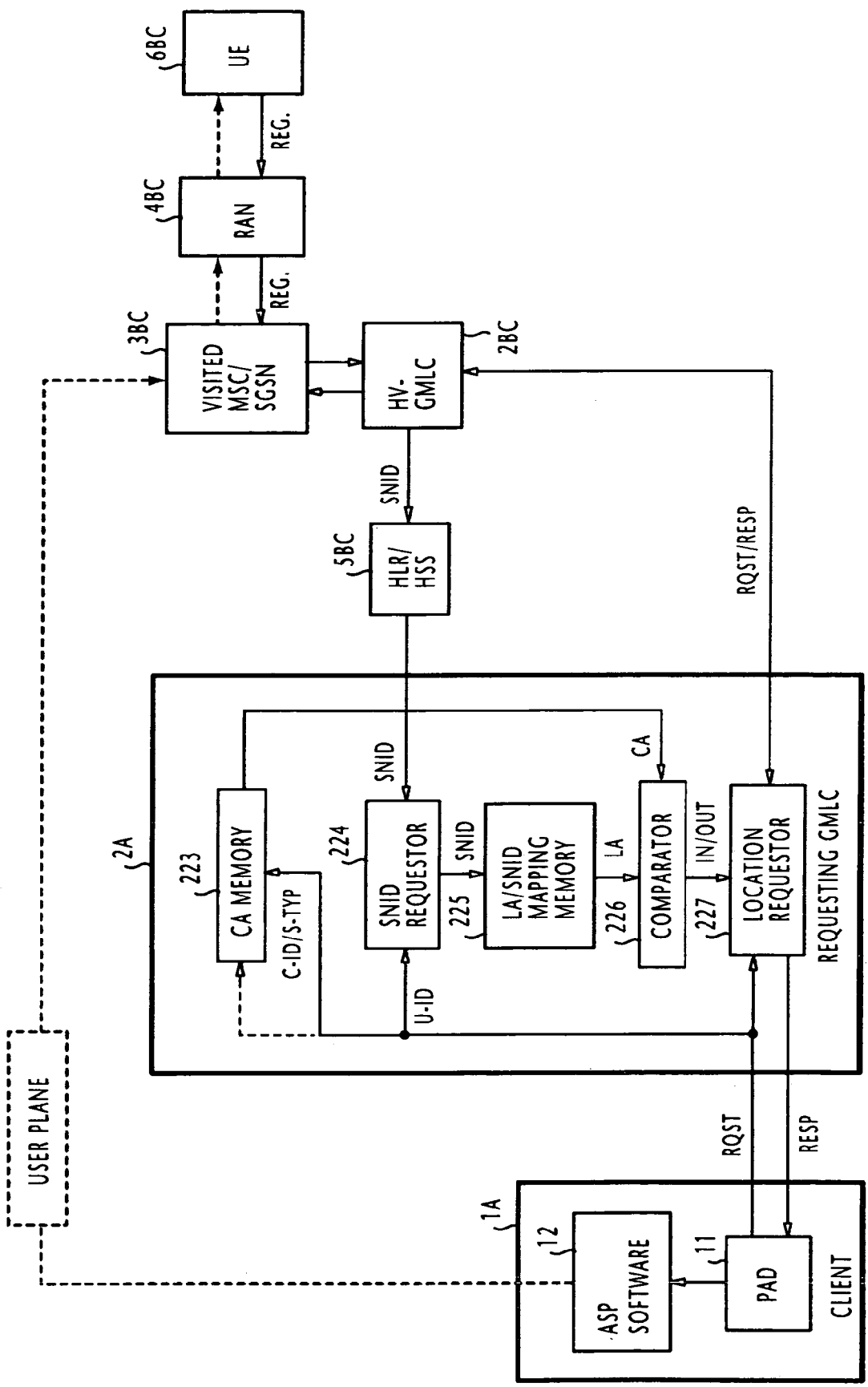
FIG. 19 is a block diagram of a location system according to a sixth embodiment of the present invention based on the network configuration of FIG. 16, in which one GMLC operates as a home and visited gateway and another GMLC operates as a requesting gateway as well as a decision-making gateway.
Figure 20:
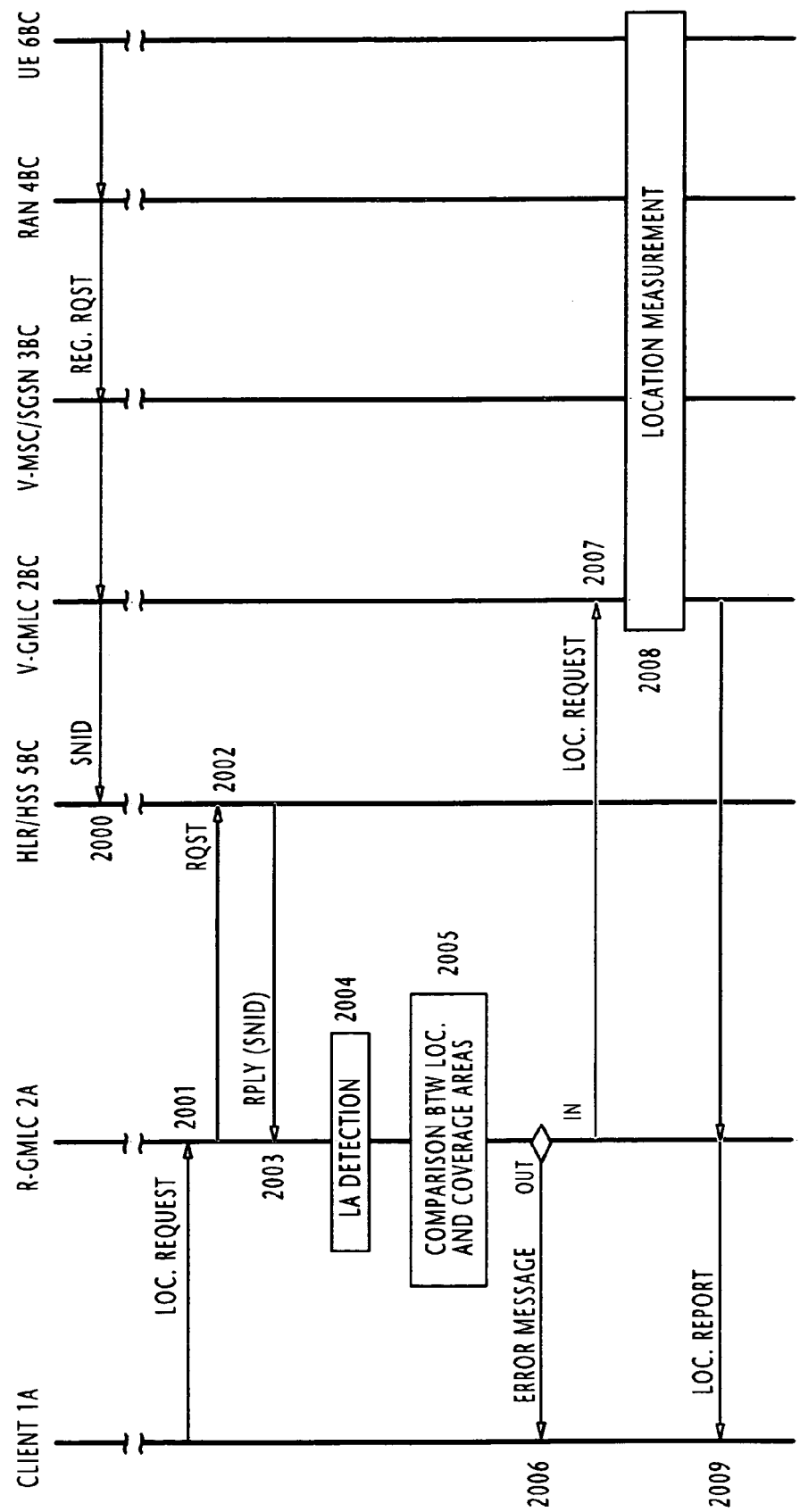
FIG. 20 is a sequence diagram for describing the operation of the location system of FIG. 19.

The seventh embodiment of the present invention is a modification of the sixth embodiment. Similar to the sixth embodiment, the client terminal 1A is requesting the location of the UE terminal 6BC currently connected to the home network BC and the GMLC 2A operates as a requesting GMLC, and GMLC 2BC operates as a home-and-visited gateway. This embodiment differs from the sixth embodiment in that the requesting GMLC 2A of client terminal 1A is the area-decision gateway, as shown in FIGS. 19 and 20.

UE terminal 6BC is first registered in the V-MSC/SGSN 3BC. In response to this registration, the node ID of the V-MSC/SGSN 3BC is sent to the HLR/HSS 5BC and stored as a serving node ID of the UE terminal 6BC (event 2000, FIG. 20).

When the R-GMLC 2A receives a location request message from the client terminal 1A (event 2001, FIG. 20), the message is supplied to a coverage area memory 223, a serving node ID requestor 224, and a location requestor 227. Coverage area memory 223 stores a plurality of coverage information corresponding to a plurality of sets of client IDs and service types. In response to the location request, the coverage area information is read out of the coverage area memory 223 corresponding to the client's ID and service type contained in the received message and supplied to a comparator 226. Serving node ID requestor 224 requests the serving node ID of the target UE terminal 6AB from the HLR/HSS 5BC (events 2002, 2003). The serving node ID from the HLR/HSS 5BC is supplied to a LA/SNID mapping memory 225 which provides mapping of a plurality of serving node IDs of V-MSC/SGSNs and location areas to which UE terminals are currently connected. Corresponding to the retrieved serving node ID, the location area of the target UE terminal 6BC is detected in the mapping memory 225 (event 2004) and supplied to the comparator 226 where it is compared with the coverage area data supplied from the coverage area memory 223. Comparator 226 determines whether the location area of the target UE terminal 6AB is within or out of the coverage area of the location-based service provided by the client terminal 1A (event 2005). If the UE's location area is out of the service coverage area, the comparator 226 instructs the location requestor 227 to formulate and transmit an error message to the client terminal 1AB. If the location area is within the coverage area, the comparator 226 instructs the location requester 227 to forward the client's location request message to the V-GMLC 2BC (event 2007). In response, the V-GMLC 2BC requests the V-MSC/SGSN 3BC to perform a location measurement process in collaboration with the RAN 4BC (event 2008) and returns a location response message (either error message or location information of the target UE terminal) to the location requestor 227. The location response message from the V-GMLC 2BC is forwarded to the client terminal 1A (event 2009).

EIGHTH EMBODIMENT

Figure 21:
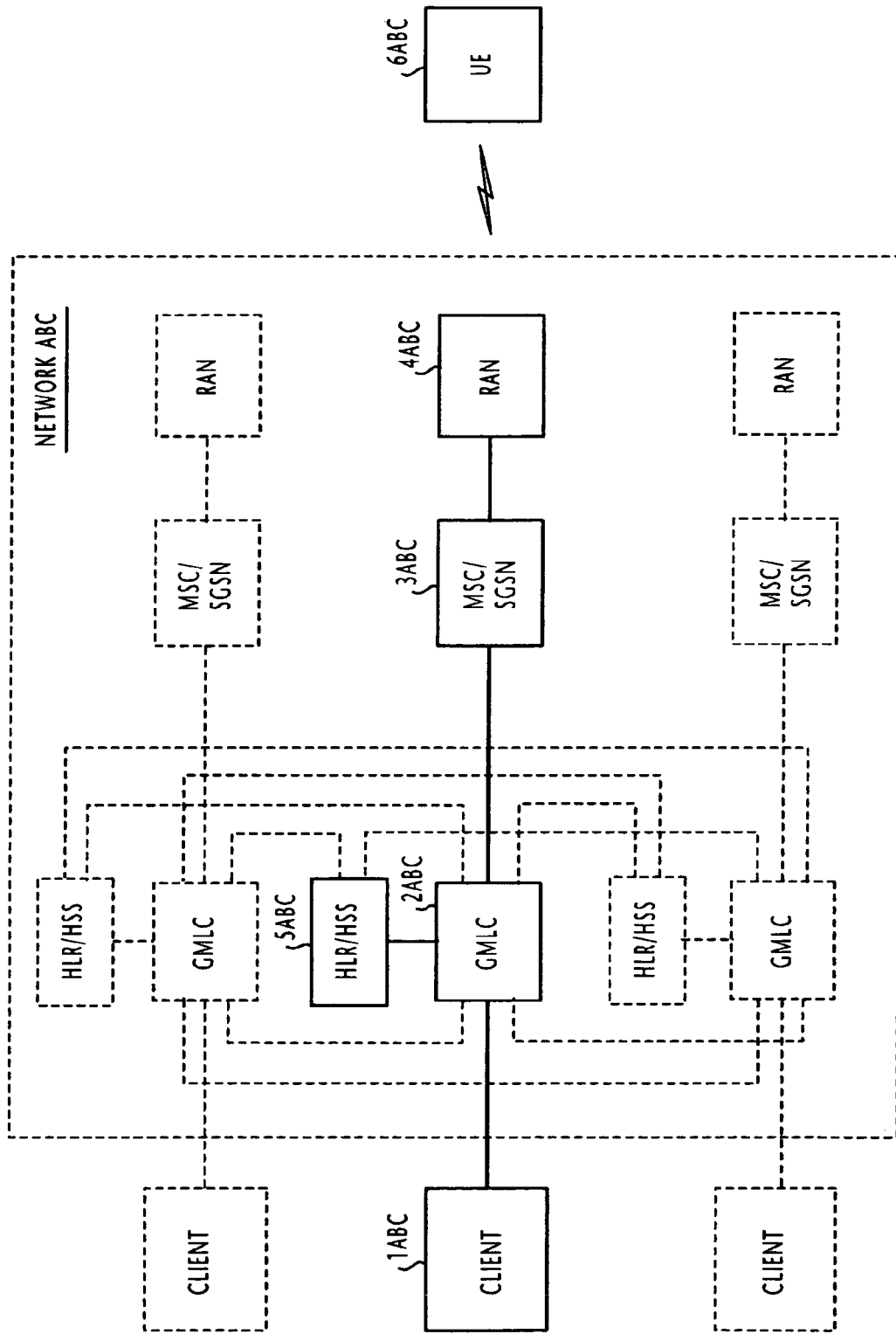
FIG. 21 is a block diagram of a location system according to a fourth network configuration of the present invention in which all (requesting, home and visited) mobile communication networks are owned and operated by a common network operator.
Figure 22:
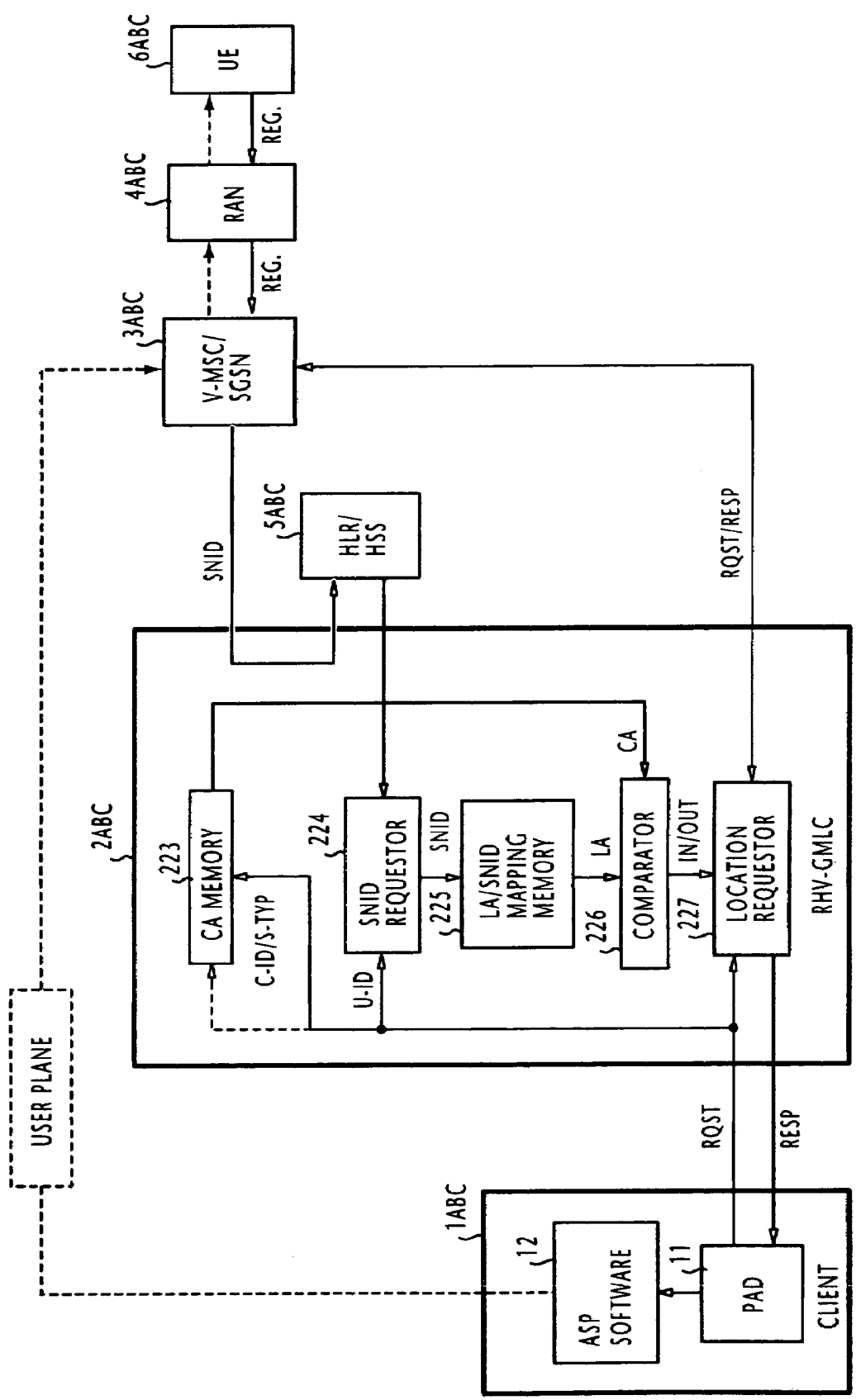
FIG. 22 is a block diagram of a location system according to a seventh embodiment of the present invention based on the network configuration of FIG. 21, in which one GMLC operates as a requesting, home and visited gateway as well as a decision-making gateway.
Figure 23:
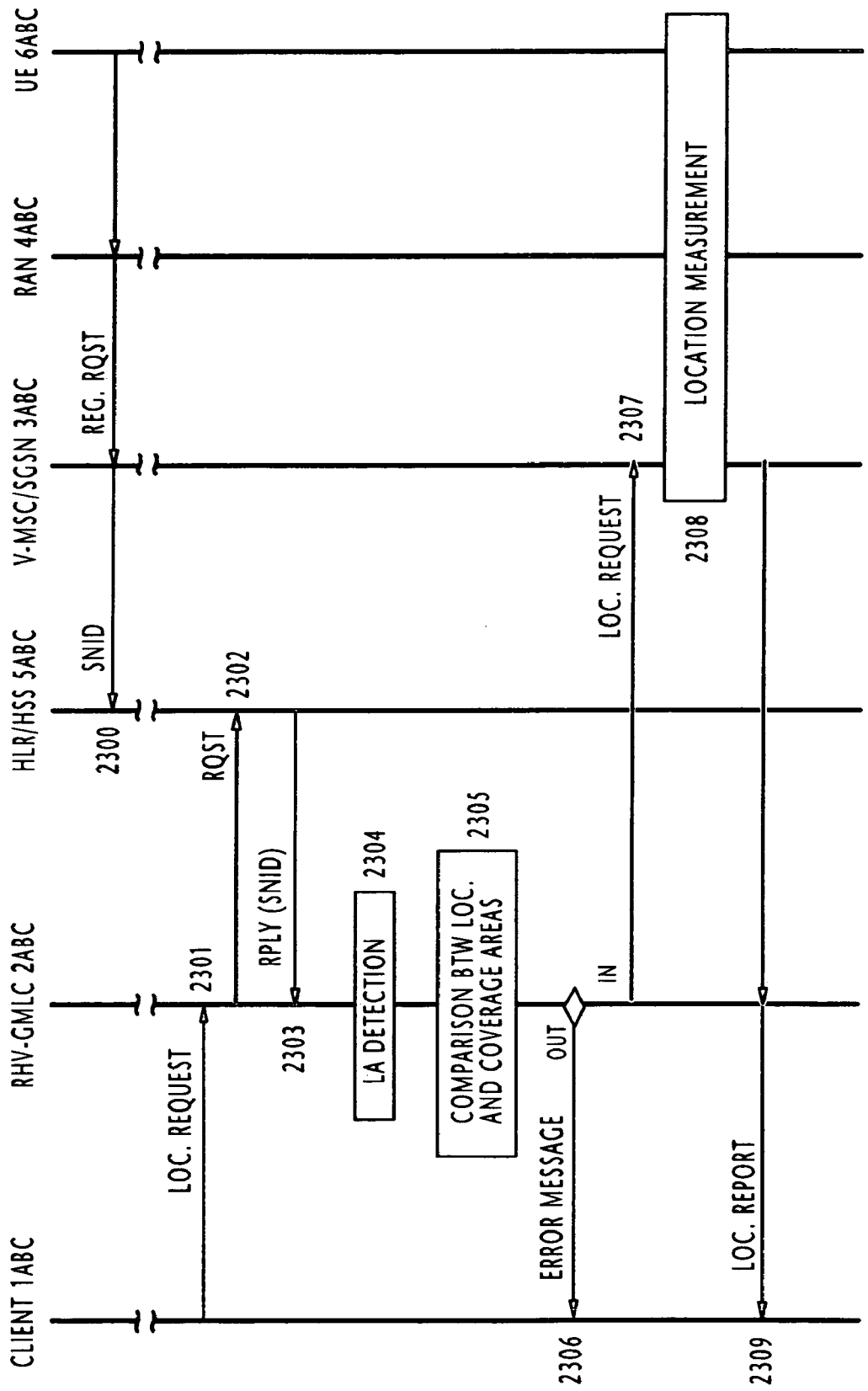
FIG. 23 is a sequence diagram for describing the operation of the location system of FIG. 22.

In the eighth embodiment, the networks A, B and C are owned and operated by a common network operator ABC as represented by a network ABC, as shown in FIG. 21. It is assumed that a client terminal 1ABC is requesting the location of a UE terminal 6ABC which is currently connected to the home network ABC. In this embodiment, the GMLC 2ABC operates as a requesting, home and visited gateway, or RHV-GMLC, as shown in FIGS. 22 and 23.

RHV-GMLC 2ABC is responsible for making a decision as to whether the coverage area of the service provided by client terminal 1ABC is within or out of the location area of the target UE terminal 6ABC.

UE terminal 6ABC is first registered in the V-MSC/SGSN 3ABC. In response to this registration, the node ID of the V-MSC/SGSN 3ABC is sent to the HLR/HSS 5ABC and stored as a serving node ID of the UE terminal 6ABC (event 2300, FIG. 23).

When the RHV-GMLC 2ABC receives a location request from the client terminal 1ABC (event 2301, FIG. 23), the request is supplied to a coverage area memory 223, a serving node ID requester 224, and a location requestor 227. Coverage area memory 223 stores a plurality of coverage information corresponding to a plurality of sets of client IDs and service types. In response to the location request, coverage area information is read out of the coverage area memory 223 corresponding to the client's ID and service type contained in the received message and supplied to a comparator 226. Corresponding to the UE's ID contained in the received message, the serving node ID of the target UE terminal 6ABC is requested by the serving node ID requestor 224 from the HLR/HSS 5ABC and supplied to a LA/SNID mapping memory 225 which provides mapping of a plurality of serving node IDs of V-MSC/SGSNs and location areas to which UE terminals are currently connected (events 2302, 2303, FIG. 23). Corresponding to the retrieved serving node ID, the location area of the target UE terminal 6ABC is detected in the mapping memory 225 and supplied to the comparator 226 for comparison with the coverage area data from the coverage area memory 223 (event 2304). Comparator 226 determines whether the location area of the target UE terminal 6ABC is within or out of the coverage area of the location-based service provided by the client terminal 1ABC (event 2305).

If the UE's location area is out of the service coverage area, the comparator 226 instructs the location requestor 227 to formulate and transmit an error message to the client terminal 1AB (event 2306). If the location area is within the coverage area, the comparator 226 instructs the location requestor 227 to forward the client's location request message to the V-MSC/3ABC to perform a location measurement process in collaboration with the RAN 4ABC and returns a location response message (either error message or location information of the target UE terminal) to the location requestor 227. The location response message from the RHV-GMLC 2ABC is forwarded to the client terminal.

NINTH EMBODIMENT

Figure 24:
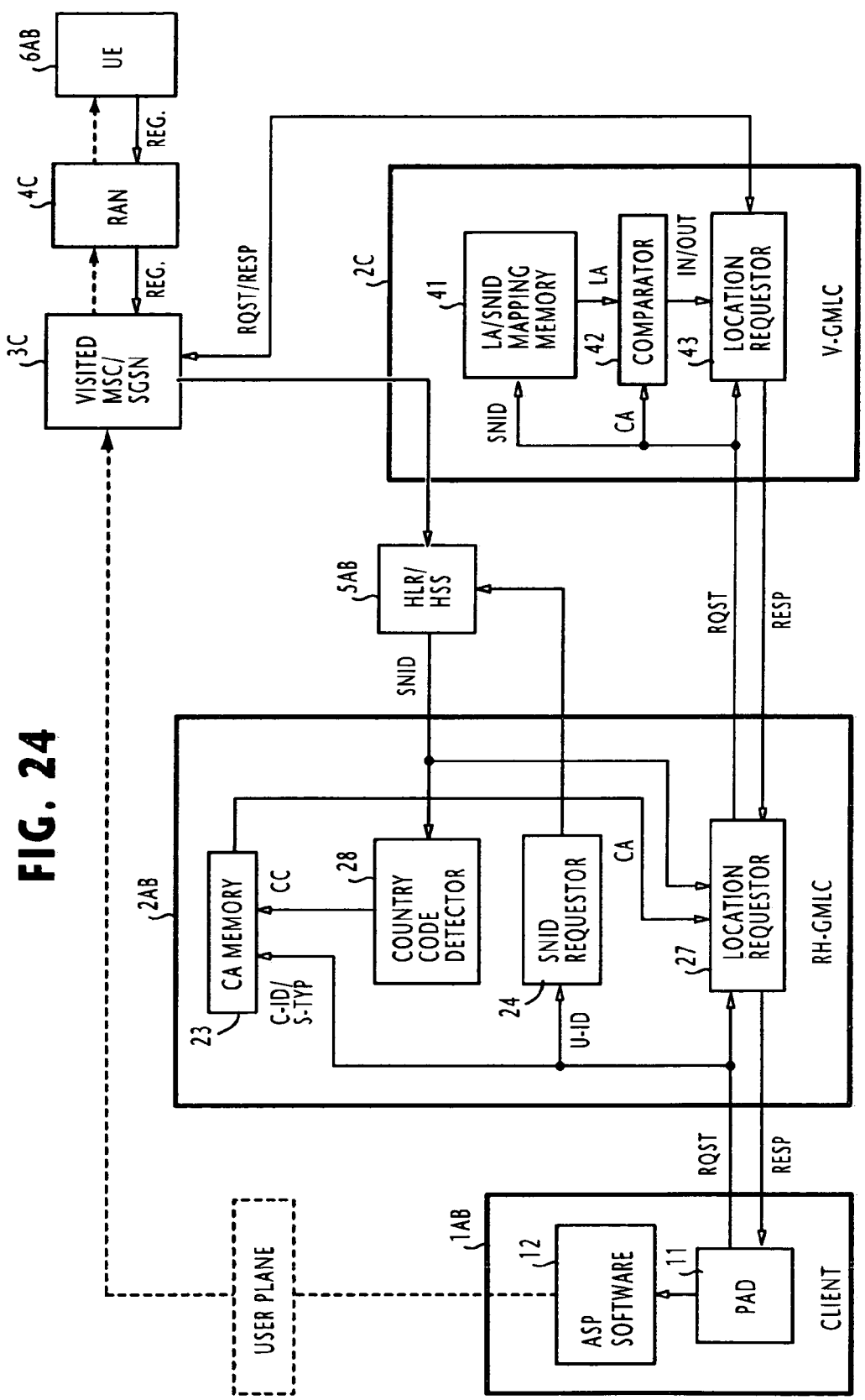
FIG. 24 is a block diagram of a location system according to an eighth embodiment of the present invention, as a modification of the third embodiment (FIG. 8), based on the network configuration of FIG. 13.

The ninth embodiment of the present invention is a first modification of the third embodiment. The ninth embodiment, shown in FIGS. 24 and 25, differs from the third embodiment (FIGS. 8-10) in that the networks A and B are owned and operated by a common network operator AB similar to that shown in FIG. 13, and the GMLC 2AB operates as a requesting and home gateway RH-GMLC for the client terminal 1AB. It is assumed that the client terminal 1AB requests the location of UE terminal 6AB of the same network AB.

V-GMLC 2C is the gateway responsible for making the in/out area decision. RH-GMLC 2AB and V-GMLC 2C are configured in a manner similar to the R-GMLC 2A and V-GMLC 2C of FIG. 8, respectively. Since RH-GMLC 2AB also acts as a home gateway, it directly interfaces the V-GMLC 2C.

Figure 25:
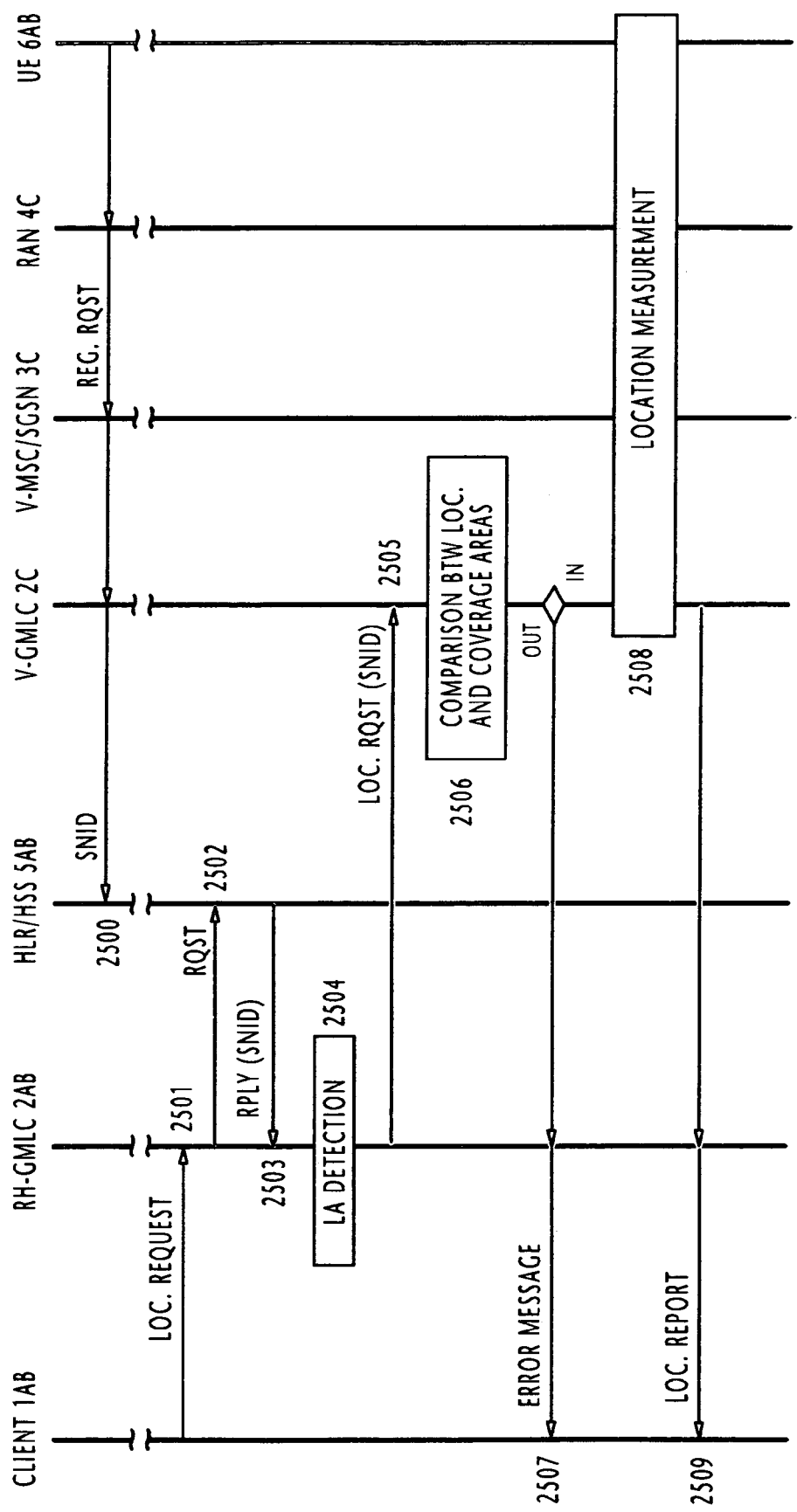
FIG. 25 is a sequence diagram for describing the operation of the location system of FIG. 24.

As shown in FIG. 25, UE terminal 6AB is first registered in the V-MSC/SGSN 3C. In response to this registration, the node ID of the V-MSC/SGSN 3C is sent to the HLR/HSS 5AB and stored as a serving node ID of the UE terminal 6AB (event 2500, FIG. 25).

When the client terminal 1AB transmits a location request message 2501 to the RH-GMLC 2AB, the serving node ID requestor 24 requests the serving node ID of the target UE terminal 6AB from the HLR/HSS 5AB (events 2502, 2503). Country code detector 28 detects the country code of the country or area where the target UE terminal 6AB is visiting. Corresponding to the detected country code, coverage area information is retrieved from the coverage area memory 23 and supplied to the location requestor 27 (event 2504). A location request message containing the serving node ID and the coverage area information is transmitted from the location requestor 27 to the V-GMLC 2C (event 2505).

In the V-GMLC 2C, the location area of the UE terminal 6AB is detected from the LA/SNID mapping memory 41 using the serving node ID contained in the location request message and compared in the comparator 42 with the coverage area information contained in the same location request message. Comparator 42 determines if the location area is within or out of the coverage area of the client's service (event 2506). If the location area is out of the coverage area, an error message is sent from the location requestor 43 to the client terminal (event 2507). If the location area is within the coverage area of the client's service, the location request is forward from the location requestor 43 to the V-GMLC 2C. V-GMLC 2C requests the location information of the UE terminal 6AB from the V-MSC/SGSN 3C, which in turn performs a location measurement procedure (event 2508) in collaboration with the RAN 4C and determines the location of the target UE terminal 6AB and returns a location report message to the V-GMLC 2C, which forwards the message through the RH-GMLC 2AB to the client terminal 1AB (event 2509). Client terminal 1AB establishes a connection to the UE terminal 6AB to perform a location-based service to the target UE terminal.

TENTH EMBODIMENT

Figure 26:
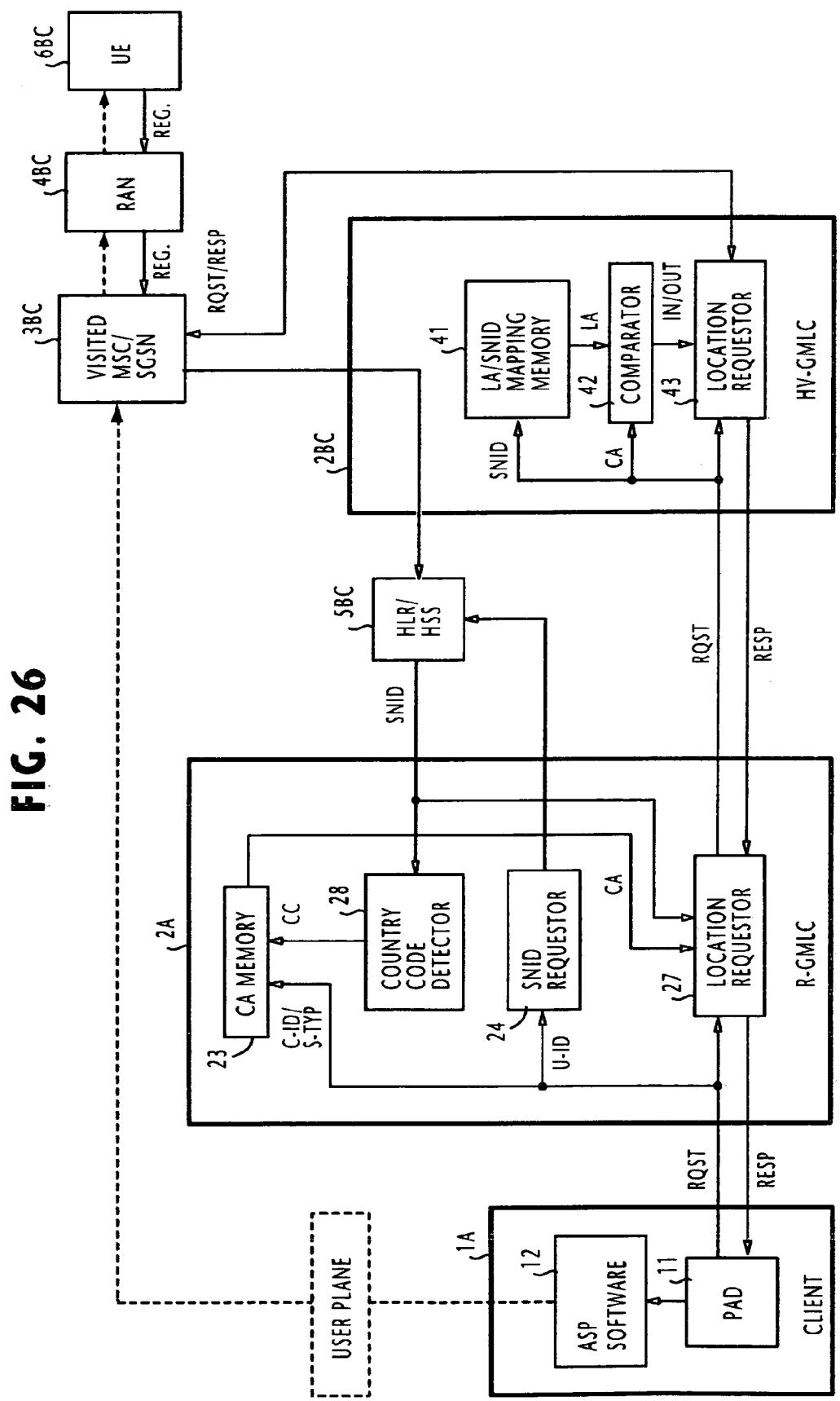
FIG. 26 is a block diagram of a location system according to a ninth embodiment of the present invention, as a modification of the third embodiment (FIG. 8), based on the network configuration of FIG. 16.

The tenth embodiment of the present invention is a second modification of the third embodiment. The tenth embodiment, shown in FIGS. 26 and 27, differs from the third embodiment (FIGS. 8-10) in that the networks B and C are owned and operated by a common network operator BC similar to that shown in FIG. 16, and the GMLC 2BC operates as a home and a visited gateway HV-GMLC for the client terminal 1A. It is assumed that the client terminal 1A of network A requests the location of UE terminal 6BC of the network BC.

HV-GMLC 2BC is the gateway responsible for making the in/out area decision. Both R-GMLC 2A and HV-GMLC 2BC are configured in a manner similar to the R-GMLC 2A and V-GMLC 2C of FIG. 8, respectively. Since UV-GMLC 2BC is also a home gateway, it directly interfaces the R-GMLC 2A.

Figure 27:
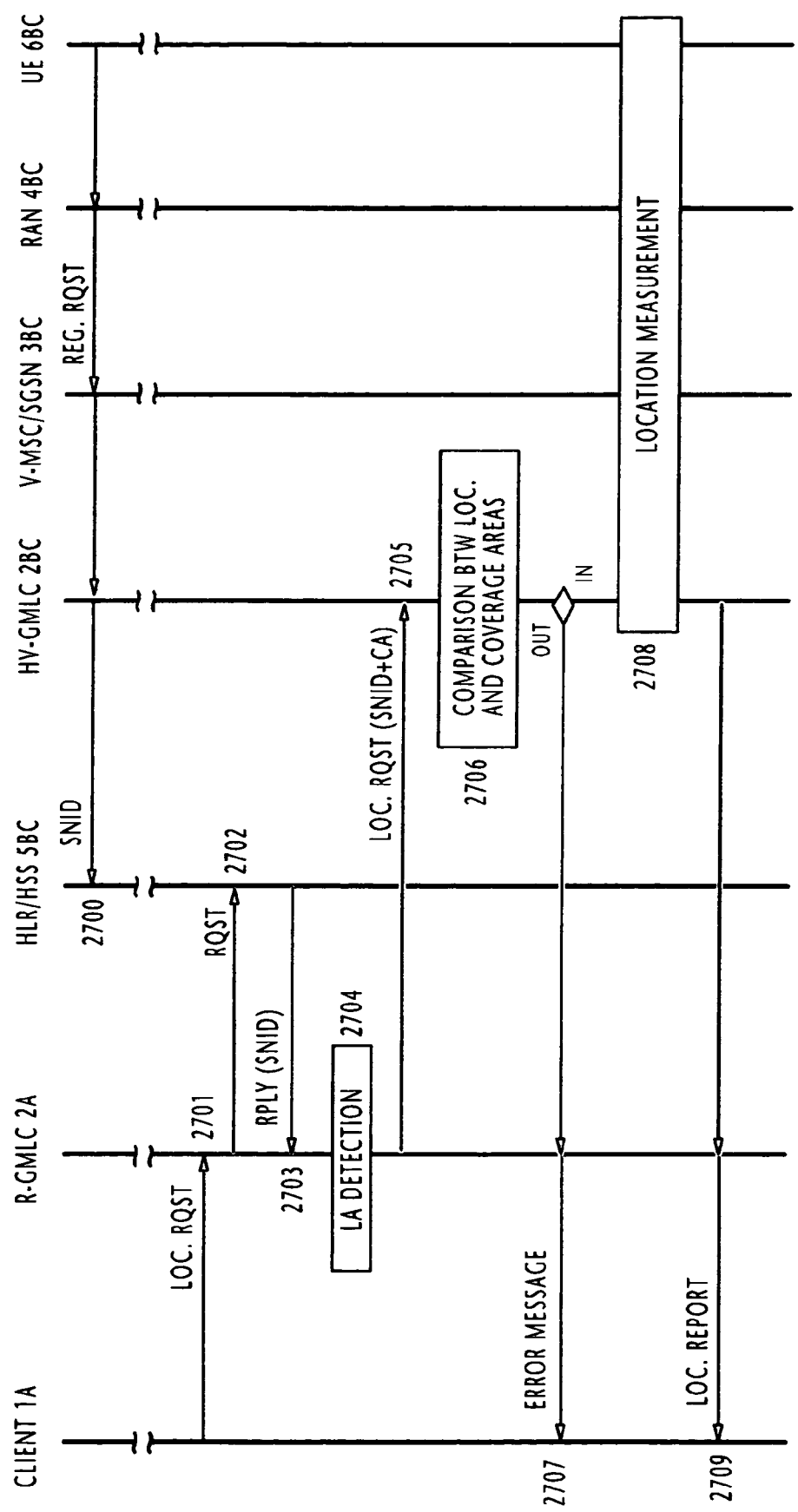
FIG. 27 is a sequence diagram for describing the operation of the location system of FIG. 26.

As shown in FIG. 27, UE terminal 6BC is first registered in the V-MSC/SGSN 3BC. In response to this registration, the node ID of the V-MSC/SGSN 3BC is sent to the HLR/HSS 5BC and stored as a serving node ID of the UE terminal 6BC (event 2700.

When the client terminal 1AB transmits a location request message 2701 to the R-GMLC 2A, the serving node ID requestor 24 requests the serving node ID of the target UE terminal 6BC from the HLR/HSS 5BC (events 2702, 2703). Country code detector 28 detects the country code of the country or area where the target UE terminal 6BC is visiting. Corresponding to the detected country code, coverage area information is retrieved from the coverage area memory 23 and supplied to the location requestor 27 (event 2704). A location request message containing the serving node ID and the coverage area information is transmitted from the location requestor 27 to the V-GMLC 2C (event 2705). In the V-GMLC 2C, the location area of the UE terminal 6BC is detected from the LA/SNID mapping memory 41 using the serving node ID contained in the location request message and compared in the comparator 42 with the coverage area information contained in the same location request message. Comparator 42 determines if the location area is within or out of the coverage area of the client's service (event 2706). If the location area is out of the coverage area, an error message is sent from the location requestor 43 to the client terminal (event 2707). If the location area is within the coverage area of the client's service, the location request is forward from the location requestor 43 to the V-GMLC 2C. V-GMLC 2C requests the location information of the UE terminal 6BC from the V-MSC/SGSN 3C, which in turn performs a location measurement procedure (event 2708) in collaboration with the RAN 4C and determines the location of the target UE terminal 6BC and returns a location report message to the V-GMLC 2C, which forwards the message through the R-GMLC 2A to the client terminal 1A (event 2709). Client terminal 1A establishes a connection to the UE terminal 6BC to perform a location-based service to the target UE terminal.

ELEVENTH EMBODIMENT

In the previous embodiments, the serving node ID of the target UE terminal is instantly requested by a receiving gateway when it receives a location request message from the client terminal. There is a possibility that a previously requested serving node ID may be used for later location requests.

Figure 28:
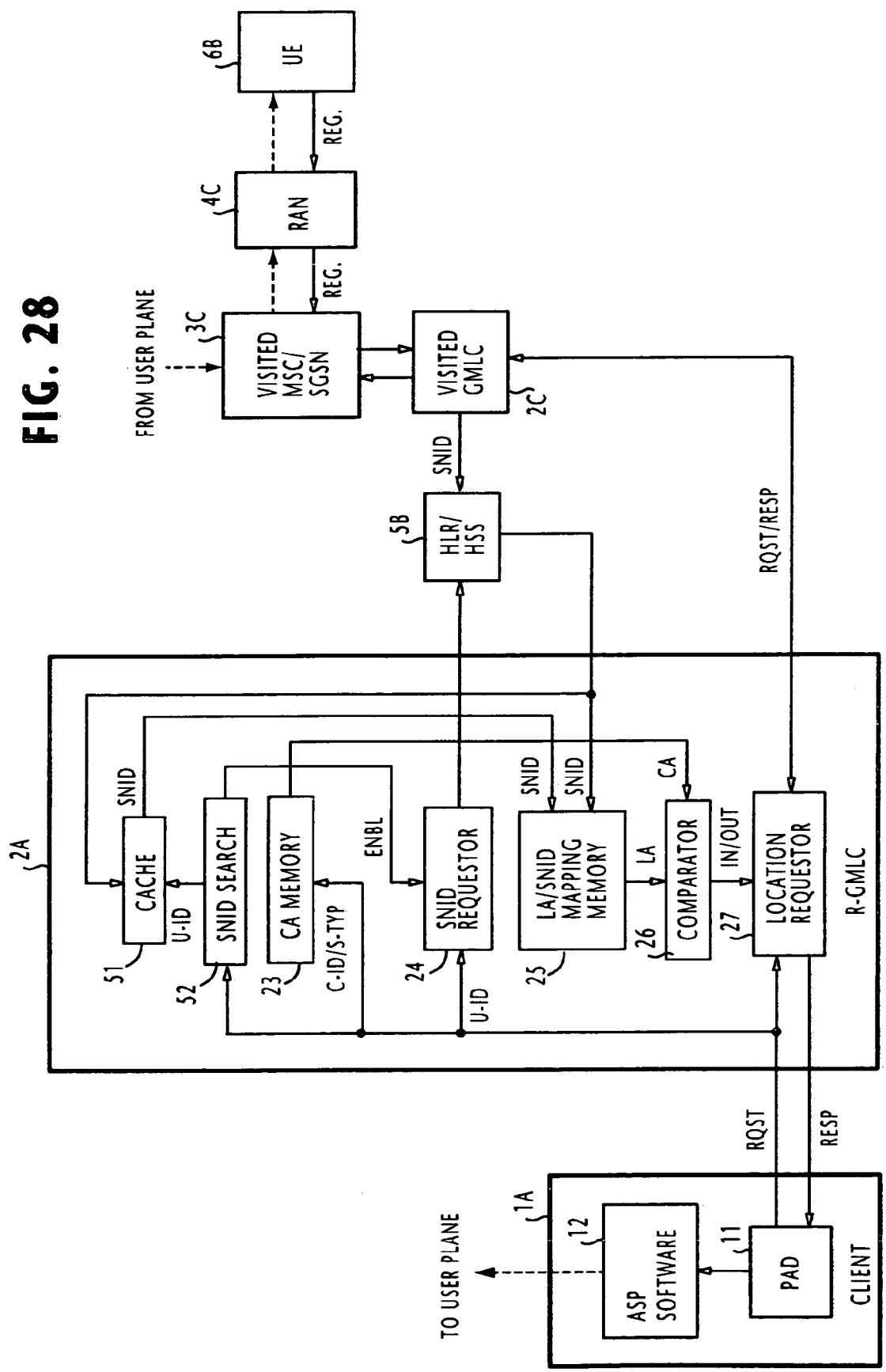
FIG. 28 is a block diagram of a location system according to a tenth embodiment of the present invention, as a modification of the second embodiment (FIG. 6), based on the network configuration of FIG. 1.

The eleventh embodiment of the present invention is as shown in FIG. 28, which is implemented as a modification of the second embodiment (FIG. 6) in order to take advantage of the possibility that previously requested serving node IDs are stored and utilized for later location requests.

As shown in FIG. 28, the R-GMLC 2A differs from that of FIG. 6 by the provision of a cache memory 50 for mapping a plurality of serving node IDs to corresponding UE IDs which have previously obtained by the SNID requestor 24 from the HLR/HSS 5B. A serving node ID searcher 52 is provided for making a search through the cache memory 51 for detecting a serving node ID using a UE ID contained in the location request message from the client terminal 1A. The detected serving node ID is supplied from the cache memory 51 to the LA/SNID mapping memory 25 as a search key for detecting a corresponding location area. If no serving node ID is detected in the cache memory 50, the SNID searcher 51 enables the SNID requester 24 to request the serving node ID from the HLR/HSS 5B.

Figure 29:
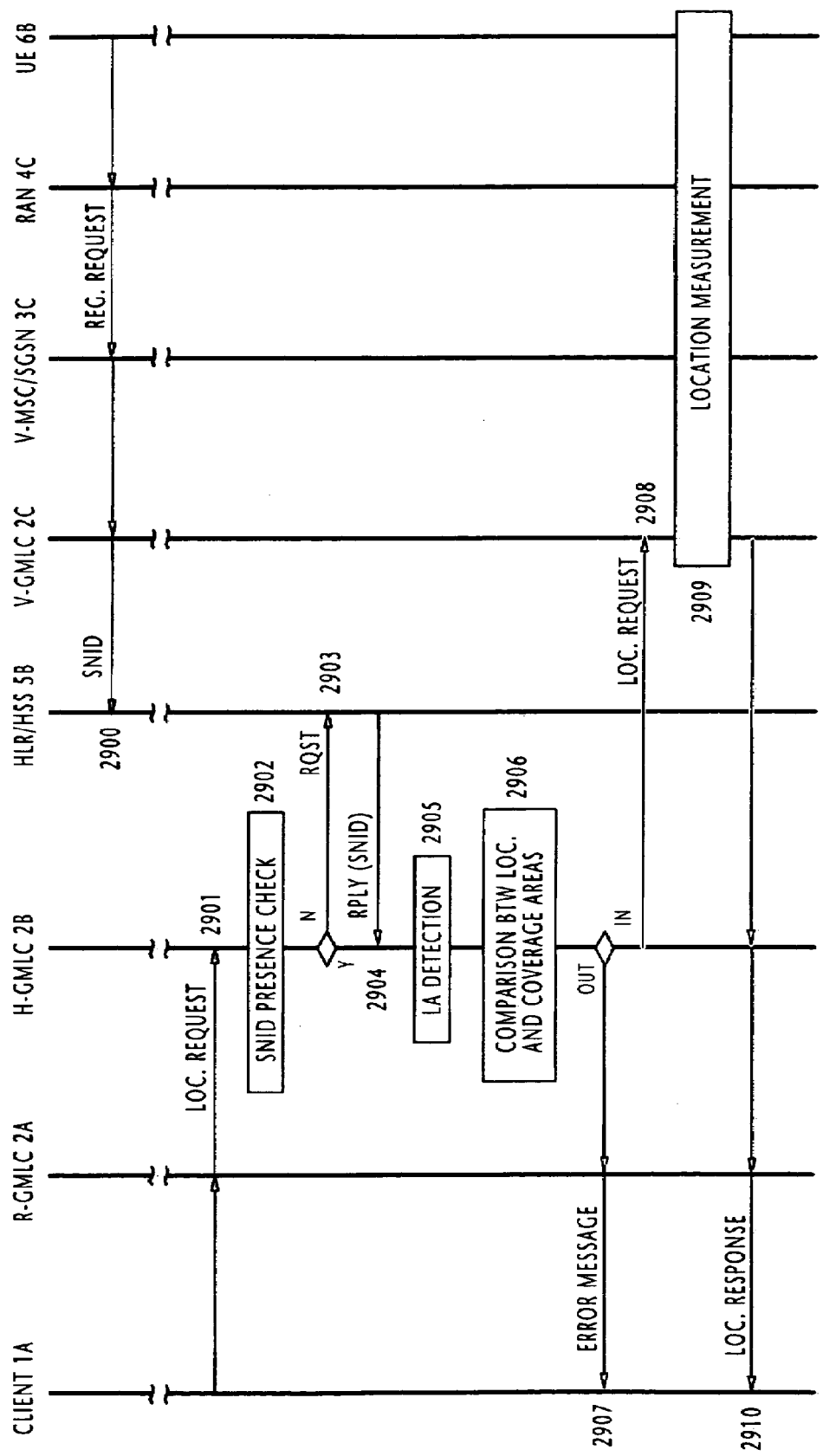
FIG. 29 is a sequence diagram for describing the operation of the location system of FIG. 28.

As shown in FIG. 29, the UE terminal 6B is first registered in the V-MSC/SGSN 3C and its node ID is sent and stored in the HLR/HSS 5B (event 2900). When the client terminal 1A sends a location request message to the R-GMLC 2A, requesting the location of the target UE terminal 6B, the message is forwarded to the H-GMLC 2B. SNID searcher 51 searches the cache memory 50 using the ID of the target UE terminal 6B (event 2902). If no serving node ID is detected in the cache memory 50, the H-GMLC 2B requests the serving node ID from the HLR/HSS 5B (events 2903, 2904). The operation of this embodiment proceeds as indicated by events 2905 to 2910 corresponding to events 704 to 709 of FIG. 7.

In this way, frequently accessed serving node identifiers can be obtained instantly from the cache memory 51. This reduces the amount of traffic from the requesting gateway to associated HLR/HSSs.

TWELFTH EMBODIMENT

Figure 30:
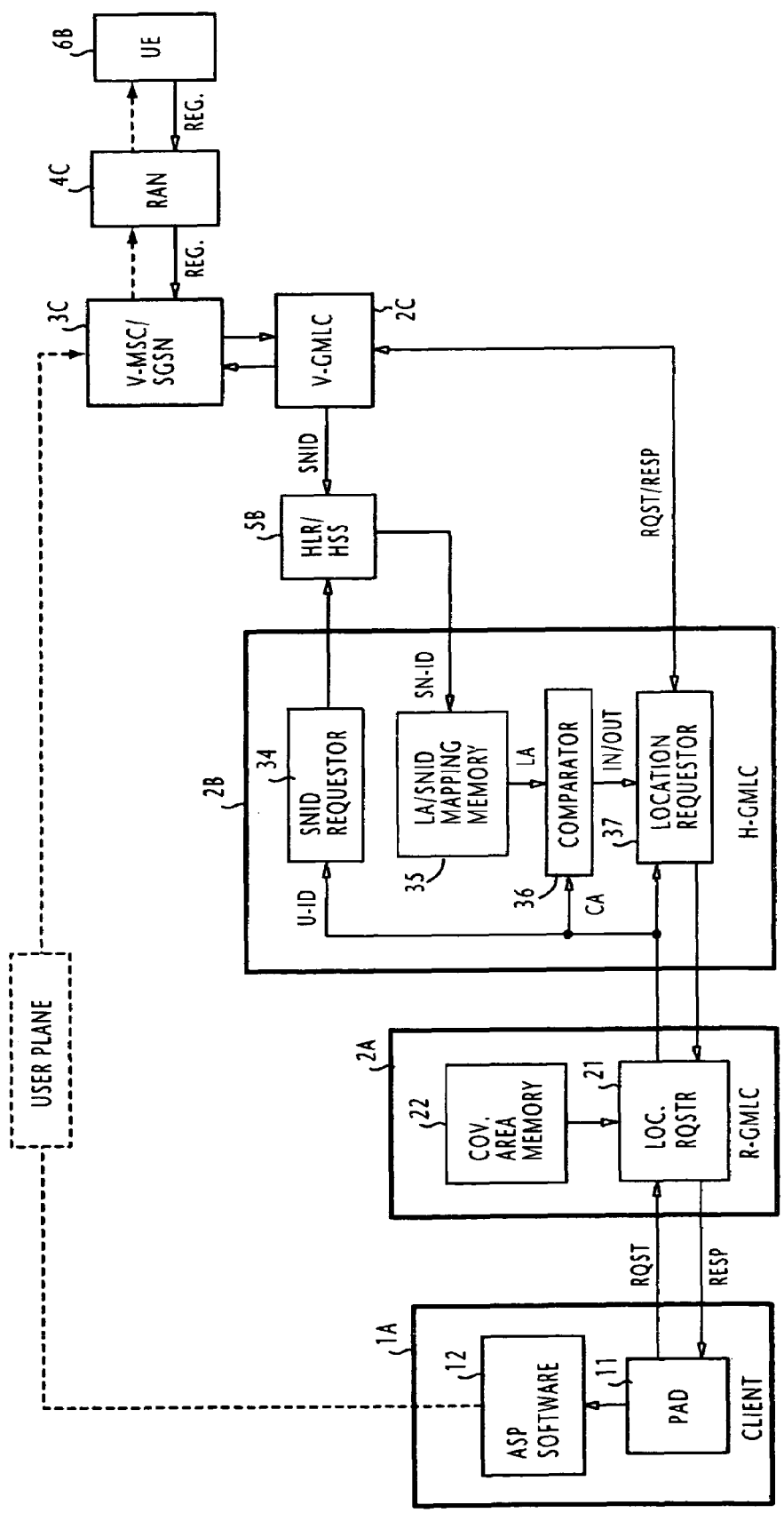
FIG. 30 is a block diagram of a location system according to an eleventh embodiment of the present invention, as a modification of the first embodiment (FIG. 2), based on the network configuration of FIG. 1.
Figure 31:
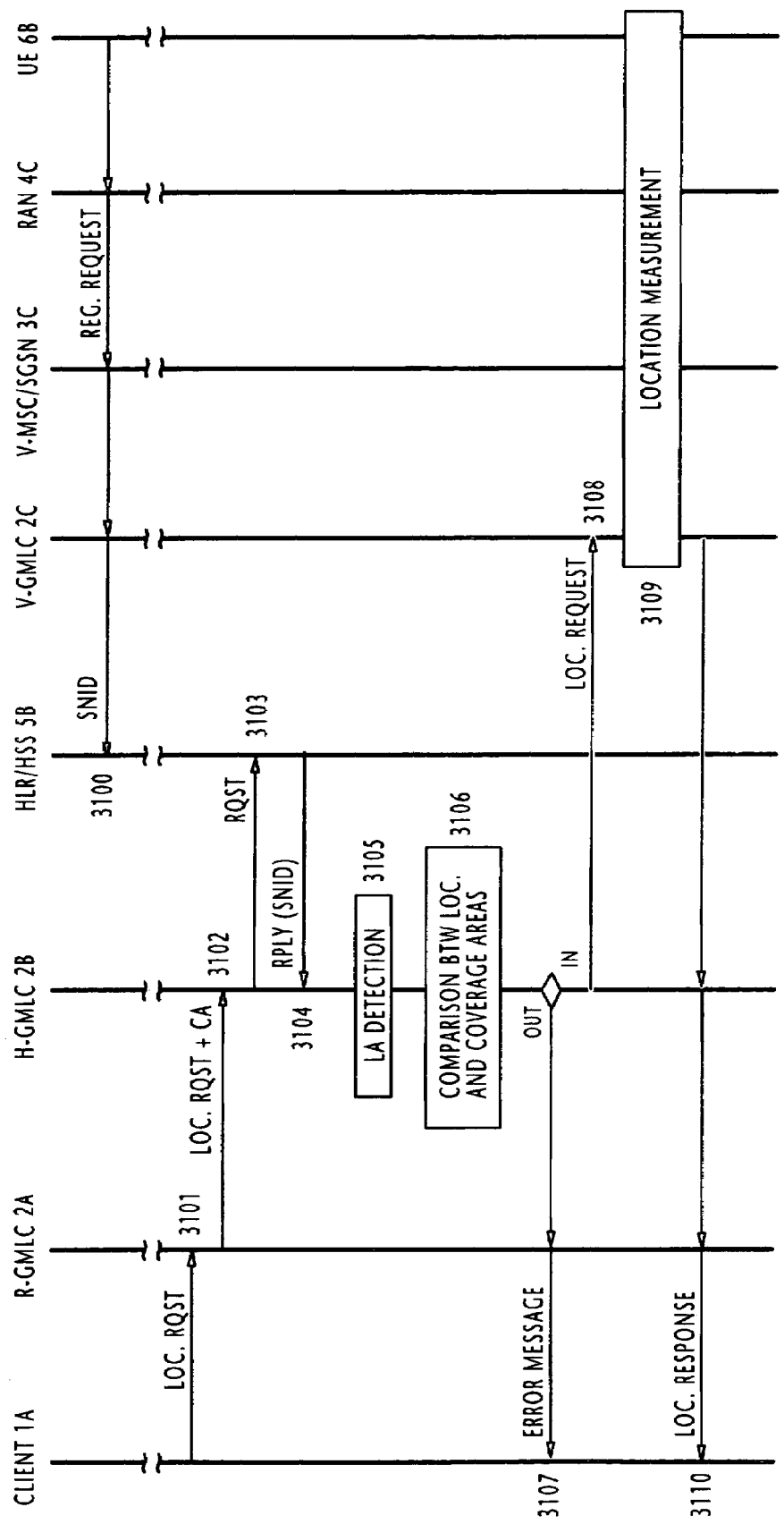
FIG. 31 is a sequence diagram for describing the operation of the location system of FIG. 30.

In the first embodiment, the H-GMLC 2B is provided with a requestor for requesting the coverage information from the R-GMLC 2A. The twelfth embodiment is shown in FIGS. 30 and 31. After the UE terminal 6B is registered in the V-GMLC 2C and the serving node ID of the gateway 2C is stored in the HLR/HSS 5B (event 3100, FIG. 31), the R-GMLC 2A transmits a location request message, requesting the location of a target UE terminal 6B, to the H-GMLC 2B (event 3101). In response to this location request message, the location requestor 21 reads coverage information from the coverage area memory 22 corresponding to the client ID and the service type contained in the received message and forwards the message to the H-GMLC 2B by encapsulating the coverage information in the transmitted message (event 3102).

In the H-GMLC 2B, the SNID requestor 34 responds to the received location request message by requesting the serving node ID of the target UE terminal 6B from the HLR/HSS 5B (events 3103, 3104). Using the serving node ID from the HLR/HSS 5B, the LA/SNID mapping memory 35 retrieves corresponding location area information (event 3105) and supplies it to the comparator 36. On the other hand, the comparator 36 reads the coverage information from the received message and compares it with the location area information from the LA/SNID mapping memory 35 and makes a decision as to whether the location area is within or outside the coverage area (event 3106). Depending on the result of the decision, the location requestor 37 transmits an error message to the R-GMLC 2A (event 3107) or forwards the location request message to the V-GMLC 2C (event 3108) to perform a location measurement process 3109. A location report message will then be transmitted to the client terminal 1A (event 3110).

THIRTEENTH EMBODIMENT

Figure 32:
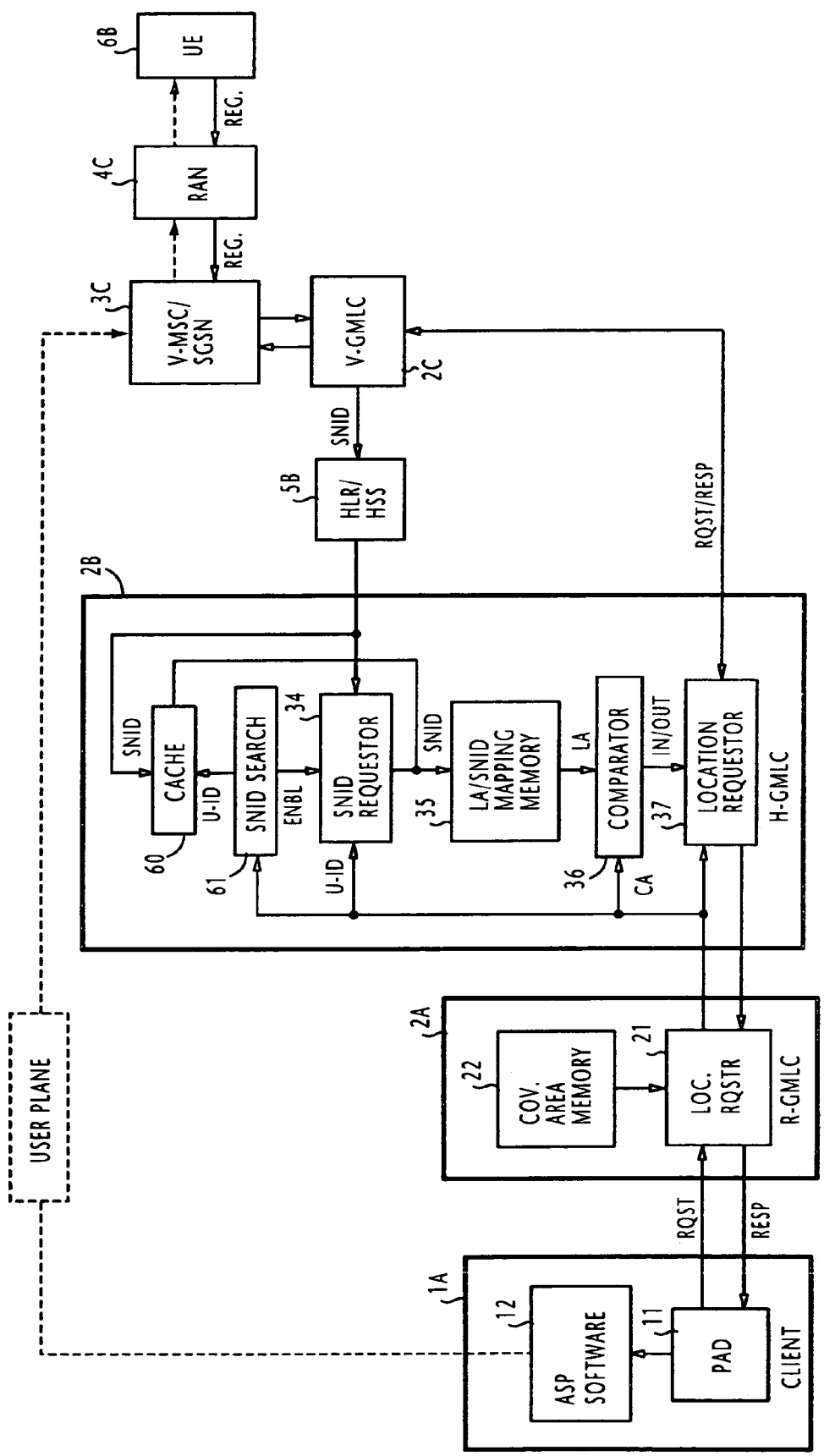
FIG. 32 is a block diagram of a location system according to a thirteenth embodiment of the present invention, as a further modification of the first embodiment (FIG. 2), based on the network configuration of FIG. 1.

In the twelfth embodiment, the home gateway 2B instantly requests the serving node identifier of the target UE terminal from the associated HLR/HSS, the cache memory can also be provided in the home gateway 2B, for storing frequently accessed serving node identifiers as shown in FIG. 32. The home GMLC 2B of this location system is identical to that of FIG. 30 except that it additionally includes a cache memory 60 and a serving node ID searcher 61.

Figure 33:
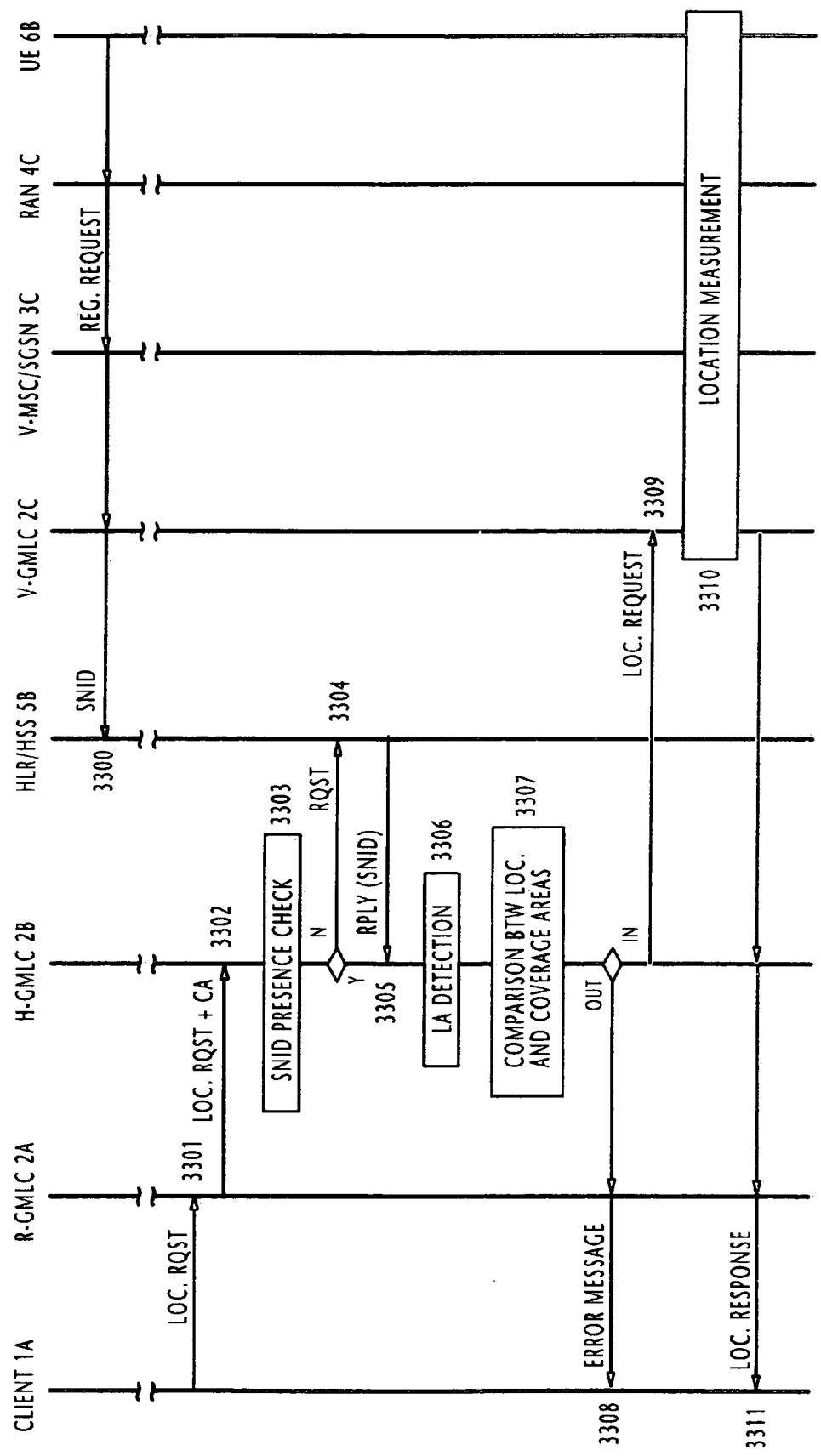
FIG. 33 is a sequence diagram for describing the operation of the location system of FIG. 32.

After the UE terminal 6B is registered in the V-GMLC 2C and the serving node ID of the gateway 2C is stored in the HLR/HSS 5B (event 3300, FIG. 33), the R-GMLC 2A transmits a location request message, requesting the location of a target UE terminal 6B, to the H-GMLC 2B (event 3301). In response to this location request message, the location requestor 21 reads coverage information from the coverage area memory 22 corresponding to the client ID and the service type contained in the received message and forwards the message to the H-GMLC 2B by encapsulating the coverage information in the transmitted message (event 3302).

In the H-GMLC 2B, the SNID searcher 61 makes a search through the cache memory 60 using the ID of the target UE terminal 6B (event 3303). If no serving node ID is detected in the cache memory 60, the SNID searcher 61 enables the SNID requestor 34 to request the serving node ID from the HLR/HSS 5B and the LA/SNID mapping memory 35 receives the serving node ID (events 3304, 3305). If the serving node ID is detected in the cache memory 61, the detected ID is supplied to the LA/SNID mapping memory 35. The corresponding location area of the target UE terminal 6B is detected in the mapping memory 35 corresponding to the serving node ID. On the other hand, the comparator 36 reads the coverage information from the received message and compares it with the location area information from the LA/SNID mapping memory 35 and makes a decision as to whether the location area is within or outside the coverage area (event 3307). Depending on the result of the decision, the location requestor 37 transmits an error message to the R-GMLC 2A (event 3308) or forwards the location request message to the V-GMLC 2C (event 3309) to perform a location measurement process 3310. A location report message will then be transmitted to the client terminal 1A (event 3311).

FOURTEENTH EMBODIMENT

In the previous embodiments, the requesting gateway is aware of the identity of the home gateway of a target UE terminal and that the HLR/HSS which maintains the serving node identity of the target UE is accessed from a gateway which is predetermined for making the in/out area decision. However, there is a possibility of the requesting gateway unaware of the identity of a home gateway.

In the fourteenth embodiment, one of the requesting and home gateways takes the responsibility to make the in/out area decision depending on whether the requesting gateway is aware of the identity of the home gateway. Specifically, the HLR/HSS of a target UE terminal is accessed from the requesting gateway if it is unaware of the identity of the home gateway or accessed from the home gateway if the requesting gateway is aware of its identity.

Figure 34:
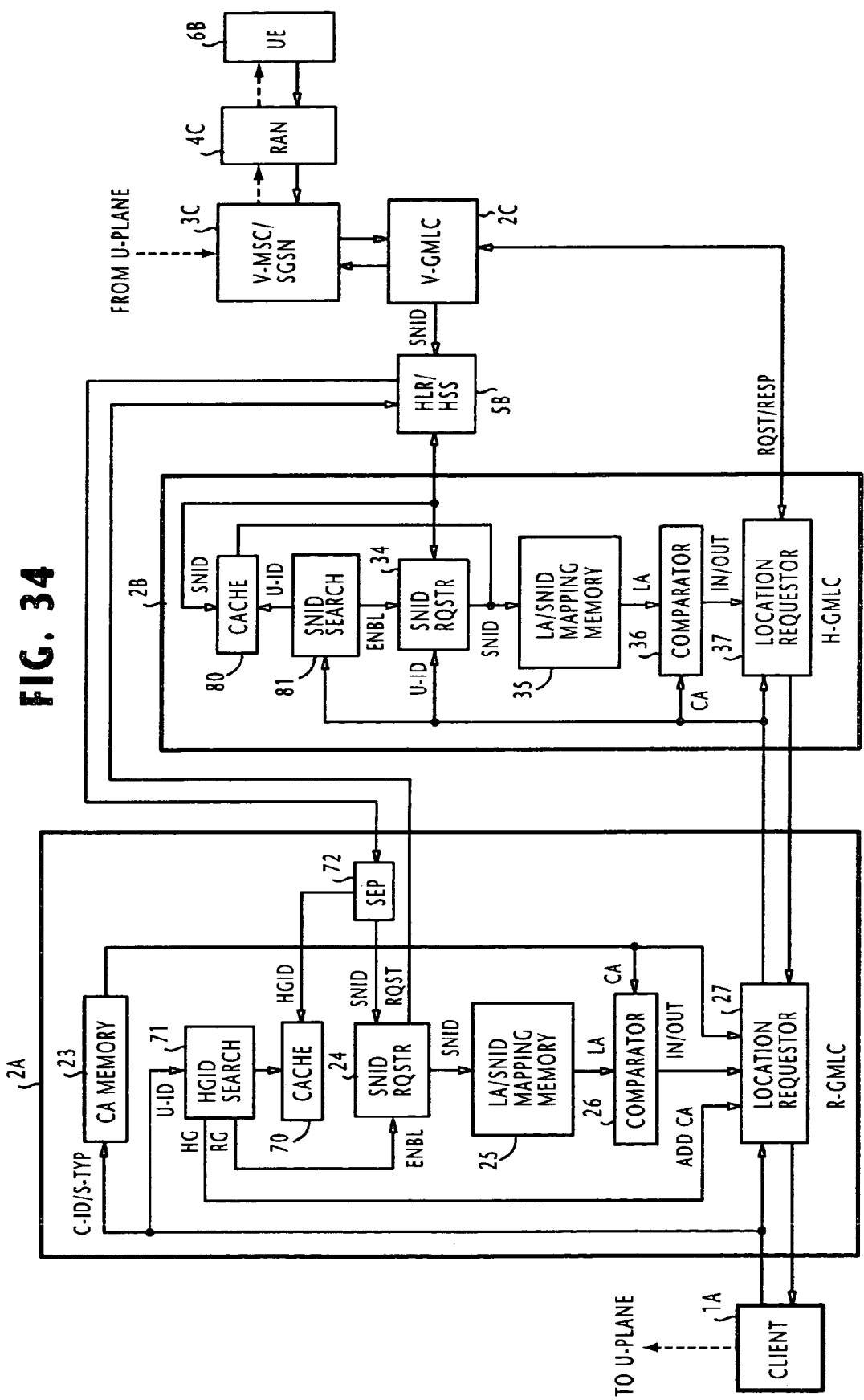
FIG. 34 is a block diagram of a location system according to a fourteenth embodiment of the present invention, as a still further modification of the first embodiment (FIG. 2), based on the network configuration of FIG. 1, in which one of the requesting and home gateways is selectively responsible for making the in/out area decision depending on whether the requesting gateway maintains the identity of the home gateway.

FIG. 34 is a block diagram of the location system of the fourteenth embodiment. In this location system, R-GMLC 2A, H-GMLC 2B and V-GMLC 2C are respectively owned and operated by network operators A, B and C as illustrated in FIG. 1.

R-GMLC 2A is similar to the R-GMLC 2A of FIG. 6 except that it additionally includes a cache memory 70 for storing identities of home GMLCs (HGIDs) and corresponding identities of target UE terminals, an HGID searcher 71 and an ID separator 72. HGID searcher 71 makes a search through the cache memory 70 for an HGID using the identity (U-ID) of target UE terminal 6B contained in the location request message from the client terminal 1A.

If no corresponding HGID is found, the HGID searcher determines that the R-GMLC 2A is responsible for making the in/out area decision and enables the serving-node ID requestor 24 to request the SNID and HGID from the HLR/HSS 5B. The response message from the HLR/HSS 5B is supplied to the ID separator 72, where the HGID is separated from the serving node ID of the V-MSC/SGSN 31 and stored in the cache memory 70. The SNID is, on the other hand, supplied through the requestor 24 to the LA/SNID mapping memory 28 for detecting the location area of the target UE terminal 6B. Comparator 26 makes a comparison between the detected location area information and the coverage area information from the coverage area memory 23 and determines if the location area is within or outside of the coverage area. If the location area is outside of the coverage area, the location requestor 27 formulates and transmits an error message to the client terminal 1A. If the location area is within the coverage area, the location requestor 27 forwards the location request message from the client terminal 1A to the H-GMLC 2B.

If the HGID searcher 71 detects a corresponding HGID in the cache memory 70, it determines that the H-GMLC 2B is responsible for making the in/out area decision and applies a "add CA" command signal to the location requestor 27 to include the coverage area information in the location request message from the client terminal and forwards to the H-GMLC 2B.

H-GMLC 2B is similar to the H-GMLC 2B of FIG. 30, but differs in that it additionally includes a cache memory 80 for storing serving node identities and corresponding identities of target UE terminals and an SNID searcher 81.

If the location request message from the R-GMLC 2A contains coverage information, the SNID searcher 81 determines that the H-GMLC 2B is responsible for making the in/out area decision and makes a search through the cache memory 80 for an SNID using the identity (U-ID) of target UE terminal 6B contained in the received location request message. If no corresponding SNID is found in the cache memory 80, the SNID searcher 81 enables the SNID requestor 34 to request the serving node ID of the target UE terminal 6B from the HLR/HSS 5B and feeds the received SNID to the LA/SNID mapping memory 35. If corresponding SNID is detected in the cache memory 80, the detected ID is supplied from the cache memory 80 to the LA/SNID mapping memory 35. The SNID supplied, in this way, to the mapping memory 35 is used as a search key for detecting a corresponding location area information. Comparator 36 makes a comparison between the location area information detected in the memory 35 and the coverage area information contained in the received location request message and makes the in/out area decision. If the location area is outside of the coverage area, the location requestor 37 transmits an error message to the R-GMLC 2A, which forwards it to the client terminal 1A. If the location area is within the coverage area, the location requestor 37 forwards the received location request message to the V-GMLC 2C.

If the location request message from the R-GMLC 2A contains no coverage information, it is determined that the H-GMLC 2B is not responsible for making the in/out area decision. Location requestor 37 forwards the received message to the V-GMLC 2C.

Figure 35B:
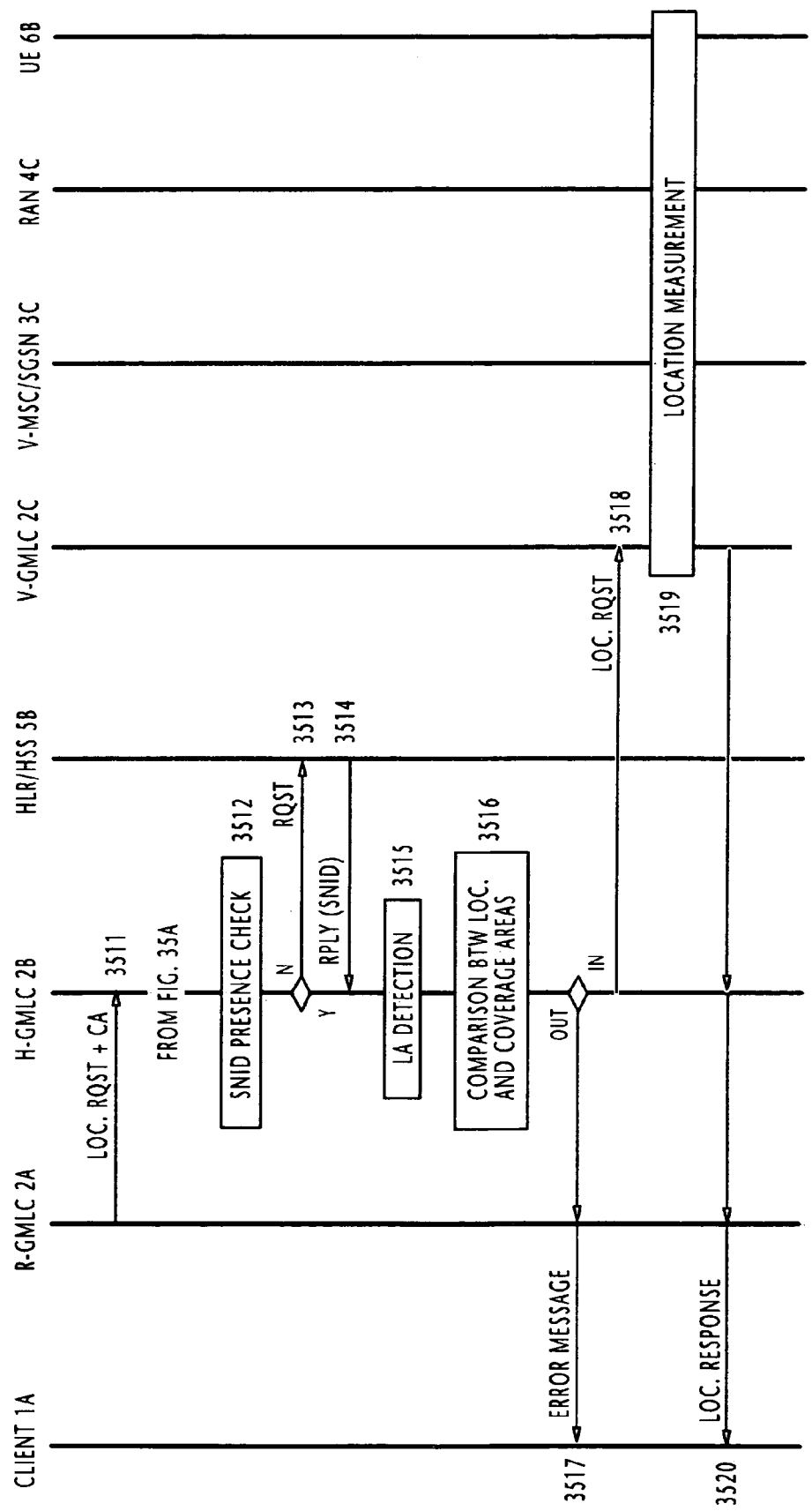

Overall operation of the system of FIG. 34 is shown in the sequence diagrams of FIGS. 35A and 35B. When the serving node ID of V-MSC/SGSN 31 is stored in the home location register (HLR/HSS) 5B of the roaming UE terminal 6B (event 3500, FIG. 35A), the client terminal 1A transmits a location request message to the requesting GMLC 2A (event 3501). In response, the HGID searcher 71 of the gateway 2A uses the identity of target UE terminal 6B to search the cache memory 70 for the node ID of the H-GMLC 2B (event 3502). If there is none, the requesting gateway 2A determines that it is responsible for making an in/out area decision. Searcher 71 enables the SNID requestor 24 to request the identities of the UE's current serving-node V-MSC/SGSN 3C and the UE's home gateway 2B from the HLR/HSS 5B (events 3503, 3504). The retrieved HGID is stored in the cache memory 70 and the SNID is used to retrieve the location area information from the mapping memory 25 (event 3505). The location area is compared in the comparator 26 with coverage area stored in the coverage area memory 23 (event 3506). If the location area is outside of the service coverage area, an error message is sent to the client terminal 1A (even 3507). Otherwise, the location request message from the client terminal is forwarded to the home gateway 2B. After verification by the home gateway, the message is forwarded to the visited gateway 2C (event 3508) to perform a location measurement process (event 3509) and a location report is transmitted to the client terminal via the gateways 2B and 2A (event 3510).

If the HGID is detected in the cache memory 70, the requesting gateway 2A determines that the home gateway 2B is responsible for making the in/out area decision. In this case, the HGID searcher 71 supplies an "add CA" command to the location requestor 27 which, in response, retrieves the service coverage information from the memory 23 and inserts it into the location request message and forwards it to the home GMLC 2B (event 3511).

The SNID searcher 81 of the home gateway responds to the location message from the requesting gateway 2A by making a search through the cache memory 80 for an SNID corresponding to the identity of the target UE terminal 6B (event 3512, FIG. 35B). If there is none, the SNID searcher 81 enables the SNID requestor 34 to request the SNID from the HLR/HSS 5B (events 3513, 3514). Corresponding to the requested SNID, location area information is retrieved from the mapping memory 35 (event 3515) and compared in the comparator 36 with the coverage area represented by the service coverage information contained in the location message from the requesting gateway 2A (event 3516). If the location area is outside of the coverage area, an error message is sent to the client terminal 1A from the home gateway via the requesting gateway 2A (event 3517). Otherwise, the location request message from the requesting gateway 2A is forwarded to the visited gateway 2C (event 3518) to perform a location measurement process 3519 and a location report is transmitted to the client terminal via the gateways 2B and 2A (event 3520).

FIFTEENTH EMBODIMENT

The 3GPP specifies two types of location request. The first type is the immediate location request where the location system replies immediately to the client terminal with the current location estimate if this could be available. The second type is the deferred location request for location contingent on some current or future events where the response from the location system to the client may occur one time after the request was sent. In the previous embodiments, the description was based on the assumption that the location request message is of the immediate location request.

In the fourteenth embodiment, for example, if the location area of the target UE terminal is out of the coverage area of a client's service, an error message is returned to the client terminal. This effectively saves GMLCs from making infertile requests to V-MSC/SGSNs in so far as the client's location request is of the immediate type. Since there is a possibility that making a location estimate becomes a timely event just after the target UE terminal has entered a service coverage area, it is not desirable to immediately return an error message as a response to a deferred location request as soon as a decision is made that the UE's location area is outside of the coverage area.

In the fifteenth embodiment shown in FIG. 36, deferred location requests are treated as a signal for disabling the in/out area decision, while the immediate type of location request is used as a signal for enabling that decision. As shown in FIG. 37, the client terminal 1A transmits a location request message in which a request type field is included in addition to the source address, destination address and service type fields. The requesting gateway 2A forwards the location request message to the home gateway 2B with a service coverage information field in addition to the request type field.

The location system of FIG. 36 is similar to that of FIG. 34 except that the requesting and home gateways 2A and 2B additionally include request type detectors 90 and 100, respectively. These detectors are associated with their LA/SNID mapping memory and location requestor to control their functions as described below.

Figure 38A:
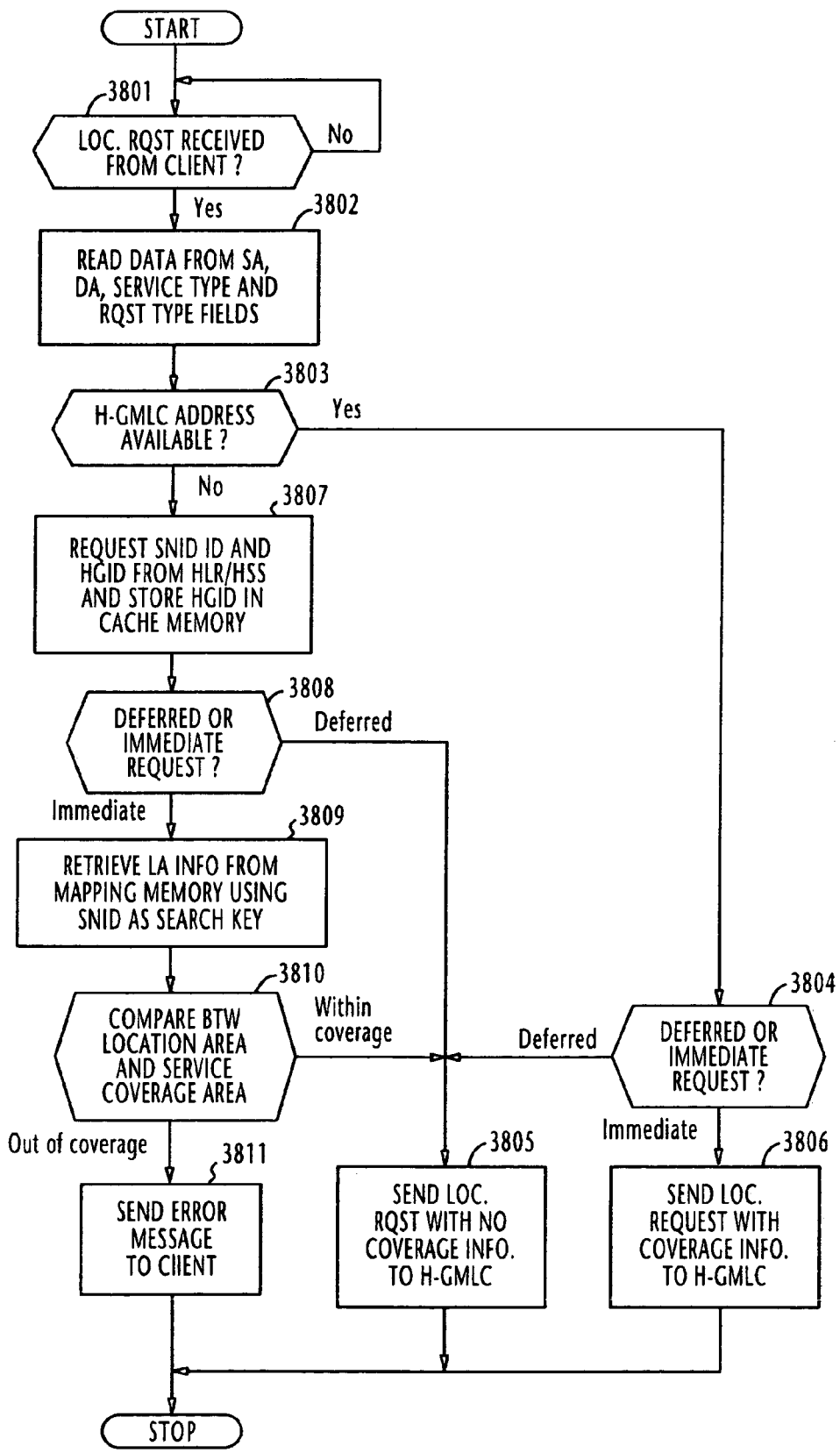
FIGS. 38A and 38B are flowcharts of the operation of the requesting and home gateways of FIG. 36.
Figure 39A:
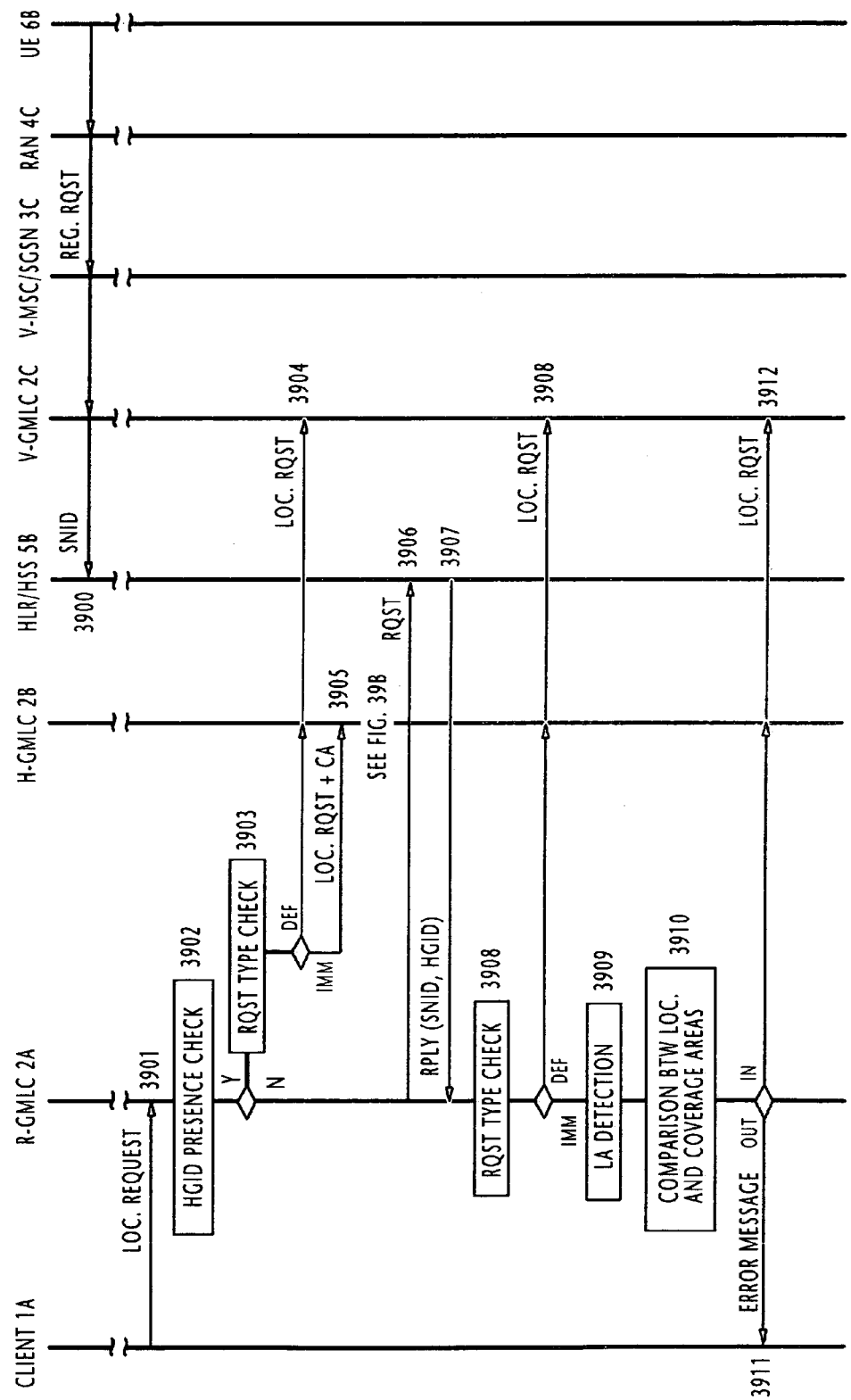
FIGS. 39A and 39B are sequence diagrams of the location system of FIG. 36.
Figure 39B:
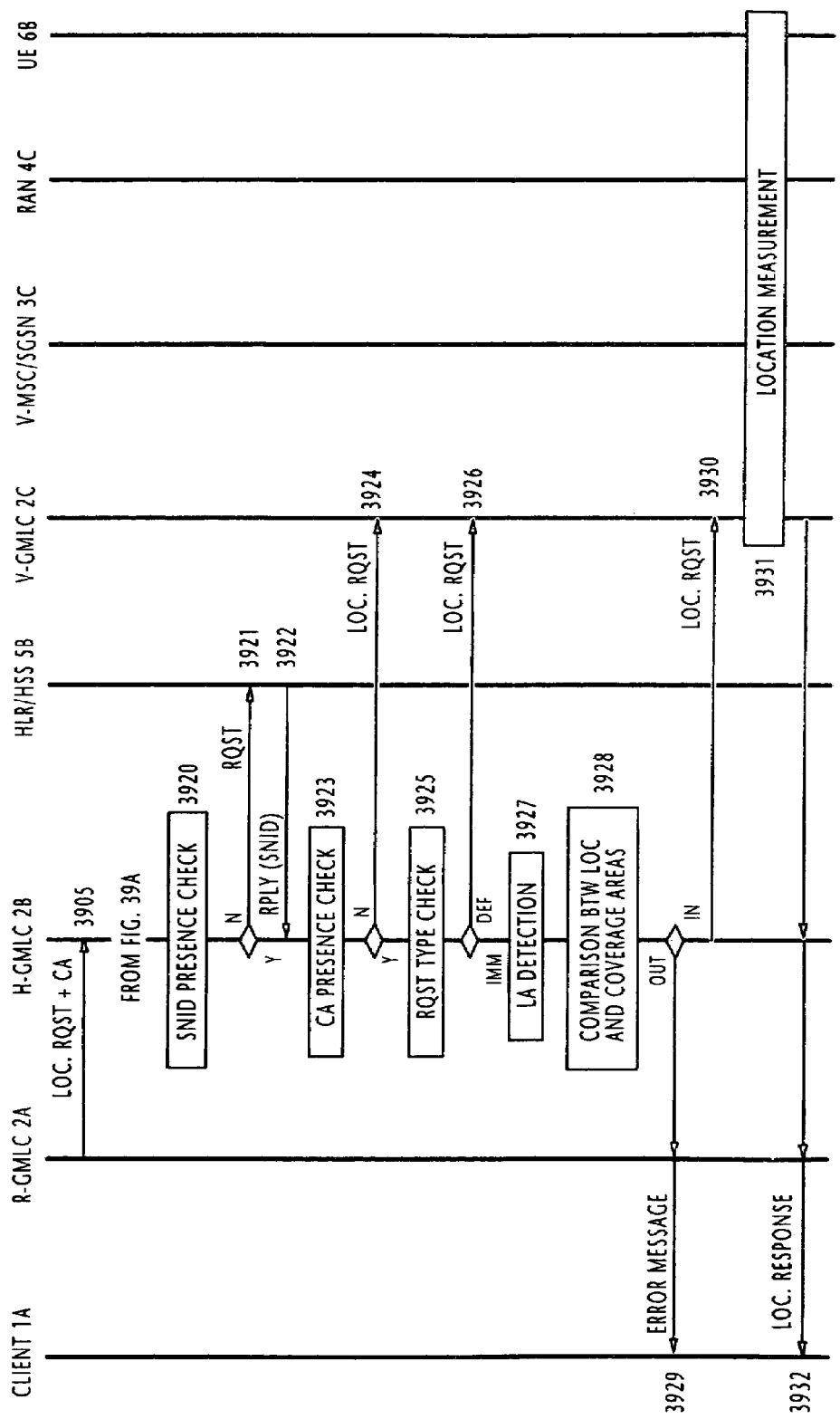

The requesting GMLC 2A operates according to the flowchart of FIG. 38A and the sequence diagrams of FIGS. 39A, 39B. With the serving node ID of V-MSC/SGSN 3C being stored in the home location database 5B of the target UE terminal 6B (event 3900, FIG. 39A), a location request message is sent from the client terminal. The requesting gateway 2A receives the message (step 3801, event 3901) and reads its all data and supplies the client ID and service type to the coverage area memory 23 and the UE's ID to the SNID requestor 24 and HGID searcher 71 (step 3802). At step 3803, the HGID searcher 71 determines if the address of the H-GMLC 2B corresponding to the UE's ID is stored in the cache memory 70 (event 3902). If the decision at step 3803 is affirmative, flow proceeds to step 3804, where the request type detector 90 determines if the location request is of deferred or immediate type (event 3903).

If the request message is of deferred type, the location requestor 27 simply forwards the location request message to the home gateway 2B with no service coverage information (step 3805), which will then be verified and forwarded to the V-GMLC 2C (event 3904). If the request message is of immediate type, flow proceeds from step 3804 to step 3806, in which the location requestor 27 retrieves the service coverage information from the coverage area memory 23 corresponding to the client's ID and the service type, and reformulates the location request message with the retrieved coverage information and forwards the message to the H-GMLC 2B (event 3905).

If the address of the H-GMLC 2B is not stored in the cache memory 70, the SNID requestor 24 is enabled to request the serving node ID and the home gateway ID (HGID) from the HLR/HSS 5B and stores the retrieved HGID in the cache memory 70 (step 3807, events 3906, 3907). If the received location request is of the deferred type (step 3808), the location requestor 27 forwards the location request message with no coverage information to the home gateway 2B (step 3805), which will then be verified and forwarded to the V-GMLC 2C (event 3908).

If the received location request is of the immediate type (step 3808), the location area information representing the location area of UE terminal 6B is retrieved from the mapping memory 25 corresponding to the serving node ID (step 3809, event 3909) and compared in the comparator 26 with the coverage area information supplied from the coverage area memory 23 (step 3810, event 3910). If the location area is out of the coverage area, an error message is returned to the client terminal 1A (step 3811, event 3911). If the location area is within the coverage area, the location requestor 27 forwards the location request message to the H-GMLC 2B (step 3805), which will then be verified and forwarded to the V-GMLC 2C (event 3912).

Figure 38B:
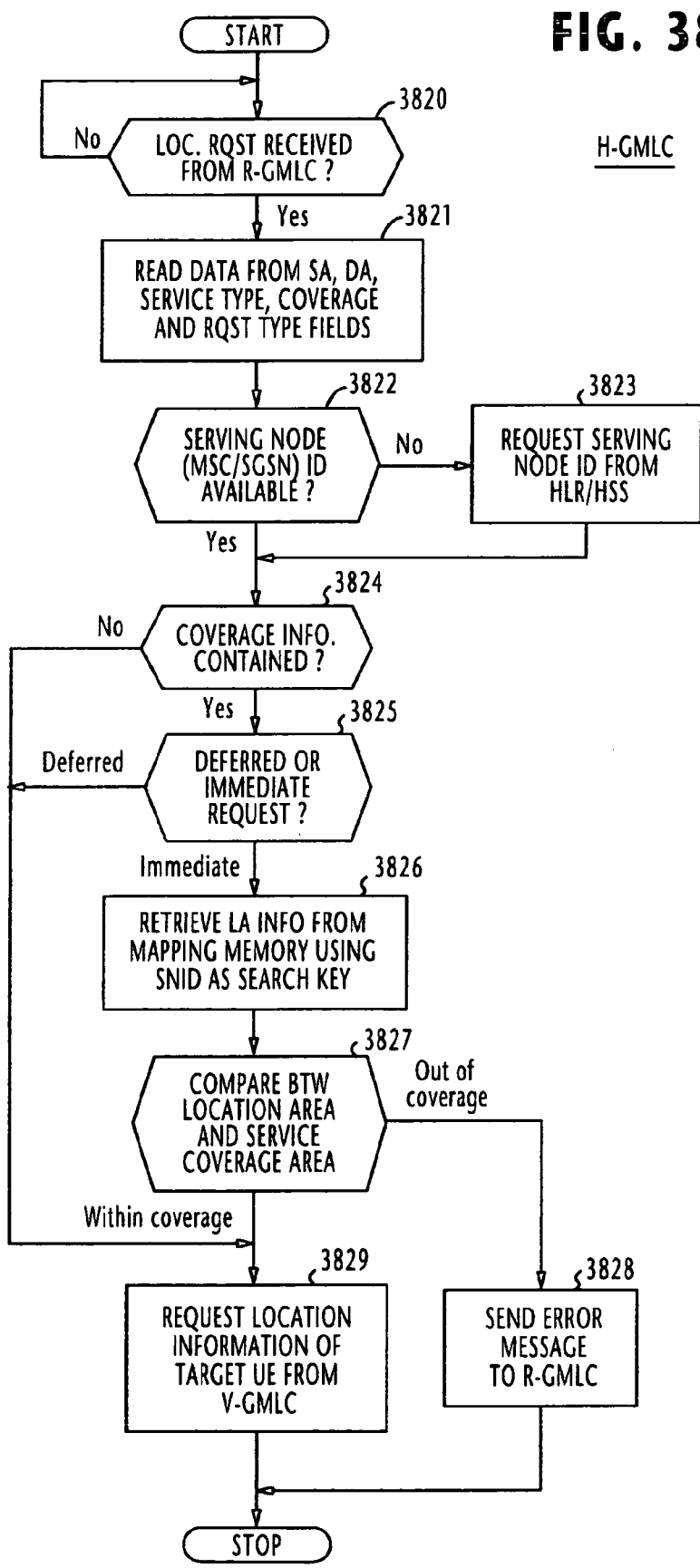

The home GMLC 2B operates according to the flowchart of FIG. 38B and the sequence diagrams of FIGS. 39A, 39B. When a location request message is received from the requesting gateway 2A (step 3820) as a result of any one of events 3904, 3905, 3908 and 3912), the H-GMLC 2B reads the contents of the received message and supplies the UE's ID to the SNID requestor 34 and SNID searcher 81 (step 3821).

At step 3822, the SNID searcher 81 determines if the serving node ID corresponding to the UE ID is stored in the cache memory 80 (event 3920). If the decision at step 3822 is affirmative, flow proceeds to step 3824 and if the decision is negative, flow proceeds from step 3822 to step 3823, where the SNID requestor 34 is enabled to request the serving node ID from the HLR/HSS 5B (events 3921, 3922).

At step 3824, the received message is checked by the location requestor 37 to determine if the message contains coverage information (event 3923). If the coverage information is not contained in the message, the home gateway determines that the in/out area decision has been performed by the requesting gateway 2A, and flow proceeds to step 3829 to forward the message from the location requestor 37 to the V-GMLC 2C (event 3924). If the message contains coverage information, the decision at step 3824 is affirmative and the coverage information is supplied to the comparator 36 and flow proceeds to step 3825.

At step 3825, the request type detector 100 determines if the location request is of deferred or immediate type (event 3925). If the location request is of deferred type, flow proceeds to step 3829, where the location requestor 37 is enabled to forward the location request message to the V-GMLC 2C (event 3926). If the location request is of the immediate type, flow proceeds from step 3825 to step 3826 to retrieve location area information corresponding to the serving node ID from the LA/SNID mapping memory 35 (event 3927) and the comparator 36 performs a comparison (step 3827, event 3928) between the location area information and the coverage area information which is supplied from the requesting gateway as a result of event 3905. If the location area is out of the coverage area, an error message is returned to the requesting gateway (step 3828, event 3929). If the location area is within the coverage area, flow proceeds to step 3829 to forward the location request message to the V-GMLC 2C (event 3930).

A location measurement is performed on the target UE terminal (event 3931) and a location report message is returned to the client terminal through the home and requesting gateways (event 3932).

What is claimed is:

1. A location system for a client terminal which provides a location-based service over a coverage area, comprising:
at least one mobile communication network for storing information indicating an area in which a mobile terminal is located and determining location of said mobile terminal in response to a location request message;
first means, responsive to a location request message from said client terminal requesting location information of a target mobile terminal, for retrieving area indicating information from said network corresponding to identity of said target mobile terminal to determine the area in which said target mobile terminal is located; and second means for forwarding the location request message to said network to determine the location of said target mobile terminal if said determined area is within said coverage area and transmitting an error message to said client terminal if said determined area is outside of said coverage area.

2. The location system of claim 1, wherein said second means further comprises means for making a first decision when said location request message is an immediate location request and said location area is within said coverage area, a second decision when said location request message is an immediate location request and said location area is outside of said coverage area, or a third decision when said location request is a deferred location request, and forwarding said location request message to said location network in response to either of said first and third decisions and transmitting said error message to said client terminal in response to said second decision.

3. The location system of claim 1, wherein said at least one mobile communication network comprises:

a home location database to which said target mobile terminal is subscribed; and a serving node, responsive to a registration request message from said target mobile terminal, storing identity of the serving node in the home location database of said mobile terminal as said area indicating information, wherein said first means is arranged to retrieve a serving node identity from the home location database corresponding to the target mobile terminal in response to receipt of said location request message from said client terminal, and wherein said second means is arranged to forward said location request message to a serving node identified by the retrieved serving node identity if said determined area is within said coverage area and transmit said error message to said client terminal if said determined area is outside of said coverage area.

4. The location system of claim 3, wherein said second means further comprises means for making a first decision when said location request message is an immediate location request and said location area is within said coverage area, a second decision when said location request message is an immediate location request and said location area is outside of said coverage area, or a third decision when said location request is a deferred location request, and forwarding said location request message to said serving node in response to either of said first and third decisions and transmitting said error message to said client terminal in response to said second decision.

5. The location system of claim 3, wherein said second means further includes storage means for storing a plurality of coverage information representing coverage areas according to a plurality of service types and identities of client terminals, retrieving one of the stored coverage information corresponding to a service type and an identity of the client terminal contained in said message from the client terminal, and requesting said location information or transmitting said error message if said location area is, respectively, within or outside of the coverage area represented by the retrieved coverage information.

6. The location system of claim 3, wherein said first means is provided in a requesting gateway to which said client terminal is connected, and further includes storage means for storing a plurality of coverage information representing coverage areas according to a plurality of service types and identities of client terminals and retrieving one of said stored coverage information corresponding to a service type and an identity of the client terminal contained in said message from the client terminal, said first means being arranged to transmit the location request message to said visited gateway containing the retrieved coverage information and said serving node identity retrieved from said database, and wherein said second means is provided in a visited gateway to which said target mobile terminal is visiting, and is arranged to request said location information or transmit said error message if a location area represented by the transmitted serving node identity is within or outside, respectively, of a coverage area represented by the transmitted coverage information.

7. The location system of claim 6, wherein said first means in said requesting gateway comprises:

means for detecting a country code in the serving node identity retrieved from said database and retrieving said one stored coverage information from said storage means corresponding to the detected country code and to said service type and said identity of the client terminal and forwarding the location request message to said visited gateway containing the retrieved coverage information and the serving node identifier retrieved from said database, wherein said second means in said visited gateway comprises:

a mapping memory for mapping a plurality of information representing a plurality of location areas to a plurality of serving node identities and retrieving one of said location area information from the mapping memory corresponding to the serving node identity contained in the location request message from said requesting gateway; and means for requesting the location information of the target mobile terminal from said serving node if the location area represented by the information retrieved from said mapping memory is within said coverage area represented by said coverage information from said requesting gateway and transmitting an error message to said client terminal via the requesting gateway if said location area is outside of said coverage area.

8. The location system of claim 3, wherein said location request message from said client terminal contains coverage information indicating said coverage area and wherein said second means is arranged to request said location information or transmit said error message if the location area is within or outside, respectively, of the coverage area represented by said coverage information.

9. The location system of claim 3, wherein said first means further comprises a cache memory for mapping a plurality of serving node identities retrieved from said database to identities of mobile terminals and retrieving one of the serving node identities from the cache memory corresponding to identity of the target mobile terminal contained in the location request message from said client terminal.

10. The location system of claim 3, wherein said coverage area is represented by a list of assigned codes, and said serving node identity is represented by a code, and wherein said second means is arranged to request said location information if the code of the serving node identity is contained in said list of assigned codes and transmit said error message if said code of the serving node identity is not contained in said list.

11. The location system of claim 10, wherein said list of assigned codes is a list of country codes.

12. The location system of claim 5, wherein said first means further comprises update means, responsive to a request message from said client terminal, for updating said storage means when a change occurs in the coverage area of the location-based service provided by the client terminal.

13. The location system of claim 5,
wherein said first means comprises a mapping memory for mapping a plurality of information representing a plurality of location areas to a plurality of serving node identities and retrieving one of the location area information from said mapping memory corresponding to the retrieved serving node identity, and
wherein said second means comprises means for comparing the location area represented by the retrieved location area information and said coverage area to request said location information from said serving node or transmit said error message depending on a result of said comparison.

14. The location system of claim 13, wherein said first means is provided in a first gateway, further comprising a location area memory provided in a second gateway for storing location area information representing a plurality of location areas covered by said serving node and update means (44, 46) for updating said mapping memory of the first gateway according to a change in said location area information stored in said location area memory of the second gateway.

15. The location system of claim 13, wherein said mapping memory is provided in a home gateway and said location area memory and said updating means are provided in a visited gateway.

16. The location system of claim 3, wherein said first and second means are provided in a home gateway.

17. The location system of claim 16, wherein a coverage area memory is provided in a requesting gateway for storing a plurality of coverage area information representing coverage areas of location-based services according to service types and identities of client terminals, and means for forwarding the location request message from said client terminal to said home gateway,
wherein said home gateway comprises:
a cache memory; and
means, responsive to said location request message, for making a search through said cache memory for coverage information corresponding to a service type and identity of the client terminal for retrieving said serving node identifier from said database if the corresponding coverage information is detected, and requesting said requesting gateway to transmit corresponding coverage information of coverage area memory if said corresponding coverage information is not detected in said cache memory and storing the transmitted coverage information in said cache memory.

18. The location system of claim 3, wherein said first and second means are provided in a requesting gateway.

19. The location system of claim 3, wherein said first means is provided in a requesting gateway and second means is provided in a visited gateway.

20. The location system of claim 3, wherein said first and second means are provided in a dual-function gateway which operates a requesting gateway and a home gateway.

21. The location system of claim 3, wherein said first and second means are provided in a dual-function gateway which operates as a home gateway and a visited gateway.

22. The location system of claim 3, wherein said first and second means are provided in a triple-function gateway which operates as a requesting gateway, a home gateway and a visited gateway.

23. The location system of claim 1, further comprising,
a plurality of databases associated respectively with said networks, each database being a home location of the mobile terminals of the associated network and storing identity of a gateway of the associated network,
wherein said at least one mobile communication network comprises a plurality of serving nodes, each serving node registering identity of a mobile terminal in response to a registration request message therefrom and storing identity of the serving node in the home location database of said mobile terminal, said serving node being responsible for producing location information of the registered mobile terminal, said serving node identity representing a location area of said mobile terminal,
wherein said first means and said second means are provided in a first gateway which comprises
a cache memory, wherein the first means is responsive to a location request message from said client terminal requesting location information of a target mobile terminal for retrieving a serving node identity and identity of a second gateway from the home location database of the target mobile terminal if said identity of the second gateway is not stored in said cache memory, and storing the retrieved identity of the second gateway in said cache memory,
requesting the location information of the target mobile terminal from a serving node identified by the retrieved serving node identity if a location area represented by the serving node identity is within said coverage area and transmitting an error message to said client terminal if the location area is outside of said coverage area, or forwarding the location request message to the second gateway if said identity of the second gateway is stored in said cache memory, said forwarded location request message containing coverage information representing said coverage area.

24. The location system of claim 23,
wherein said second means is arranged to:
if said identity of the second gateway is not stored in said cache memory, request said location information from said serving node if the location request message is a deferred location request, or if said message is an immediate location request and said location area is within said coverage area, and
if said identity of the second gateway is stored in said cache memory, forward said location request message containing coverage information representing said coverage area to said second gateway if said location request message is a deferred location request,
wherein said fourth means is arranged to:
request said location information from said serving node if the location request message from the first gateway is a deferred location request, or if said message is an immediate location request and said location area is within said coverage area represented by the coverage information transmitted from said first gateway.

25. A gateway for serving a client terminal which provides a location-based service to mobile terminals over a coverage area through at least one mobile communication network which stores information indicating an area in which a mobile terminal is located and determines the location of said mobile terminal in response to a location request message, comprising:

- first means, responsive to a location request message from said client terminal requesting location information of a target mobile terminal, for retrieving area indicating information from said network corresponding to identity of said target mobile terminal to determine the area in which said target mobile terminal is located; and
- second means for forwarding the location request message to said at least one network to determine the location of said target mobile terminal if said determined area of the target mobile terminal is within said coverage area and transmitting an error message to said client terminal if said determined area of the target mobile terminal is outside of said coverage area.

26. The gateway of claim 25, wherein said second means comprises means for making a first decision when said location request message is an immediate location request and said location area is within said coverage area, a second decision when said location request message is an immediate location request and said location area is outside of said coverage area, or a third decision when said location request is a deferred location request, and forwarding said location request message to said at least one network in response to either of said first and third decisions and transmitting said error message to said client terminal in response to said second decision.

27. The gateway of claim 25, wherein said at least one mobile communication network comprises, a home location database to which said target mobile terminal is subscribed, and a serving node, responsive to a registration request message from said target mobile terminal, storing identity of the serving node in the home location database of said mobile terminal as said area indicating information, wherein said first means is arranged to retrieve a serving node identity from the home location database of said target mobile terminal in response to receipt of said location request message from said client terminal, and wherein said second means is arranged to forward said location request message to a serving node identified by the retrieved serving node identity if said area is within said coverage area and transmit said error message to said client terminal if said area is outside of said coverage area.

28. The gateway of claim 27, wherein said second means comprises means for making a first decision when said location request message is an immediate location request and said location area is within said coverage area, a second decision when said location request message is an immediate location request and said location area is outside of said coverage area, or a third decision when said location request is a deferred location request, and forwarding said location request message to said serving node in response to either of said first and third decisions and transmitting said error message to said client terminal in response to said second decision.

29. The gateway of claim 27, wherein said second means further comprises storage means for storing a plurality of coverage information representing coverage areas according to a plurality of service types and identities of client terminals, retrieving one of the stored coverage information corresponding to a service type and identity of the client terminal contained in said message from the client terminal, and performing the requesting of said location information or the transmitting of said error message if said location area is within or outside, respectively, of the coverage area represented by the retrieved coverage information.

30. The gateway of claim 27, wherein said location request message from said client terminal contains coverage information indicating said coverage area and wherein said second means is arranged to request said location information or transmit said error message if the location area is within or outside, respectively, of the coverage area represented by said coverage information.

31. The gateway of claim 27, wherein said first means further comprises a cache memory system for mapping a plurality of serving node identities retrieved from said database to identities of mobile terminals and retrieving one of the serving node identities corresponding to identity of the target mobile terminal contained in the location request message from said client terminal.

32. The gateway of claim 28, wherein said coverage area is represented by a list of assigned codes, and said serving node identity is represented by a code, and wherein said second means is arranged to request said location information if the code of the serving node identity is contained in said list of assigned codes and transmit said error message if said code of the serving node identity is not contained in said list.

33. The gateway of claim 32, wherein said list of assigned codes is a list of country codes.

34. The gateway of claim 28, wherein said first means comprises a mapping memory for mapping a plurality of information representing a plurality of location areas to a plurality of serving node identities and for retrieving one of the location area information from said mapping memory corresponding to the retrieved serving node identity, and wherein said second means comprises means for comparing the location area represented by the retrieved location area information and said coverage area to request said location information from said serving node or transmit said error message depending on a result of said comparison.

35. The gateway of claim 30, wherein said first means further comprises update means, responsive to a request message from said client terminal, for updating said storage means when a change occurs in the coverage area of the location-based service provided by the client terminal.

36. A method of locating a mobile terminal when a location request message is received from a client terminal which provides location-based service to said mobile terminal when the mobile terminal is located within the coverage area of said service, comprising:

a) responsive to a location request message from said client terminal requesting location information of a target mobile terminal, determining an area in which said target mobile terminal is located; and b) determining location of said target mobile terminal if said determined area is within said coverage area and transmitting an error message to said client terminal if said determined area is outside of said coverage area.

37. The method of claim 36, wherein said mobile terminal is connected to one of a plurality of mobile communication networks, each of the networks comprising a home location database to which said mobile terminal is subscribed and a serving node responsive to a registration request message from said target mobile terminal for storing identity of the serving node in the home location database of said mobile terminal as said area indicating information, wherein step (a) comprises the step of retrieving a serving node identity from said home location database corresponding to said target mobile terminal in response to receipt of said location request message from said client terminal, said serving node representing said area in which said target mobile terminal is located, and wherein step (b) comprises the step of forwarding said location request message to a serving node identified by the retrieved serving node identity if an area represented by the serving node identity is within said coverage area, and transmitting said error message to said client terminal if the area is outside of said coverage area.

38. The method of claim 37, wherein step (a) further comprises the steps of:
  $a_1$) determining whether said location request message is an immediate location request or a deferred location request;
  $a_2$) if said location request message is an immediate location request, performing step (b); and
  $a_3$) if said location request message is a deferred location request, requesting the location information of the target mobile terminal from a serving node identified by the retrieved serving node identity.

39. The method of claim 37, wherein said location request message contains coverage information representing a coverage area of said location-based service, and wherein step (a) comprises:
  $a_1$) storing a plurality of coverage information in a memory of a first gateway corresponding to a plurality of service types and identities of client terminals;
  $a_2$) making a search through a cache memory of a second gateway for coverage information corresponding to a service type and identity of the client terminal contained in the received location request message;
  $a_3$) if said corresponding coverage information is not detected in said cache memory, requesting the coverage information from the first gateway and storing the coverage information in said cache memory.

40. The method of claim 37, wherein step (a) is performed in a first gateway and step (b) is performed in a second gateway (2C), and wherein step (a) further comprises the steps of:
  $a_1$) storing a plurality of coverage information in a storage means of a first gateway corresponding to a plurality of service types and identities of client terminals;
  $a_2$) detecting a country code in the serving node identity retrieved from said home location database and retrieving one of coverage information from said storage means corresponding to the detected country code and to said service type and said identity of the client terminal; and
  $a_3$) forwarding the location request message from said first gateway to said second gateway containing the retrieved coverage information and the serving node identifier retrieved from said database, wherein step (b) comprises:
  $b_1$) mapping a plurality of location area information representing a plurality of location areas in a mapping memory to a plurality of serving node identities;
  $b_2$) retrieving one of said location area information from the mapping memory corresponding to the serving node identity contained in the location request message forwarded from said first gateway as said location area to determine whether the location area is within or outside of the coverage information contained in said message forwarded from said first gateway; and
  $b_3$) requesting said location information terminal from said serving node or transmitting said error message to said client terminal, depending on whether said location area is within or outside of said coverage area.

41. The method of claim 40, wherein step (a) further comprises the step of updating said storage means in response to a request message from said client terminal when a change occurs in the coverage area of the location-based service provided by the client terminal.

42. The method of claim 37, wherein step (a) comprises the step of:
  $a_1$) making a search through a cache memory for a serving node identity corresponding to identity of said target mobile terminal; and
  $a_2$) if said corresponding serving node identity is not detected; retrieving the serving node identifier from said home location database and storing the retrieved serving node identifier in said cache memory corresponding to the identity of said target mobile terminal.

43. The method of claim 37, wherein said coverage area is represented by a list of assigned codes, and said serving node identity is represented by a code, and wherein step (b) comprises the steps of requesting said location information from said serving node if the code of the serving node identity is contained in said list of assigned codes and transmitting said error message if said code of the serving node identity is not contained in said list.

44. The method of claim 43, wherein said list of assigned codes is a list of country codes.

45. The method of claim 37, wherein step (b) comprises the steps of:
  $b_1$) mapping a plurality of information representing a plurality of location areas to a plurality of serving node identities in a mapping memory;
  $b_2$) retrieving one of the location area information from said mapping memory as said location area corresponding to the serving node identity retrieved from said home location database; and
  $b_3$) requesting said location information terminal from said serving node or transmitting said error message to said client terminal, depending on whether said location area is within or outside of said coverage area.

46. The method of claim 45, wherein step (b) is performed in a first gateway, further comprising the steps of:
  in a second gateway, storing location area information representing a plurality of location areas covered by said serving node in a location area memory; and
  requesting said first gateway to update said mapping memory according to a change in said location area information stored in said location area memory.

47. The method of claim 37, wherein said home location database stores identity of a gateway of the associated network and wherein steps (a) and (b) are performed in a first gateway, and wherein step (a) comprises:
  $a_1$) in said first gateway, making a search through a first cache memory for identity of a second gateway; and
  $a_2$) if said identity of the second gateway is not stored in said first cache memory, retrieving said serving node identity and identity of the second gateway from the home location database corresponding to the target mobile terminal and storing the retrieved identity of the second gateway in said first cache memory, further comprising the steps of:
  c) if said identity of the second gateway is stored in said first cache memory, forwarding the location request message from said first gateway to the second gateway, said forwarded message containing coverage information representing said coverage area;

d) in said second gateway, responsive to said location request message from said first gateway, making a search through a second cache memory for a serving node identity corresponding to identity of said target mobile terminal;

e) if said serving node identity is stored in said second cache memory, retrieving the same from said second cache memory and if said serving node identity is not stored in said second cache memory, retrieving said serving node identity from said home location database corresponding to the target mobile terminal and storing the retrieved serving node identity in said second cache memory; and f) requesting the location information of the target mobile terminal from a serving node identified by the retrieved serving node identity if a location area represented by the serving node identity retrieved by step (e) is within a coverage area represented by the coverage information contained in said location request message from the first gateway and transmitting an error message to said client terminal via said first gateway if the location area is outside of said coverage area.

48. The method of claim 47, wherein step (a) further comprises the steps of:

$a_3$) determining whether said location request message is an immediate location request or a deferred location request;

$a_4$) if said location request message is an immediate location request, performing step (b); and $a_5$) if said location request message is a deferred location request, requesting the location information of the target mobile terminal from said serving node, wherein step (c) further comprises:

$c_1$) if said identity of the second gateway is stored in said first cache memory, determining, in said first gateway, whether said location request message is an immediate location request or a deferred location request;

$c_2$) forwarding the location request message from said first gateway to the second gateway containing coverage information representing said coverage area if said location request message is an immediate location request, and not containing said coverage information if said location request message is a deferred location request, wherein step (e) further comprises the steps of:

$e_1$) determining, in said second gateway, whether said location request message from the first gateway is an immediate location request or a deferred location request;

$e_2$) if said location request message is an immediate location request, performing step (f); and $e_3$) said location request message is a deferred location request, requesting the location information of the target mobile terminal from said serving node.

49. A computer-readable medium encoded with a computer program for locating a mobile terminal when a location request message is received from a client terminal which provides location-based service to said mobile terminal when the mobile terminal is located within the coverage area of said service, said program comprising code means adapted to perform, when said program is run on a data processing system, the steps of:

a) responsive to a location request message from said client terminal requesting location information of a target mobile terminal, determining an area in which said target mobile terminal is located; and b) determining location of said target mobile terminal if said determined area is within said coverage area and transmitting an error message to said client terminal if said determined area is outside of said coverage area.

50. The computer-readable medium of claim 49, wherein said mobile terminal is connected to one of a plurality of mobile communication networks, each of the networks comprising a home location database to which said mobile terminal is subscribed and a serving node responsive to a registration request message from said target mobile terminal for storing identity of the serving node in the home location database of said mobile terminal as said area indicating information, wherein step (a) comprises the step of retrieving a serving node identity from said home location database corresponding to said target mobile terminal in response to receipt of said location request message from said client terminal, said serving node representing said area in which said target mobile terminal is located, and wherein step (b) comprises the step of forwarding said location request message to a serving node identified by the retrieved serving node identity if an area represented by the serving node identity is within said coverage area, and transmitting said error message to said client terminal if the area is outside of said coverage area.

51. The computer-readable medium of claim 50, wherein step (a) further comprises the steps of:

$a_1$) determining whether said location request message is an immediate location request or a deferred location request;

$a_2$) if said location request message is an immediate location request, performing step (b); and $a_3$) if said location request message is a deferred location request, requesting the location information of the target mobile terminal from a serving node identified by the retrieved serving node identity.

52. The computer-readable medium of claim 50, wherein said location request message contains coverage information representing a coverage area of said location-based service, and wherein step (a) comprises:

$a_1$) storing a plurality of coverage information in a memory of a first gateway corresponding to a plurality of service types and identities of client terminals;

$a_2$) making a search through a cache memory of a second gateway for coverage information corresponding to a service type and identity of the client terminal contained in the received location request message;

$a_3$) if said corresponding coverage information is not detected in said cache memory, requesting the coverage information from the first gateway (2A) and storing the coverage information in said cache memory.

53. The computer-readable medium of claim 50, wherein step (a) is performed in a first gateway and step (b) is performed in a second gateway, and wherein step (a) further comprises the steps of:

$a_1$) storing a plurality of coverage information in a storage means of a first gateway corresponding to a plurality of service types and identities of client terminals;

$a_2$) detecting a country code in the serving node identity retrieved from said home location database and retrieving one of coverage information from said storage means (23) corresponding to the detected country code and to said service type and said identity of the client terminal; and $a_3$) forwarding the location request message from said first gateway to said second gateway containing the retrieved coverage information and the serving node identifier retrieved from said database, wherein step (b) comprises:
- $b_1$) mapping a plurality of location area information representing a plurality of location areas in a mapping memory to a plurality of serving node identities;
- $b_2$) retrieving one of said location area information from the mapping memory corresponding to the serving node identity contained in the location request message forwarded from said first gateway as said location area to determine whether the location area is within or outside of the coverage information contained in said message forwarded from said first gateway; and
- $b_3$) requesting said location information terminal from said serving node or transmitting said error message to said client terminal, depending on whether said location area is within or outside of said coverage area.

54. The computer-readable medium of claim 53, wherein step (a) further comprises the step of updating said storage means in response to a request message from said client terminal when a change occurs in the coverage area of the location-based service provided by the client terminal.

55. The computer-readable medium of claim 50, wherein step (a) comprises the step of:
- $a_1$) making a search through a cache memory for a serving node identity corresponding to identity of said target mobile terminal; and
- $a_2$) if said corresponding serving node identity is not detected, retrieving the serving node identifier from said home location database and storing the retrieved serving node identifier in said cache memory corresponding to the identity of said target mobile terminal.

56. The computer-readable medium of claim 50, wherein said coverage area is represented by a list of assigned codes, and said serving node identity is represented by a code, and wherein step (b) comprises the steps of requesting said location information from said serving node if the code of the serving node identity is contained in said list of assigned codes and transmitting said error message if said code of the serving node identity is not contained in said list.

57. The computer-readable medium of claim 56, wherein said list of assigned codes is a list of country codes.

58. The computer-readable medium of claim 50, wherein step (b) comprises the steps of:
- $b_1$) mapping a plurality of information representing a plurality of location areas to a plurality of serving node identities in a mapping memory;
- $b_2$) retrieving one of the location area information from said mapping memory as said location area corresponding to the serving node identity retrieved from said home location database; and
- $b_3$) requesting said location information terminal from said serving node or transmitting said error message to said client terminal, depending on whether said location area is within or outside of said coverage area.

59. The computer-readable medium of claim 58, wherein step (b) is performed in a first gateway, further comprising the steps of:
- in a second gateway, storing location area information representing a plurality of location areas covered by said serving node in a location area memory; and
- requesting said first gateway to update said mapping memory according to a change in said location area information stored in said location area memory.

60. The computer-readable medium of claim 50, wherein said home location database stores identity of a gateway of the associated network and wherein steps (a) and (b) are performed in a first gateway, and wherein step (a) comprises:
- $a_1$) in said first gateway, making a search through a first cache memory for identity of a second gateway; and
- $a_2$) if said identity of the second gateway is not stored in said first cache memory, retrieving said serving node identity and identity of the second gateway from the home location database corresponding to the target mobile terminal and storing the retrieved identity of the second gateway in said first cache memory, further comprising the steps of:
- c) if said identity of the second gateway is stored in said first cache memory, forwarding the location request message from said first gateway to the second gateway, said forwarded message containing coverage information representing said coverage area;
- d) in said second gateway, responsive to said location request message from said first gateway, making a search through a second cache memory for a serving node identity corresponding to identity of said target mobile terminal;
- e) if said serving node identity is stored in said second cache memory, retrieving the same from said second cache memory and if said serving node identity is not stored in said second cache memory, retrieving said serving node identity from said home location database corresponding to the target mobile terminal and storing the retrieved serving node identity in said second cache memory; and
- f) requesting the location information of the target mobile terminal from a serving node identified by the retrieved serving node identity if a location area represented by the serving node identity retrieved by step (e) is within a coverage area represented by the coverage information contained in said location request message from the first gateway and transmitting an error message to said client terminal via said first gateway if the location area is outside of said coverage area.

61. The computer-readable medium of claim 60, wherein step (a) further comprises the steps of:
- $a_3$) determining whether said location request message is an immediate location request or a deferred location request;
- $a_4$) if said location request message is an immediate location request, performing step (b); and
- $a_5$) if said location request message is a deferred location request, requesting the location information of the target mobile terminal from said serving node, wherein step (c) further comprises:
- $c_1$) if said identity of the second gateway is stored in said first cache memory, determining, in said first gateway, whether said location request message is an immediate location request or a deferred location request;
- $c_2$) forwarding the location request message from said first gateway to the second gateway containing coverage information representing said coverage area if said location request message is an immediate location request, and not containing said coverage information if said location request message is a deferred location request, wherein step (e) further comprises the steps of:
- $e_1$) determining, in said second gateway, whether said location request message from the first gateway is an immediate location request or a deferred location request;
- $e_2$) if said location request message is an immediate location request, performing step (f); and
- $e_3$) said location request message is a deferred location request, requesting the location information of the target mobile terminal from said serving node.

* * * * *